United States Patent
Winklevoss et al.

(10) Patent No.: US 10,915,891 B1
(45) Date of Patent: *Feb. 9, 2021

(54) AUTONOMOUS DEVICES

(71) Applicant: WINKLEVOSS IP, LLC, Wilmington, DE (US)

(72) Inventors: Cameron Howard Winklevoss, New York, NY (US); Tyler Howard Winklevoss, New York, NY (US)

(73) Assignee: Winklevoss IP, LLC, Wilmington, DE (US)

( * ) Notice: Subject to any disclaimer, the term of this patent is extended or adjusted under 35 U.S.C. 154(b) by 208 days.

This patent is subject to a terminal disclaimer.

(21) Appl. No.: 16/178,973

(22) Filed: Nov. 2, 2018

Related U.S. Application Data

(63) Continuation-in-part of application No. 15/071,902, filed on Mar. 16, 2016, now Pat. No. 10,158,480.

(60) Provisional application No. 62/678,339, filed on May 31, 2018, provisional application No. 62/133,978, filed on Mar. 16, 2015.

(51) Int. Cl.
*H04L 29/06* (2006.01)
*G06Q 20/36* (2012.01)
*G06Q 20/40* (2012.01)
*H04L 9/30* (2006.01)

(52) U.S. Cl.
CPC ....... *G06Q 20/3678* (2013.01); *G06Q 20/401* (2013.01); *H04L 9/30* (2013.01); *G06Q 2220/00* (2013.01)

(58) Field of Classification Search
CPC .................................. H04L 9/00; G06F 17/00
See application file for complete search history.

(56) References Cited

U.S. PATENT DOCUMENTS

| | | |
|---|---|---|
| 4,790,431 A | 12/1988 | Reel et al. |
| 5,675,649 A | 10/1997 | Brennan et al. |
| 5,799,287 A | 8/1998 | Dembo |

(Continued)

FOREIGN PATENT DOCUMENTS

| | | |
|---|---|---|
| CA | 2627540 A1 | 9/2009 |
| CN | 103927656 | 7/2014 |

(Continued)

OTHER PUBLICATIONS

Daniel Cawrey, Eschewing Price, Pantera Launches BitIndex to Track Bitcoin, CoinDesk (Jul. 10, 2014), http://www.coindesk.com/eschewing-price-pantera-launches-bitindex-track-bitcoin/ (last visited Jul. 11, 2014).

(Continued)

*Primary Examiner* — Joseph P Hirl
*Assistant Examiner* — Leynna Truvan
(74) *Attorney, Agent, or Firm* — Amster, Rothstein & Ebenstein

(57) ABSTRACT

Autonomous devices and systems, methods, and program products for authorizing and performing autonomous devices transactions are disclosed. The device can generate and transmit to the transaction computer system a first signed electronic transaction request comprising first transaction data comprising a sending account identifier associated with the autonomous device, a destination account identifier, a transaction amount, and a timestamp. The device can digitally sign the transaction request using a private key of an asymmetric key pair.

24 Claims, 47 Drawing Sheets

(56) References Cited

U.S. PATENT DOCUMENTS

| | | |
|---|---|---|
| 5,950,176 A | 9/1999 | Keiser et al. |
| 6,021,257 A | 2/2000 | Chikauchi |
| 6,157,920 A | 12/2000 | Jakobsson et al. |
| 6,505,174 B1 | 1/2003 | Keiser et al. |
| 6,523,012 B1 | 2/2003 | Glassman et al. |
| 6,583,712 B1 | 6/2003 | Reed et al. |
| 7,167,565 B2 | 1/2007 | Rajasekaran |
| 7,330,538 B2 | 2/2008 | Dunsmuir |
| 7,391,865 B2 | 6/2008 | Orsini et al. |
| 7,487,123 B1 | 2/2009 | Keiser et al. |
| 7,677,974 B2 | 3/2010 | Van Luchene |
| 7,716,484 B1 | 5/2010 | Kaliski, Jr. |
| 7,870,058 B2 | 1/2011 | Maltzman |
| 7,873,573 B2 | 1/2011 | Realini |
| 7,999,748 B2 | 8/2011 | Ligtenberg et al. |
| 8,108,278 B2 | 1/2012 | Tzekin et al. |
| 8,108,283 B2 | 1/2012 | Dimitri et al. |
| 8,139,770 B2 | 3/2012 | Zheng et al. |
| 8,224,702 B2 | 7/2012 | Mengerink et al. |
| 8,229,855 B2 | 7/2012 | Huang et al. |
| 8,229,859 B2 | 7/2012 | Samid |
| 8,239,330 B2 | 8/2012 | Montero et al. |
| 8,249,965 B2 | 8/2012 | Tumminaro |
| 8,255,297 B2 | 8/2012 | Morgenstern et al. |
| 8,275,692 B2 | 9/2012 | Cartledge et al. |
| 8,306,910 B2 | 11/2012 | Wilkes |
| 8,326,751 B2 | 12/2012 | Driemeyer et al. |
| 8,352,326 B2 | 1/2013 | Betzler et al. |
| 8,452,703 B2 | 5/2013 | O'Leary et al. |
| 8,606,685 B2 | 12/2013 | Keiser et al. |
| 8,630,951 B2 | 1/2014 | Wilkes |
| 8,688,525 B2 | 4/2014 | Minde |
| 8,688,563 B2 | 4/2014 | Mehew et al. |
| 8,712,914 B2 | 4/2014 | Lyons et al. |
| 8,719,131 B1 | 5/2014 | Roth et al. |
| 9,276,740 B2 | 3/2016 | Nix |
| 9,288,059 B2 | 3/2016 | Nix |
| 9,350,550 B2 | 5/2016 | Nix |
| 9,641,327 B2 | 5/2017 | Nix |
| 9,698,981 B2 | 7/2017 | Nix |
| 9,794,074 B2 | 10/2017 | Toll et al. |
| 10,084,762 B2 | 9/2018 | Versteeg et al. |
| 2002/0143614 A1 | 10/2002 | MacLean et al. |
| 2002/0171546 A1 | 11/2002 | Evans et al. |
| 2003/0009413 A1 | 1/2003 | Furbush et al. |
| 2003/0014749 A1 | 1/2003 | Simons et al. |
| 2003/0225672 A1 | 12/2003 | Hughes et al. |
| 2004/0049464 A1 | 3/2004 | Ohmori et al. |
| 2004/0098609 A1 | 5/2004 | Bracewell et al. |
| 2004/0143710 A1 | 7/2004 | Walmsley |
| 2004/0193657 A1 | 9/2004 | Saito et al. |
| 2004/0243488 A1 | 12/2004 | Yamamoto |
| 2004/0260949 A1 | 12/2004 | Aoki et al. |
| 2005/0044022 A1 | 2/2005 | Spirgel et al. |
| 2005/0240510 A1 | 10/2005 | Schweickert et al. |
| 2006/0218625 A1 | 9/2006 | Pearson et al. |
| 2007/0117615 A1 | 5/2007 | Van Luchene |
| 2007/0146797 A1 | 6/2007 | Sakai et al. |
| 2007/0219869 A1 | 9/2007 | Haines et al. |
| 2007/0271455 A1 | 11/2007 | Nakano et al. |
| 2008/0109280 A1 | 5/2008 | Csoka |
| 2008/0120221 A1 | 5/2008 | Toneguzzo |
| 2008/0140578 A1 | 6/2008 | Felt et al. |
| 2008/0159318 A1 | 7/2008 | Pierlot et al. |
| 2008/0167965 A1 | 7/2008 | Von Nothaus et al. |
| 2008/0215474 A1 | 9/2008 | Graham et al. |
| 2008/0243703 A1 | 10/2008 | Al-Herz et al. |
| 2008/0249957 A1 | 10/2008 | Masuyama et al. |
| 2008/0281444 A1 | 11/2008 | Krieger et al. |
| 2009/0089168 A1 | 4/2009 | Schneck |
| 2009/0094134 A1 | 4/2009 | Toomer et al. |
| 2009/0098939 A1 | 4/2009 | Hamilton, II et al. |
| 2009/0119200 A1 | 5/2009 | Riviere |
| 2009/0132830 A1 | 5/2009 | Haga et al. |
| 2009/0265268 A1 | 10/2009 | Huang et al. |
| 2010/0094771 A1 | 4/2010 | VanderPal |
| 2010/0146290 A1 | 6/2010 | Bachmann et al. |
| 2010/0174646 A1 | 7/2010 | Cole et al. |
| 2010/0228674 A1 | 9/2010 | Ogg et al. |
| 2010/0250360 A1 | 9/2010 | Ball et al. |
| 2010/0306084 A1 | 12/2010 | Ciptawilangga |
| 2011/0110516 A1 | 5/2011 | Satoh |
| 2011/0112662 A1 | 5/2011 | Thompson et al. |
| 2011/0231913 A1 | 9/2011 | Feng et al. |
| 2011/0270748 A1 | 11/2011 | Graham, III et al. |
| 2011/0302412 A1 | 12/2011 | Deng et al. |
| 2012/0078693 A1 | 3/2012 | Wilkes |
| 2012/0101886 A1 | 4/2012 | Subramanian et al. |
| 2012/0123924 A1 | 5/2012 | Rose et al. |
| 2012/0185395 A1 | 7/2012 | Wilkes |
| 2012/0239543 A1 | 9/2012 | Ryan |
| 2012/0278200 A1 | 11/2012 | van Coppenolle et al. |
| 2013/0036373 A1 | 2/2013 | Alderfer et al. |
| 2013/0041773 A1 | 2/2013 | Muse |
| 2013/0054471 A1 | 2/2013 | Samid |
| 2013/0061049 A1 | 3/2013 | Irvine |
| 2013/0159699 A1 | 6/2013 | Torkkel |
| 2013/0166455 A1 | 6/2013 | Feigelson |
| 2013/0191277 A1 | 7/2013 | O'Leary et al. |
| 2013/0232023 A2 | 9/2013 | Muse |
| 2013/0238478 A1 | 9/2013 | Bruno |
| 2013/0246233 A1 | 9/2013 | Hakim |
| 2013/0254052 A1 | 9/2013 | Royyuru et al. |
| 2013/0311266 A1 | 11/2013 | Vichich et al. |
| 2013/0311348 A1 | 11/2013 | Samid |
| 2013/0317972 A1 | 11/2013 | Morgenstern et al. |
| 2013/0317984 A1 | 11/2013 | O'Leary et al. |
| 2013/0325701 A1 | 12/2013 | Schwartz |
| 2014/0025473 A1 | 1/2014 | Cohen |
| 2014/0032267 A1 | 1/2014 | Smith et al. |
| 2014/0040157 A1 | 2/2014 | Cohen et al. |
| 2014/0081710 A1 | 3/2014 | Rabie |
| 2014/0122903 A1 | 5/2014 | Endo et al. |
| 2014/0141869 A1 | 5/2014 | Shore |
| 2014/0156497 A1 | 6/2014 | Mehew et al. |
| 2014/0164251 A1 | 6/2014 | Loh |
| 2014/0233740 A1 | 8/2014 | Niamut et al. |
| 2014/0310527 A1 | 10/2014 | Veugen et al. |
| 2014/0344015 A1 | 11/2014 | Puertolas-Montanes et al. |
| 2014/0379428 A1 | 12/2014 | Phansalkar et al. |
| 2015/0033301 A1 | 1/2015 | Pianese |
| 2015/0120567 A1 | 4/2015 | Van Rooyen et al. |
| 2015/0120569 A1 | 4/2015 | Belshe |
| 2015/0170112 A1 | 6/2015 | DeCastro |
| 2015/0188906 A1 | 7/2015 | Minov et al. |
| 2015/0193744 A1 | 7/2015 | Adleman |
| 2015/0227897 A1 | 8/2015 | Loera |
| 2015/0244690 A1 | 8/2015 | Mossbarger |
| 2015/0262137 A1 | 9/2015 | Armstrong |
| 2015/0262138 A1 | 9/2015 | Hudon |
| 2015/0262139 A1 | 9/2015 | Shtylman |
| 2015/0262140 A1 | 9/2015 | Armstrong |
| 2015/0262141 A1 | 9/2015 | Rebernik |
| 2015/0262168 A1 | 9/2015 | Armstrong |
| 2015/0262171 A1 | 9/2015 | Langschaedel |
| 2015/0262172 A1 | 9/2015 | Rebernik |
| 2015/0262173 A1 | 9/2015 | Durbin et al. |
| 2015/0262176 A1 | 9/2015 | Langschaedel et al. |
| 2015/0296379 A1 | 10/2015 | Nix |
| 2015/0310424 A1 | 10/2015 | Myers |
| 2015/0324787 A1 | 11/2015 | Schaffner |
| 2015/0332283 A1 | 11/2015 | Witchey |
| 2015/0341422 A1 | 11/2015 | Farnlof et al. |
| 2015/0348017 A1* | 12/2015 | Allmen ............... G06Q 20/401 705/76 |
| 2015/0348169 A1 | 12/2015 | Harris |
| 2015/0356523 A1 | 12/2015 | Madden |
| 2015/0356555 A1 | 12/2015 | Pennanen |
| 2015/0363777 A1 | 12/2015 | Ronca et al. |
| 2015/0363783 A1 | 12/2015 | Ronca et al. |
| 2015/0379510 A1 | 12/2015 | Smith |
| 2016/0027229 A1 | 1/2016 | Spanos et al. |
| 2016/0028552 A1 | 1/2016 | Spanos et al. |
| 2016/0078219 A1 | 3/2016 | Hernan |

(56) References Cited

U.S. PATENT DOCUMENTS

| | | | |
|---|---|---|---|
| 2016/0080156 A1 | 3/2016 | Kaliski, Jr. et al. |
| 2016/0086187 A1 | 3/2016 | Joao |
| 2016/0092988 A1 | 3/2016 | L etourneau |
| 2016/0112200 A1 | 4/2016 | Kheterpal et al. |
| 2016/0125040 A1 | 5/2016 | Kheterpal et al. |
| 2016/0134616 A1 | 5/2016 | Koushik et al. |
| 2016/0162873 A1 | 6/2016 | Zhou |
| 2016/0164678 A1 | 6/2016 | Nix |
| 2016/0203448 A1 | 7/2016 | Metnick |
| 2016/0269386 A1 | 9/2016 | Nix |
| 2017/0005804 A1 | 1/2017 | Zinder |
| 2017/0017955 A1 | 1/2017 | Stern |
| 2017/0091750 A1 | 3/2017 | Maim |
| 2017/0124535 A1 | 5/2017 | Juels |
| 2017/0132630 A1 | 5/2017 | Castinado |
| 2017/0188231 A1 | 6/2017 | Nix |
| 2017/0237561 A1 | 8/2017 | Nix |
| 2017/0302447 A1 | 10/2017 | Nix |
| 2017/0373845 A1 | 12/2017 | Nix |

FOREIGN PATENT DOCUMENTS

| | | |
|---|---|---|
| EP | 2634738 A1 | 4/2013 |
| WO | WO 00/26745 | 5/2000 |
| WO | WO2000026745 A2 | 5/2000 |
| WO | WO 01/67409 | 9/2001 |
| WO | WO 01/86373 | 11/2001 |
| WO | WO 2008/127428 | 10/2008 |
| WO | WO2011008630 | 1/2011 |
| WO | 2016-015041 | 1/2012 |
| WO | WO2013034278 A2 | 3/2013 |
| WO | WO 2015/059669 | 4/2015 |
| WO | WO 2015/085393 | 6/2015 |
| WO | WO 2015/113519 | 8/2015 |
| WO | WO 2015/179020 | 11/2015 |
| WO | WO 2016/088659 | 1/2016 |
| WO | WO 2016/022864 | 2/2016 |
| WO | WO 2016/029119 | 2/2016 |

OTHER PUBLICATIONS

"Coinsetter Launches Out of Beta, Platform Now a Full U.S.Bitcoin Exchange, Coinsetter blog (Jul. 24, 2014), http://www.coinsetter.com/blog/2014/07/24/coinsetter-launches-beta-plafform-now-full-us-bitcoin-exchange/(last visited Jul. 24, 2014)."

Request for Administrative Ruling on the Application of FinCEN's Regulations to a Virtual Currency Trading Platform, United States Department of the Treasury, FinCEN, (Oct. 27, 2014).

Request for Administrative Ruling on the Application of FinCEN's Regulations to a Virtual Currency Payment System, United States Department of the Treasury, FinCEN, (Oct. 27, 2014).

Daniel Roberts, On Winklevoss Bitcoin index, it's open season for developers, Fortune, (Jul. 22, 2014).

Evan L. Greebel et al., Recent Key Bitcoin and Virtual Currency Regulatory and Law Enforcement Developments, Virtual Currency Advisory, Katten Muchin Rosenman LLP (Nov. 13, 2014).

BTC, Google Finance, https://www.google.com/finance?q=CURRENCY%3ABTC&ei=T-euU7jVFZOUwQPNkIHYCC) (last visited Jul. 11, 2014).

Sanjay Panikkar et al., ADEPT: An IoT Practitioner Perspective, IBM (2015).

Bitcoins the hard way: Using the raw Bitcoin protocol, Ken Shirriff's blog, (Feb. 3, 2014) Internet Archive, https://web.archive.org/web/20140203192446/http://www.righto.com/2014/02/bitcoins-hard-way-using-raw-bitcoin.html.

NYC Bitcoin Exchange Coinsetter Launches Out of Beta With Institutional and Consumer Trading, MarketWatch (published Jul. 24, 2014), http://www.marketwatch.com/story/nyc-bitcoin-exchange-coinsetter-launches-out-of-beta-with-institutional-and-consumer-trading-2014-07-24 (last visited Jul. 24, 2014).

Major Bitcoin Investment Firm Launches Bitindex, The Crypto Crimson, (published Jul. 10, 2014), http://cryptocrimson.com/2014/07/major-bitcoin-investment-firm-launches-bitindex/ (last visited Jul. 11, 2014).

"We make it easy to build secure, high-level services on topof the Bitcoin protocol, Trusted Coin (Dec. 26, 2013) Internet Archive, https://web.archive.org/web/20131226232433lhttps://api.trustedcoin.com/f."

WINKBTCO Index, Bloomberg Finance L.P. (Jun. 16, 2014).

"What Is Blockchain Technology?" Quora. N.p. Jan. 15, 2009. Web. Jun. 9, 2017. <https://www.quora.com/What-is-blockchain-technology-1>.

The Ripple Network Review—What Is Ripple?, Donald McIntyre—Etherplan (Aug. 1, 2013) https://etherplan.com/2013/08/01/the-ripple-network-review-what-is-ripple/4103/, Internet.

ATMIA ATM Industry Association Position Paper, www.atmia.com, Internet.

Winklevosses' Gemini to Offer Cryptocurrency Block Trading, Olga Kharif and Matthew Leising, Bloomberg.com (Apr. 9, 2018) https://www.bloomberg.com/news/articles/2018-04-09/winklevoss-s-gemini-to-offer-cryptocurrency-block-trading, Internet.

A block chain based decentralized exchange, Harsh Patel.

Marketplace—Gemini, web.archive.org (Last modified Jan. 8, 2018) http://web.archive.org/web/20180125115941/https://gemini.com/marketplace/, Internet.

Marketplace—Gemini, web.archive.org (Last modified Nov. 25, 2017) http://web.archive.org/web/20171211092415/https://gemini.com/marketplace/, Internet.

Marketplace, Gemini.com (Last modified Sep. 20, 2018) https://gemini.com/marketplace/, Internet.

BANKEX Proof-of-Asset Protocol—The Smart White Paper, version 0.3.1 beta (Oct. 19, 2017) 36 pgs.

World Bank taps Australia's CBA for blockchain bond, Reuters, Fintech (Aug. 9, 2018) 3 pgs.

[ANN] M-of-N "Fragmented Backups" now in Armory (command-line only), Bitcoin Forum (Mar. 6, 2013), https://bitcointalk.org/index.php?topic=149820.0 (last visited Dec. 4, 2013).

2-of-3 Paper Wallets, Bitcoin Forum (published Jan. 29, 2013), https://bitcointalk.org/index.php?topic=139625.msg1487254 (last visited Dec. 4, 2013).

A Physical Price Tag for a Digital Currency. Introducing Bittag., BitTag, http://bittag.net/ (last visited Feb. 5, 2014).

A powerful trading platform for Bitcoin traders, BTXTrader.com (Aug. 13, 2013) Internet Archive, https://web.archive.org/web/20130813052513/http://www.btxtrader.com/.

About Bitcoin, Bitcoin.org (May 2, 2013) Internet Archive, http://web.archive.org/web/20130502214154/http://bitcoin.org/en/about.

An Open Source P2P Digital Currency, Bitcoin.org, http://bitcoin.org/en/ (last visited Jul. 22, 2013).

Ashlee Vance & Brad Stone, The Bitcoin-Mining Arms Race Heats Up, BloombergBusinessweek, http://www.businessweek.com/articles/2014-01-09/bitcoin-mining-chips-gear-computing-groups-competition-heats-up (last visited Jan. 9, 2014).

Bitcoin Fund Exclusively Available on EXANTE's Platform, EXANTE, https://exante.eu/press/news/266/ (last visited Oct. 10, 2013).

Bitcoin Now on Bloomberg, Bloomberg Now (Apr. 30, 2014) Internet Archive, https://web.archive.org/web/20140430184511/http://www.bloomberg.com/now/2014-04-30/bitcoin-now-bloomberg/.

Bitcoin Theft Insurance, Ecoin Club (published Dec. 3, 2013), http://ecoinclub.com/bitcoin-insurance/ (last visited Dec. 5, 2013).

Bitcoin, Wikipedia (Jun. 24, 2013), Internet Archive http://web.archive.org/web/20130624030646/http://en.wikipedia.org/wiki/Bitcoin.

Bitcoinaverage code repository, GitHub, https://github.com/bitcoinaverage/bitcoinaverage/commits/master?page=134 (last visited Feb. 24, 2014).

BitcoinAverage.com—independent bitcoin price, Bitcoin Forum, https://bitcointalk.org/index.php?topic=270190.0 (last visited Feb. 24, 2014).

BitcoinAverage.com, Reddit, http://www.reddit.com/r/Bitcoin/comments/1jl9c2/ (last visited Feb. 24, 2014).

(56) References Cited

OTHER PUBLICATIONS

Bitcoin's First Kiosk, Robocoin (Jul. 2, 2013) Internet Archive, https://web.archive.org/web/20130702171110/https://robocoinkiosk.com/.
Bitcoin's First Real ATM, Robocoin Blog, http://blog.robocoinkiosk.com/ (last visited Nov. 11, 2013).
Bitflash Weekly Review (Apr. 14, 2014), Pantera, https://panteracapital.com/bitflash/ (last visited Apr. 15, 2014).
Bob Sullivan, 'Deadbeat bidders' dog eBay sellers, NBCNews.com (published Sep. 5, 2002), http://www.nbcnews.com/id/3078738/ns/technology_and_sciencetech_and_gadgets/t/deadbeat-bidders-dog-ebay-sellers/#.U4inz_IdXuS (last visited May 30, 2014).
Brian Cohen, JPMorgan Chase Building Bitcoin-Killer, Lets Talk Bitcoin (published Dec. 9, 2013) http://letstalkbitcoin.com/jpmorgan-chase-building-bitcoin-killer/ (last visited Dec. 10, 2013).
Buying and Selling Linden Dollars, Second Life, http://community.secondlife.com/t5/English-Knowledge-Base/Buying-and-selling-Linden-dollars/ta-p/700107 (last visited Dec. 9, 2013).
Charts, Bitcoin Charts (May 10, 2013) Internet Archive, https://web.archive.org/web/20130510172057/http://bitcoincharts.com/charts/.
Choose Your Wallet, Bitcoin.org (May 30, 2013) Internet Archive, http://web.archive.org/web/20130530072551/http://bitcoin.org/en/choose-your-wallet.
Circle (May 19, 2014) Internet Archive, https://web.archive.org/web/20140519175717/https://www.circle.com/.
Coinbase, Bitcoin Wallet (Jul. 22, 2013) Internet Archive, http://web.archive.org/web/20130722200359/https://coinbase.com/.
Coinbase, Bitcoin Wallet, https://coinbase.com/ (last visited Aug. 15, 2013).
CoinDesk Bitcoin Price Index, CoinDesk, http://www.coindesk.com/price/ (last visited Oct. 23, 2013).
CoinDesk, This week we released the first version of our mobile app on iPhone, Twitter (published May 2, 2014), https://twitter.com/coindesk/status/462255287177453568?refsrc=email (last visited May 5, 2014).
Durnford, Barter network aims to help Mile End's cash-strapped live well, The Gazette [Montreal, Que] (Jan. 23, 1996).
Electrum, Bitcoin wiki, https://en.bitcoin.it/wiki/Electrum (last visited Jul. 22, 2013).
Elliptic Vault: Secure, Worry-free Storage for Your Bitcoins, Elliptic.co (Jan. 12, 2014) Internet Archive, https://web.archive.org/web/20140112043128/https://www.elliptic.co/vault.
FAQ: What's the Difference Between PPCoin and Bitcoin?, GitHub, https://github.com/ppcoin/ppcoin/wiki/FAQ (last visited Jul. 22, 2013).
First Bitcoin Capital Corp.(otc markets:BITCF) Launches Digital Currency Exchange, CoinQX.com in Beta, The Wall Street Journal MarketWatch, http://www.marketwatch.com/story/first-bitcoin-capital-corpotc-markets-bitcf-launches-digital-currency-exchange-coinqxcom-in-beta-2014-05-21 (last visited May 21, 2014).
How Bitcoin Works Under the Hood, Imponderable Things (Scott Driscoll's Blog) (published Jul. 14, 2013), http://www.imponderablethings.com/2013/07/how-bitcoin-works-under-hood.html (last visited Oct. 10, 2013).
How DigiCash Blew Everything, Next (published Jan. 1999), http://cryptome.org/jya/digicrash.htm (last visited Jan. 9, 2014).
How Does Bitcoin Work?, Bitcoin.org, (May 1, 2013) Internet Archive, http://web.archive.org/web/20130501092121/http://bitcoin.org/en/how-it-works.
How is Mt.Gox weighted average calculated?, Bitcoin Forum (Mar. 18, 2013), https://bitcointalk.org/index.php?topic=154548.0 (last visited Jul. 25, 2013).
Ina Steiner, eBay Mulls New Feature to Eliminate Deadbeat Bidders, EcommerceBytes Blog (published May 12, 2012), http://www.ecommercebytes.com/C/blog/blog.pl?/pl/2012/5/1336831866.html (last visited May 30, 2014).
Independent Bitcoin Price, BitcoinAverage, https://bitcoinaverage.com/explain.htm (last visited Mar. 4, 2014).

Introducing BDIC: Bitcoin's decentralized, privately-funded version of the FDIC, Reddit (published Dec. 4, 2013), http://www.reddit.com/r/Bitcoin/comments/1s365o/introducing_bdic_bitcoins_decentralized/ (last visited Dec. 5, 2013).
James Ball, Meet the seven people who hold the keys to worldwide internet security, The Guardian, http://www.theguardian.com/technology/2014/feb/28/seven-people-keys-worldwide-internet-security-web (last visited Mar. 7, 2014).
Jeremy Allaire, What We Have Been Up to at Circle, The Circle Blog (May 19, 2014) Internet Archive, https://web.archive.org/web/20140519162958/https://www.circle.com/2014/05/15/circle-update/.
Joe Adler, Bitcoin Backers Seek FDIC-Style Insurance, American Banker (Jan. 22, 2014), http://www.americanbanker.com/issues/179_15/bitcoin-backers-seek-fdic-style-insurance-1065089-1.html?zkPrintable=true.
John Biggs, Xapo Raises $20 Million to Bury Your Bitcoin Underground, TechCrunch (Mar. 14, 2014) Internet Archive, https://web.archive.org/web/20140314042301/http://techcrunch.com/2014/03/13/xapo-raises-20-million-to-bury-your-bitcoin-underground/.
Jon Matonis, CoinDesk Launches Proprietary Bitcoin Price Index, CoinDesk (published Sep. 11, 2013), http://www.coindesk.com/coindesk-launches-proprietary-bitcoin-price-index/ (last visited Oct. 30, 2013).
Jon Southurst, ATM Industry Association Publishes Report on Bitcoin ATMs, CoinDesk (published Mar. 20, 2014), http://www.coindesk.com/atm-industry-association-publishes-report-bitcoin-atms/ (last visited Mar. 21, 2014).
Jonathan Shieber, Circle Emerges From Stealth to Bring Bitcoin to the Masses, TechCrunch (May 18, 2014) Internet Archive, https://web.archive.org/web/20140518130248/http://techcrunch.com/2014/05/15/circle-emerges-from-stealth-to-bring-bitcoin-to-the-masses/.
Larry Ren, Proof of Stake Velocity: Building the Social Currency of the Digital Age, www.reddcoin.com (Apr. 2014).
Lisa Fleisher, London's New Bitcoin Exchange Hopes to Avoid Mt. Gox Fate, The Wall Street Journal (published Apr. 30, 2014), http://blogs.wsj.com/digits/2014/04/30/londons-new-bitcoin-exchange-hopes-to-avoid-mt-gox-fate/ (last visited May 1, 2014).
Markets API, Bitcoin Charts (Jun. 3, 2013) Internet Archive, https://web.archive.org/web/20130603091557/http://bitcoincharts.com/about/markets-api.
Max Raskin, Cameron and Tyler Winklevoss on Bitcoin and Their Public Persona, BloombergBusinessweek, http://www.businessweek.com/articles/2013-08-08/cameron-and-tyler-winklevoss-on-bitcoin-and-their-public-persona (last visited Aug. 8, 2013).
Nick Szabo, Bit gold, unenumerated.blogspot.com (Mar. 29, 2006) Internet Archive, https://web.archive.org/web/20060329122942/http://unenumerated.blogspot.com/2005/12/bit-gold.html.
Notice of References Cited, U.S. Appl. No. 12/192,809 (dated Oct. 10, 2012).
Online auctions: An in-depth look, National Consumers League, http://www.nclnet.org/personal-finance/121-online-auctions/279online-auctions-an-in-depth-look (last visited May 30, 2014).
PPCoin Proof of Stake Minting Setup Guide, Bitcoin Forum (Apr. 25, 2013) https://bitcointalk.org/index.php?topic=187714.0 (last visited Jul. 22, 2013).
PPCoin, Wikipedia, http://en.wikipedia.org/wiki/PPCoin (last visited Jul. 22, 2013).
Private Bitcoin Insurance, Inscrypto, http://go.inscrypto.com (last visited Jan. 24, 2014).
Proof-of-stake, Wikipedia, http://en.wikipedia.org/wiki/Proof-of-stake (last visited Jul. 22, 2013).
Proof-of-work System, Wikipedia, http://en.wikipedia.org/wiki/Proof-of-work (last visited Jul. 22, 2013).
Protocol of Bitcoin, Wikipedia, http://en.wikipedia.org/wiki/Bitcoin_mining (last visited Jul. 22, 2013).
Rachel Abrams, Winklevoss Twins to List Bitcoin Fund on Nasdaq, The New York Times DealB%k, http://dealbook.nytimes.com/2014/05/08/winklevoss-twins-to-list-bitcoin-fund-on-nasdaq/ (last visited May 8, 2014).
Rob Wile, Shares of No-Name Tech Company Go Crazy After It Announces Ifs Gelling Into the Bitcoin Game, Business Insider, http://www.businessinsider.com/wpcs-bitcoin-2013-12?nr_email_

(56) References Cited

OTHER PUBLICATIONS referer=1&utm_source=Triggermail&utm_medium=email&utm_content=emailshare (last visited Dec. 30, 2013).
Satoshi Nakamoto, Bitcoin: A Peer-to-Peer Electronic Cash System (Oct. 31, 2008).
Securing Your Wallet, Bitcoin.org (Jul. 21, 2013) Internet Archive, http://web.archive.org/web/20130721194621/http://bitcoin.org/en/secure-your-wallet.
Security for Your Peace of Mind, Coinbase, https://coinbase.com/security (last visited Oct. 28, 2013).
Shamir's Secret Sharing, Wikipedia, http://en.wikipedia.org/wiki/Shamirs_Secret_Sharing (last visited Jul. 22, 2013).
Some Things You Need to Know, Bitcoin.org (May 2, 2013) Internet Archive, http://web.archive.org/web/20130502051011/http://bitcoin.org/en/you-need-to-know.
Stephen Foley & Alice Ross, Bitcoin bubble grows and grows, Financial Times, http://www.ft.com/intl/cms/s/0/b4be7d8e-9c73-11e2-9a4b-00144feabdc0/html (last visited Oct. 30, 2013).
Sunny King & Scott Nadal, PPCoin: Peer-to-Peer Crypto-Currency with Proof-of-Stake, (Aug. 19, 2012).
TigerDirect.com Now Accepts Bitcoin Payments!, TigerDirect, http://www.tigerdirect.com/bitcoin/ (last visited Feb. 6, 2014).
U.S. Appl. No. 60/884,172, filed Jan. 9, 2007.
U.S. Appl. No. 61/225,256, filed Jul. 14, 2009.
USD Average Price History, BitcoinAverage, https://bitcoinaverage.com/charts.htm@USD-averages-all (last visited Feb. 24, 2014).
Using Offline Wallets in Armory, Armory (May 20, 2013) Internet Archive, http://web.archive.org/web/20130520100213/https://bitcoinarmory.com/using-offline-wallets-in-armory/.
Victoria Turk, Bitcoin 'Banks' Are Trying to Rebrand Cryptocurrencies for the Mainstream, Motherboard, http://motherboard.vice.com/en_ca/read/bitcoin-banks-try-to-rebrand-cryptocurrencies-for-the-mainstream (last visited May 5, 2014).
Why Bitcoin Is Changing the World, Bitcoin.org (Jun. 20, 2013) Internet Archive, http://web.archive.org/web/20130620062218/http://bitcoin.org/en/innovation.
Winklevoss Bitcoin Trust Amendment No. 3 to Form S-1 Registration Statement, SEC (May 8, 2014), available at http://www.sec.gov/Archives/edgar/data/1579346/000119312514190365/d721187ds1a.htm.
World Gold Council, How SPDR Gold Shares (2840 HK) are Created and Redeemed (Mar. 2013).
Bitcoin, A Primer for Policymakers(2013).
Bitcoin: a first assessment, FX and Rates | Global, Bank of America Merrill Lynch (Dec. 5, 2013).
Bitcoin: Questions, Answers, and Analysis of Legal Issues, Congressional Research Service (Dec. 20, 2013).
The audacity of bitcoin, Risks and opportunities for corporates and investors,Global Rates & FX Research, J.P. Morgan (Feb. 11, 2014), http://www.jpmorganmarkets.com/GlobalFXStrategy.
John Heggestuen, BITCOIN: How It Works, and How It Could Fundamentally Change How Companies and Individuals Handle Payments, BI Intelligence (Jan. 30, 2014).
Bitcoin: Intrinsic Value as Conduit for Disruptive Payment Network Technology, Wedbush, Computer Services: Financial Technology (Dec. 1, 2014).
Digitizing Trust: Leveraging the Bitcoin Protocol Beyond the "Coin", Wedbush, Computer Services: Financial Technology (Jan. 2, 2014).
Bitcoin: Watch the Innovation, Not the Price, Wedbush, Computer Services: Financial Technology (Feb. 14, 2014).
"How Bitcoin is Driving Digital Innovation in Entertainment, Mediaand Communications (EMC), PwC Consumer Intelligence Series, Digital Disruptor, (Jan. 27, 2014)."
Bitcoins and Banks: Problematic currency, interesting payment system, UBS, Global Research (Mar. 28, 2014).
François R. Velde, Bitcoin: A primer, The Federal Reserve Bank of Chicago, Chicago Fed Letter (Dec. 2013).
David Andolfatto, Bitcoin and Beyond: The Possibilities and Pitfalls of Virtual Currencies, Federal Reserve Bank of St. Louis, Dialogue With the Fed, Beyond Today's Financial Headlines (Mar. 31, 2014).
All About Bitcoin, Goldman Sachs, Global Macro Research, Top of Mind, Issue 21 (Mar. 11, 2014).
Julieta Duek and Demian Brener, Bitcoin: Understanding and Assessing potential Opportunities, Quasar Ventures, (Jan. 2014).
"Yacine Ghalim and Max Niederhofer, bitcoin: Primer, State of Play, Discussion, Courmayeur, Sunstone Capital (Jan. 24, 2014)."
Timing and Sizing the Era of Bitcoin, Wedbush, Computer Services: Financial Technology (May 27, 2014).
State of Bitcoin 2014, CoinDesk (Feb. 26, 2014).
Ronald A. Glantz, Pantera Primer, (Mar. 11, 2014).
Anton Badev and Matthew Chen, Bitcoin: Technical Background and Data Analysis, Finance and Economics Discussion Series, Divisions of Research & Statistics and Monetary Affairs, Federal Reserve Board, Washington, D.C. (Oct. 7, 2014).
Bitcoin Moves Closer to Regulation, Stratfor Flobal Intelligence (Jan. 29, 2015), https://www.straffor.com/sample/analysis/bitcoin-moves-closer-regulation#axzz/ (last visited Jan. 30, 2015).
BLOCKTRAIL|Bitcoin Block Explorer, Blocktrail (Aug. 18, 2014), https://www.blocktrail.com/.
Jerry Bito and Andrea Castillo, BITCOIN A Primer for Policymakers, Mercatus Center, George Mason University (2013).
Daniel Palmer, Coinfloor Plans Europe's First Bitcoin ETF, Adds USD Support, CoinDesk (Oct. 21, 2014), http://www.coindesk.com/coinfloor-launch-bitcoin-trading-fund-adds-new-currencies/ (last visited Oct. 22, 2014).
U.S. Appl. No. 61/954,434, filed Mar. 17, 2014.
U.S. Appl. No. 61/990,017, filed May 7, 2014.
U.S. Appl. No. 62/042,676, filed Aug. 27, 2014.
U.S. Appl. No. 62/056,100, filed Sep. 26, 2014.
U.S. Appl. No. 62/086,669, filed Dec. 2, 2014.
U.S. Appl. No. 62/099,992, filed Jan. 15, 2015.
David Harper, Exploring the Exponentially Weighted Moving Average, Investopedia (Mar. 18, 2007) Internet Archive, https://web.archive.org/web/20070318160651/http://www.investopedia.com/articles/07/EWMA.asp.
Ken Hawkins, Exchange-Traded Funds (ETFs), Investopedia (May 12, 2013) Internet archive, https://web.archive.org/web/20130512125447/http://www.investopedia.com/university/exchange-traded-fund/.
Proof of stake instead of proof of work, Bitcoin Forum, https://bitcointalk.org/index.php?topic=27787 (last visited Nov. 6, 2015).
Trading Namecoins for Bitcoins, Bitcoin Forum, https://bitcointalk.org/index.php?topic=6289.0 (last visited Nov. 6, 2015).
International Search Report and Written Opinion issued in Application No. PCT/US16/25189 dated Jul. 1, 2016 (15 pp.).
"Digital Currency Exchange Goes Live to Public in Melbourne, Australia," AlphaPoint, https://globenewswire.com/news-release/2015/12/10/794524/0/en/Digital-Currency-Exchange-Goes-Live-to-Public-in-Melbourne-Australia.html, Dec. 10, 2015, 3 pages.
"Nasdaq Linq Enables First-Ever Private Securities Issuance Documented with Blockchain Technology," Nasdaq, https://globenewswire.com/news-release/2015/12/30/798660/0/en/Nasdaq-Linq-Enables-First-Ever-Private-Securities-Issuance-Documented-With-Blockchain-Technology.html, Dec. 30, 2015, 3 pages.
International Search Report and Written Opinion issued in Application No. PCT/US16/040711 dated Oct. 4, 2016 (14 pages).
"Blockchain Technologies Corp Makes History, 2016 Iowa Caucus Results Forever Documented on Blockchain", https://globenewswire.com/news-release/2016/02/06/808320/10159855/en/Blockchain-Technologies-Corp-Makes-History-2016-Iowa-Caucus-Results-Forever-Documented-on-Blockchain.html, Feb. 5, 2016, 2 pages.
"AlphaPoint Announces Blockchain Solution Custom-Built for Financial Institutions," AlphaPoint, https://globenewswire.com/news-release/2015/10/26/779929/0/en/AlphaPoint-Announces-Blockchain-Solution-Custom-Built-for-Financial-Institutions.html, Oct. 26, 2015, 3 pages.
"Nasdaq Launches Enterprise-Wide Blockchain Technology Initiative", Nasdaq, https://globenewswire.com/news-release/2015/05/11/734456/10133665/en/Nasdaq-Launches-Enterprise-Wide-Blockchain-Technology-Initiative.html, May 11, 2015, 3 pages.

(56) References Cited

OTHER PUBLICATIONS

"RR Donnelley to Pursue New Blockchain-Enabled Capabilities for Publishing Industry," https://globenewswire.com/news-release/2016/03/14/819355/0/en/RR-Donnelley-to-Pursue-New-Blockchain-Enabled-Capabilities-for-Publishing-Industry.html, Mar. 14, 2016, 3 pages.

Nakamoto, S., "Bitcoin: A Peer-to-Peer Electronic Cash System," www.bitcoin.org, 9 pages.

\* cited by examiner

FIG. 2

Transaction Ledger 115

| Transaction ID | Date | Fee | Origin Identifiers | Amount from Origin | Destination Identifiers | Destination Amount |
|---|---|---|---|---|---|---|
| f06dbf23bc69b7fc1551337 3aa6e41cdc1c75da6138685 95c017b13d7b7c16552 | 2014-06-24 20:41:32 | 0 | 19Zmw5kMbKTjA7qRUdUEiwiugzRaMRRLDkh 19Zmw5kMbKTjA7qRUdUEiwiugzRaMRRLDkh | 500 500 | 122BNqyhmuUt9G9mdEm3mN4nb73c1UgNKt | 1000 |
| 9cd9cef3b96d936c8c3a1b7c 1f6a0de17a3cf694c575b7 9263Sbef85c069de58 | 2014-06-24 20:41:32 | 0.0001 | 1EwwbspD9jYbH2ZSq6TFbPxftkM8ej5YqP | 45.9983 | 1PXdpis2K3ETn9vcL4SRp3UiHxHiiMizXb 18S6XTOKH2uUJ51GG9655Rncn8YmS6jntKGC | 42.1724747 3.8257253 |
| 5f3fb8557633e61e9ab20e b461552a97423c7b3a38b7 414e7c672d41eft9c830 | 2014-06-24 20:41:32 | 0 | 1Su7FXhfiaW7EYWwiv2ayA9duahXb85Rnv | 303.92706127 | 17ZQjy7KtgfNhGVWvVLc8gdDi6ByRUgZ8G 12eqiZbQpRoYqa6BxGtWqBpBd5UpwZqCek | 154.77363532 149.15342595 |
| 535936b1996b3fcbc8d15e e38bb735c6929dtd36Qeea05 e27a19514bc4bee82d69f | 2014-06-24 20:41:32 | 0.00005 | 1JW8RphyfsnTyV4W62GHqnm9ChA2wVPvap | 18.04752292 | 1Bv9zL95kSWp3beVDtVtTNQafFauxXoUk 1GmhQNChagunagGAtVujjmqxPtK8P2y4EV | 17.2974792 0.75 |
| 4616da18de89d43f33da994 12a6fc8f70c5cD8d36637d7f b28b9ea9985f31b55ef | 2014-06-24 20:41:32 | 0.0001 | 1GD64WARGDLYG71WTTgCpRMpePr18nmGij | 5 | 1HrjLqUAer7yUNP8pPxSmhQoifGqW3NfFA 1NRNnusa3D4axxzig5fvkmX1thDnR9w3Zi 1GD64WARGDLYG71WTTgCpRMpePr18nmGij | 3.45703882 0.01388369 1.52897749 |

FIG. 2A

DASHBOARD FIAT INTERFACE

DASHBOARD FIAT INTERFACE

DASHBOARD FIAT INTERFACE

DASHBOARD FIAT INTERFACE

DASHBOARD DIGITAL ASSET INTERFACE

DASHBOARD DIGITAL ASSET INTERFACE

DASHBOARD DIGITAL ASSET INTERFACE

DASHBOARD DIGITAL ASSET INTERFACE

DASHBOARD TOKEN INTERFACE

DASHBOARD TOKEN INTERFACE

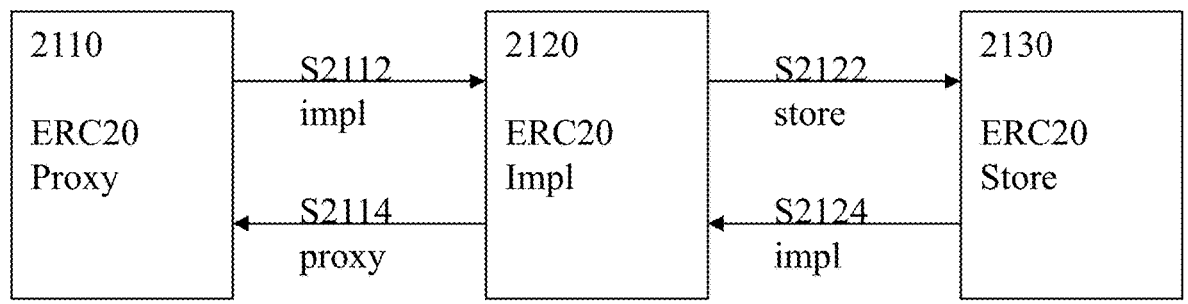
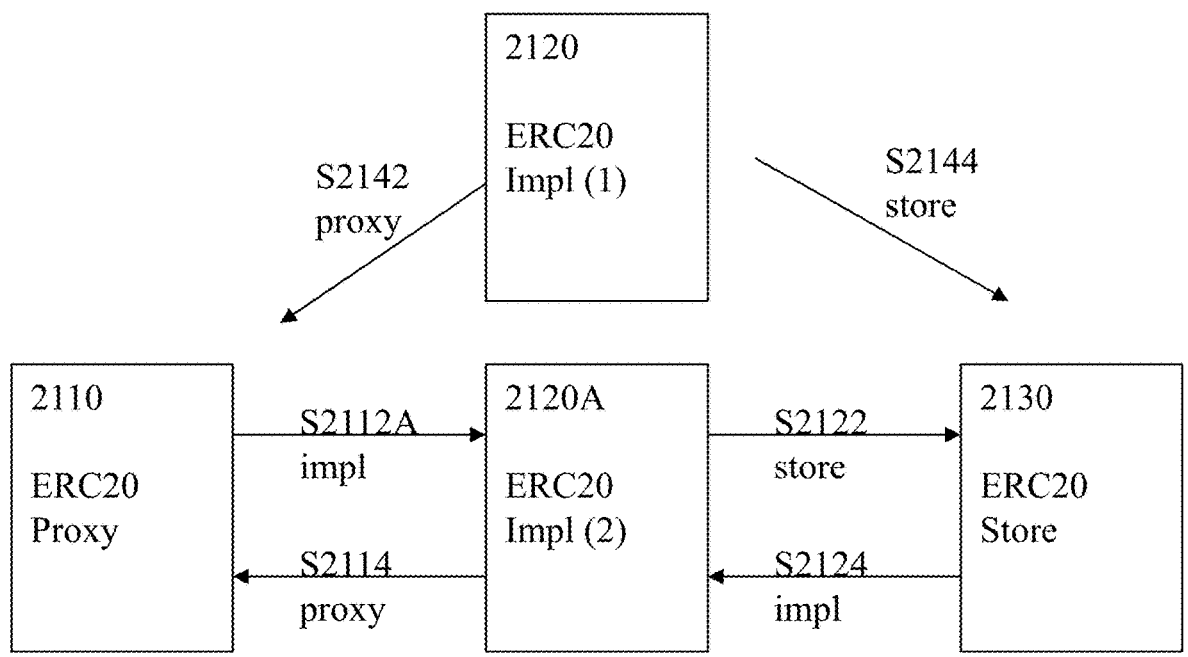
FIG. 21A
FIG. 21B

AUTONOMOUS DEVICES

CROSS-REFERENCE TO RELATED APPLICATIONS

This application claims the benefit of and priority to U.S. Provisional Patent Application Ser. No. 62/678,339, filed May 31, 2018 and entitled AUTONOMOUS DEVICES the contents of which are incorporated herein by reference in their entirety as if fully set forth herein.

This application also claims the benefit of and priority as a continuation-in-part to U.S. Ser. No. 15/071,902, filed Mar. 16, 2016 and entitled AUTONOMOUS DEVICES, which in turn claims the benefit of and priority to U.S. Provisional Patent Application Ser. No. 62/133,978, filed Mar. 16, 2015, the contents of which are incorporated herein by reference in their entirety as if fully set forth herein.

FIELD OF THE INVENTION

The present invention generally relates to autonomous devices and systems, methods, and program products for authorizing and performing transactions by autonomous devices.

BACKGROUND OF THE INVENTION

Autonomous devices and the internet of things are becoming an important part of the marketplace. Networked computers are increasingly being integrated into devices that previously required human operation, management, and/or oversight. Networked appliances and autonomous vehicles are under development. Inventors contemplate a wide range of autonomous devices that may be available with the new internet of things. Inventors further recognize that there is a growing need to enable such devices to engage in transactions and for computer equipment to address the technological challenges associated with such transactions. For example, inventors envision, by way of example, laundromat washing machines may accept payment, such as digital payment. Refrigerators may order groceries according to a predefined schedule and/or upon determining that certain supplies are low. Autonomous vehicles, drones, and/or self-driving cars may pay tolls and/or pay for fuel. Technical solutions, including new computer systems and software solutions, are required to enable autonomous devices to engage in transactions securely, such as to avoid fraudulent transactions, to protect against unauthorized transactions from being intercepted or otherwise tampered with drones, and/or to confirm a device owner's authorization for the transactions. Technical solutions are further required to verify identities of the autonomous devices and/or their owners, administrators, and/or operators. Such identities may be required to comply with identity-based regulations for financial transactions.

The present invention provides technical solutions to these technical needs.

SUMMARY OF THE INVENTION

In embodiments, an autonomous device includes: one or more processors; non-transitory computer-readable memory operatively connected to the one or more processors and having stored thereon computer-readable instructions to perform the steps of: storing, at the autonomous device, credential information including at least autonomous device digital wallet information associated with an autonomous device digital wallet; transmitting, from the autonomous device to a digital asset exchange computer system associated with a digital asset exchange, the credential information; receiving, at the autonomous device, authentication confirmation information from the digital asset exchange computer system confirming that the autonomous device is authorized to access the digital asset exchange computer system; generating, by the autonomous device, a first transaction request, the first transaction request including a first transaction amount of digital assets; and first transaction instructions to transfer the first transaction amount of digital assets to the autonomous device digital wallet; transmitting, from the autonomous device to the digital asset exchange computer system, the first transaction request; receiving, at the autonomous device, from the digital asset exchange computer system, a confirmation of transfer of the first transaction amount of digital assets to the autonomous device digital wallet, wherein the transaction is published to a decentralized digital asset ledger maintained in a distributed network in the form of a blockchain by the digital asset exchange computer system; confirming, by the autonomous device, the transfer of the first transaction amount of digital assets to the autonomous device digital wallet based on reference to the digital asset ledger; contacting, by the autonomous device, a vendor computer system associated with a vendor of products; negotiating, by the autonomous device, a second transaction amount of digital assets with the vendor computer system for at least one product to be provided to the autonomous device from the vendor of products; receiving, at the autonomous device, a transaction confirmation from the vendor computer system including vendor digital wallet information associated with a vendor digital wallet and a confirmation from the vendor of products that the second transaction amount of digital assets is acceptable; initiating, at the autonomous device, a transfer of the second transaction amount of digital assets from the autonomous device digital wallet to the vendor digital wallet; and publishing, by the autonomous device, the transaction of the second transaction amount of digital assets to the decentralized digital asset ledger.

In embodiments, the autonomous device digital wallet information includes a public key associated with the autonomous device that is also linked to an authorized user of the digital asset exchange.

In embodiments, the autonomous device digital wallet is associated with an authorized user of the digital asset exchange.

In embodiments, the product is at least one of a good and a service provided by the third party provider to the autonomous device.

In embodiments, the transfer of the first transaction amount of digital assets and the transfer of the second transaction amount of digital assets are published directly to the decentralized digital asset ledger.

In embodiments, the transfer of the first transaction amount of digital assets and the transfer of the second transaction amount of digital assets are published indirectly to the decentralized digital asset ledger. In embodiments, the transfer of the first transaction amount of digital assets and the transfer of the second transaction amount of digital assets are published to an exchange digital asset ledger, which is separate from the decentralized digital asset ledger, and published to the decentralized digital asset ledger after publication to the exchange digital asset ledger. In embodiments, transfers published on the exchange digital asset ledger are published to the decentralized digital asset ledger periodically. In embodiments, transfers published on the exchange digital asset ledger are published to the decentralized digital asset ledger aperiodically. In embodiments the transfer of the first transaction amount of digital assets is consolidated with the transfer of the second transaction amount of digital assets into a single transaction in the exchange digital asset ledger and subsequently published to the decentralized digital asset ledger as the single transaction.

In embodiments, the digital assets include at least one of bitcoin, Ethereum, Litecoin and Zcash.

In embodiments, the digital assets include a stable value digital asset.

In embodiments, the digital assets include a stable value token. In embodiments, the step of initiating, at the autonomous device, a transfer of the second transaction amount of digital assets from the autonomous device digital wallet to the vendor digital wallet includes (1) transmitting, to a stable value token issuer computer system associated with an issuer of the stable value token, transaction instructions, the transaction instructions including: (a) the autonomous device digital wallet information; (b) the vendor digital wallet information; (c) transaction instructions instructing transfer of the second transaction amount of stable value tokens from the autonomous device wallet to the vendor digital wallet; (2) receiving, at the autonomous device from the token issuer computer system, confirmation of the transfer of the second transaction amount of stable value tokens from the autonomous device wallet to the vendor digital wallet, where the transfer of the second transaction amount of stable value tokens from the autonomous device wallet to the vendor digital wallet is published to a stable value token ledger maintained in a distributed network in the form of a blockchain; and (3) confirming, at the autonomous device, the transfer of the second transaction amount of stable value tokens from the autonomous device wallet to the vendor digital wallet, on a token ledger maintained in a distributed network in the form of a blockchain.

In embodiments, the non-transitory computer-readable memory further stores computer-readable instructions to perform an additional step of determining, at the autonomous device, whether the product provided by the vendor is received by the autonomous device prior to the step (xii) of publishing the transaction of the second transaction amount of digital assets to the decentralized digital asset ledger.

In embodiments, the non-transitory computer-readable memory further stores computer-readable instructions to perform an additional step of determining, at the autonomous device, whether the product provided by the vendor is received by the autonomous device after the step (xii) of publishing the transaction of the second transaction amount of digital assets to the decentralized digital asset ledger.

In embodiments, the step of (ix) negotiating, by the autonomous device, a second transaction amount of digital assets with the vendor computer system for at least one product to be provided to the autonomous device from the vendor of products includes: (1) generating, by the autonomous device, a transaction amount bid request; (2) sending, by the autonomous device, the transaction amount bid request to one or more bidding vendor computer systems; (3) receiving, at the autonomous device, from the one or more bidding vendor computer systems, corresponding transaction amount bid responses; (4) determining, by the autonomous device, that at least one of the transaction amount bid responses satisfies predetermined criteria; (5) selecting, by the autonomous device, the bidding vendor computer system associated with the at least one of the transaction amount bid responses that satisfies predetermined criteria as the vendor computer system; and (6) sending, by the autonomous device, a transaction amount bid acceptance to the vendor computer system.

In embodiments, the step of (ix) negotiating, by the autonomous device, a second transaction amount of digital assets with the vendor computer system for at least one product to be provided to the autonomous device from the vendor of products includes: (1) accessing, by the autonomous device, sets of vendor data associated with potential vendors of products; (2) determining, by the autonomous device, that at least one set of vendor data satisfies predetermined criteria; and (3) selecting, by the autonomous device, the potential vendor of products associated with the at least one set of vendor data that satisfies predetermined criteria as the vendor of products.

In embodiments, an autonomous device includes: one or more processors; non-transitory computer-readable memory operatively connected to the one or more processors and having stored thereon computer-readable instructions to perform the steps of: receiving, at the autonomous device, a negotiation request from a third party requester computer system associated with a third party requester, the negotiation request including an identification of a product that the third party requester desires from the autonomous device; determining, at the autonomous device, a first transaction amount in digital assets for the product that the third party requester desires from the autonomous device; generating, at the autonomous device, a transaction response including the first transaction amount; transmitting, from the autonomous device to the third party requester, the transaction response; receiving, at the autonomous device, a transaction confirmation from the third party requester computer system, the transaction confirmation including at least: third party requester digital wallet information associated with a third party requester digital wallet; and transaction instructions directing a transfer of the first transaction amount of digital assets to be transferred from the third party requester digital wallet to an autonomous device digital wallet; (vi) initiating, at the autonomous device, the transfer of the first transaction amount of digital assets from the third party requester digital wallet to the autonomous device digital wallet; (vii) publishing, by the autonomous device, the transfer of the first transaction amount of digital assets from the third party requester digital wallet to the autonomous device digital wallet in a decentralized digital asset ledger maintained in a distributed network in the form of a blockchain; (viii) confirming, at the autonomous device, the transfer of the first transaction amount of digital assets from the third party requester digital wallet to the autonomous device digital wallet based on reference to the decentralized digital asset ledger; (ix) contacting, by the autonomous device, a digital asset exchange computer system associated with a digital asset exchange, including transmitting to the digital asset exchange computer system credential information associated with the autonomous device, the credential information including autonomous device digital wallet information; (x) receiving, at the autonomous device, authentication confirmation from the digital asset exchange computer system confirming that the autonomous device is authorized to access the digital asset exchange computer system and authorized user digital wallet information associated with an authorized user of the digital asset exchange computer system and to the autonomous device digital wallet; (xi) generating, at the autonomous device, a second transaction request including: (1) a second transaction amount of digital assets, (2) a digital signature of the autonomous device; and (3) transaction instructions instructing transfer of the second transaction amount of digital assets from the autonomous device digital wallet to an exchange digital wallet associated with an authorized user of the digital asset exchange; (xii) transmitting, by the autonomous device, the second transaction request to the digital asset exchange computer system; and (xiii) receiving, at the autonomous device, from the digital asset exchange computer system, a confirmation of the transfer of the second transaction amount of digital assets to the exchange digital wallet associated with the authorized user of the digital asset exchange, wherein the transfer of the second transaction amount of digital assets to the exchange digital wallet is published to the decentralized digital asset ledger by the digital asset exchange computer system.

In embodiments, the autonomous device digital wallet information includes a public key associated with the autonomous device that is also linked to the exchange digital wallet of the authorized user of the digital asset exchange. In embodiments, the autonomous device digital wallet information is associated with the authorized user of the digital asset exchange computer system. In embodiments, the product is at least one of a good or service provided by the autonomous device to the third party requester. In embodiments, the transfer of the first amount of digital assets and the transfer of the second amount of digital assets are published directly to the decentralized digital asset ledger. In embodiments, the transfer of the first amount of digital assets and the transfer of the second amount of digital assets are published directly to the decentralized digital asset ledger. In embodiments, the transfer of the first amount of digital assets and the transfer of the second amount of digital assets are published to an exchange digital asset ledger, which is separated from the decentralized digital asset ledger, and published to the decentralized digital asset ledger after the publication of the transfers to the exchange digital asset ledger. In embodiments, the transfer of the first amount of digital assets is consolidated with the transfer of the second amount of digital assets in the exchange digital ledger as a single transaction. In embodiments, transfers published on the exchange digital asset ledger are published to the decentralized digital asset ledger periodically. In embodiments, transfers published on the exchange digital asset ledger are published to the decentralized digital asset ledger aperiodically.

In embodiments, the digital assets include at least one of bitcoin, Ethereum, Litecoin and Zcash.

In embodiments, the digital assets include a stable value digital asset.

In embodiments, the digital assets include a stable value token.

In embodiments, the step of initiating, at the autonomous device, the transfer of the first transaction amount of digital assets from the third party requester digital wallet to the autonomous device digital wallet includes: (1) transmitting, to a stable value token issuer computer system associated with an issuer of the stable value token, transaction instructions, the transaction instructions including: (a) the autonomous device digital wallet information; (b) the third party requester digital wallet information; and (c) transaction instructions for transfer of the first transaction amount of stable value tokens from the third party requester digital wallet to the autonomous device digital wallet; (2) receiving, at the autonomous device, from the token issuer computer system, confirmation of the transfer of the first transaction amount of stable value tokens from the third party requester digital wallet to the autonomous device digital wallet; and (3) confirming, at the autonomous device, the transfer of the first transaction amount of stable value tokens from the third party requester digital wallet to the autonomous device digital wallet, on a token ledger maintained in a distributed network in the form of a blockchain.

In embodiments, the step of (ii) determining, at the autonomous device, a first transaction amount in digital assets for the product that the third party requester desires from the autonomous device includes: (1) at least one of determining or referencing, by the autonomous device, transaction amounts for the product as offered by one or more other vendors of the product; and (2) selecting, by the autonomous device, a first transaction amount in digital assets based on the at least one of determined or referenced transaction amounts.

In embodiments, the step of (ii) determining, at the autonomous device, a first transaction amount in digital assets for the product that the third party requester desires from the autonomous device includes: (1) referencing, by the autonomous device, a transaction amount for the product in accordance with a fixed-price schedule; and (2) selecting, by the autonomous device, a first transaction amount in digital assets that is equal to or within a predetermined range of the referenced transaction amount.

In embodiments, an autonomous device can comprise one or more processors and non-transitory computer-readable memory operatively connected to the one or more processors and having stored thereon computer-readable instructions to perform the steps of generating, by the autonomous device, a first hash value of a chain of hash values by applying a hash algorithm to first data including first new data and a first previous hash value of the chain of hash values, the first previous hash value computed by applying the hash algorithm to first previous data; transmitting, from the autonomous device to a digital asset transaction computer system, the first hash value and the first new data; generating, by the autonomous device, a first signed electronic transaction request comprising (1) first transaction data comprising a sending account identifier associated with the first autonomous device, a destination account identifier, a transaction amount, and a timestamp, and (2) a first autonomous device digital signature generated using a first private key of a first autonomous device asymmetric key pair; and transmitting, from the autonomous device to the digital asset transaction computer system, the first signed electronic transaction request.

In embodiments, the first new data can comprise at least a portion of the first signed electronic transaction request. In embodiments, the first new data can comprise a timestamp. In embodiments, the first new data can comprise position data associated with a location of the autonomous device.

In embodiments, the first hash value may be generated and transmitted according to a periodic schedule for the chain of hash values.

In embodiments, the autonomous device may be further configured to perform the steps of receiving, at the autonomous device from a destination device associated with the destination account identifier, a signed electronic offer comprising the destination account identifier, the transaction amount, and a destination device digital signature generated using a second private key of a destination device asymmetric key pair, and providing, from the autonomous device to the digital asset transaction computer system, the signed electronic offer.

In embodiments, a digital asset transaction computer system may receive from a first autonomous device a first signed electronic transaction request. The first signed electronic transaction request may comprise first transaction data, which may comprise a sending account identifier associated with the first autonomous device, a destination account identifier, a transaction amount, and a timestamp. The first transaction data may further comprise a first autonomous device digital signature generated using a first private key of a first autonomous device asymmetric key pair to encrypt the first transaction data.

The digital asset transaction computer system may receive from the first autonomous device a first hash value in a chain of hash values, wherein the first hash value was computed by applying a hash algorithm to first data, including first new data and a first previous hash value in the chain of hash values, the first previous hash value computed by applying the hash algorithm to first previous data not including the first new data.

The digital asset transaction computer system may authenticate the first signed electronic transaction request by (1) verifying the first autonomous device digital signature by decrypting, using a first public key of the first autonomous device asymmetric key pair, the encrypted first transaction data, and verifying that the decrypted first transaction data equals the received first transaction data, and (2) performing fraud detection to evaluate authenticity of the first autonomous device by accessing a first stored previous hash value stored in association with the first autonomous device in non-transitory computer-readable memory operatively connected to the digital asset transaction computer system, wherein the first stored previous hash value is a stored copy of the previous hash value, computing a verification hash value by applying the hash algorithm to the first new data and the first stored previous hash value, and verifying that the verification hash value equals the first hash value to determine that no other hash values have been received, either from the first autonomous device or from a second device posing as the first autonomous device, between receipt of the first previous hash value and receipt of the first hash value.

The digital asset transaction computer system may determine authorization to execute a first transaction according to the first signed electronic transaction request by identifying a first account associated with the first autonomous device, retrieving, from a first database, first transaction rules governing the allowable transactions associated with the first account, and evaluating the first transaction rules at least with respect to the first transaction data. The digital asset transaction computer system may the execute the first transaction.

In embodiments, the first account may be a first sub-account subordinate to a master digital asset account.

In embodiments, the first transaction rules may be unique to the first sub-account. The first transaction rules may be associated with the master account and apply to a plurality of sub-accounts subordinate to the master account including the first sub-account.

In embodiments, the first hash value is received along with the first signed electronic transaction request. In embodiments, the first hash value may be received as part of a periodic transmission of hash values of the chain of hash values from the first autonomous device.

In embodiments, the first data may comprise at least a portion of the first signed electronic transaction request.

In embodiments, the digital asset transaction computer system may transmit to an electronic address associated with the destination account identifier an electronic indication of an identity associated with the first autonomous device. In embodiments, the electronic indication of the identity associated with the first autonomous device may comprise an identification of the owner of the master account.

In embodiments, executing the first transaction may comprise transmitting, by the digital asset transaction computer system to a digital asset network, an electronic indication of the executed transaction for inclusion in a distributed public electronic ledger that records digital asset transactions among nodes in the digital asset network.

In embodiments, the digital asset transaction computer system may transmit to a destination autonomous device associated with the destination account identifier an electronic indication of the executed transaction.

In embodiments, the digital asset transaction computer system may receive from a second device a second signed electronic transaction request comprising (1) second transaction data comprising the sending account identifier associated with the first autonomous device, a second destination account identifier, a second transaction amount, and a second timestamp, and (2) an apparent autonomous device digital signature generated using the first private key of the first autonomous device asymmetric key pair. The digital asset transaction computer system may receive from the second device, a second hash value and second new data and verify the validity of the second signed electronic transaction request by (1) verifying using the first public key of the first autonomous device asymmetric key pair, the apparent autonomous device digital signature, and (2) evaluating the authenticity of the second device by accessing a second stored previous hash value stored in association with the first autonomous device in the non-transitory computer-readable memory, computing a second verification hash value by applying the hash algorithm to the second new data and the second stored previous hash value, and determining that the second verification hash value does not equal the second hash value. The digital asset transaction computer system may reject the second signed electronic transaction request. The digital asset transaction computer system may store a warning indicator to reject future transaction requests apparently received from the first autonomous device.

In embodiments, the digital asset transaction computer system may, prior to executing the first transaction, receive a signed electronic offer comprising the destination account identifier, the transaction amount, and a destination device digital signature generated using a second private key of a destination device asymmetric key pair. The digital asset transaction computer system may verify that the destination account identifier is associated with a digital asset account having an owner with an identity known to the digital asset transaction computer system. In embodiments, the signed electronic offer may be received from a destination autonomous device associated with the destination account identifier. In embodiments, the signed electronic offer may be received from the first autonomous device, which received the signed electronic offer from a destination autonomous device associated with the destination account identifier.

In embodiments, an autonomous device includes: (a) one or more processors; (b) non-transitory computer-readable memory operatively connected to the one or more processors and having stored thereon computer-readable instructions to perform the steps of: (i) storing, at the autonomous device, credential information including at least autonomous device digital wallet information associated with an autonomous device digital wallet; (ii) transmitting, from the autonomous device to a digital asset exchange computer system associated with a digital asset exchange, the credential information; (iii) receiving, at the autonomous device, authentication confirmation information from the digital asset exchange computer system confirming that the autonomous device is authorized to access the digital asset exchange computer system; (iv) generating, by the autonomous device, a first transaction request, the first transaction request including: (1) a first transaction amount of digital assets; and (2) first transaction instructions to transfer the first transaction amount of digital assets to the autonomous device digital wallet; (v) transmitting, from the autonomous device to the digital asset exchange computer system, the first transaction request; (vi) receiving, at the autonomous device, from the digital asset exchange computer system, a confirmation of transfer of the first transaction amount of digital assets to the autonomous device digital wallet, wherein the transaction is published to a digital asset ledger maintained in a distributed network in the form of a blockchain by the digital asset exchange computer system; (vii) confirming, by the autonomous device, the transfer of the first transaction amount of digital assets to the autonomous device digital wallet based on reference to the digital asset ledger; (viii) contacting, by the autonomous device, a vendor computer system associated with a vendor of products; (ix) negotiating, by the autonomous device, a second transaction amount of digital assets with the vendor computer system for at least one product to be provided to the autonomous device from the vendor of products; (x) receiving, at the autonomous device, a transaction confirmation from the vendor computer system including vendor digital wallet information associated with a vendor digital wallet and a confirmation from the vendor of products that the second transaction amount of digital assets is acceptable; (xi) initiating, at the autonomous device, a transfer of the second transaction amount of digital assets from the autonomous device digital wallet to the vendor digital wallet; and (xii) publishing, by the autonomous device, the transaction of the second transaction amount of digital assets to the digital asset ledger.

In embodiments, the autonomous device digital wallet information includes a public key associated with the autonomous device that is also linked to an authorized user of the digital asset exchange.

In embodiments, the autonomous device digital wallet is associated with an authorized user of the digital asset exchange.

In embodiments, the product is at least one of a good and a service provided by the third party provider to the autonomous device.

In embodiments, the transfer of the first transaction amount of digital assets and the transfer of the second transaction amount of digital assets are published directly to the digital asset ledger.

In embodiments, the transfer of the first transaction amount of digital assets and the transfer of the second transaction amount of digital assets are published indirectly to the digital asset ledger.

In embodiments, the transfer of the first transaction amount of digital assets and the transfer of the second transaction amount of digital assets are published to an exchange digital asset ledger, which is separate from the digital asset ledger, and published to the digital asset ledger after publication to the exchange digital asset ledger.

In embodiments, transfers published on the exchange digital asset ledger are published to the digital asset ledger periodically.

In embodiments, transfers published on the exchange digital asset ledger are published to the digital asset ledger aperiodically.

In embodiments, the transfer of the first transaction amount of digital assets is consolidated with the transfer of the second transaction amount of digital assets into a single transaction in the exchange digital asset ledger and subsequently published to the digital asset ledger as the single transaction.

In embodiments, the digital assets include a stable value digital asset.

In embodiments, the digital assets include a stable value token.

In embodiments, the step of initiating, at the autonomous device, a transfer of the second transaction amount of digital assets from the autonomous device digital wallet to the vendor digital wallet includes: (1) transmitting, to a stable value token issuer computer system associated with an issuer of the stable value token, transaction instructions, the transaction instructions including: (a) the autonomous device digital wallet information; (b) the vendor digital wallet information; (c) transaction instructions instructing transfer of the second transaction amount of stable value tokens from the autonomous device wallet to the vendor digital wallet; (2) receiving, at the autonomous device from the token issuer computer system, confirmation of the transfer of the second transaction amount of stable value tokens from the autonomous device wallet to the vendor wallet, where the transfer of the second transaction amount of stable value tokens from the autonomous device wallet to the vendor digital wallet is published to a stable value token ledger maintained in a distributed network in the form of a blockchain; and (3) confirming, at the autonomous device, the transfer of the second transaction amount of stable value tokens from the autonomous device wallet to the vendor digital wallet, on a token ledger maintained in a distributed network in the form of a blockchain.

In embodiments, the non-transitory computer-readable memory further stores computer-readable instructions to perform an additional step of determining, at the autonomous device, whether the product provided by the vendor is received by the autonomous device prior to the step (xii) of publishing the transaction of the second transaction amount of digital assets to the digital asset ledger.

In embodiments, the non-transitory computer-readable memory further stores computer-readable instructions to perform an additional step of determining, at the autonomous device, whether the product provided by the vendor is received by the autonomous device after the step (xii) of publishing the transaction of the second transaction amount of digital assets to the digital asset ledger.

In embodiments, an autonomous device includes: (a) one or more processors; (b) non-transitory computer-readable memory operatively connected to the one or more processors and having stored thereon computer-readable instructions to perform the steps of: (i) receiving, at the autonomous device, a negotiation request from a third party requester computer system associated with a third party requester, the negotiation request including an identification of a product that the third party requester desires from the autonomous device; (ii) determining, at the autonomous device, a first transaction amount in digital assets for the product that the third party requester desires from the autonomous device; (iii) generating, at the autonomous device, a transaction response including the first transaction amount; (iv) transmitting, from the autonomous device to the third party requester, the transaction response; (v) receiving, at the autonomous device, a transaction confirmation from the third party requester computer system, the transaction confirmation including at least: (1) third party requester digital wallet information associated with a third party requester digital wallet; and (2) transaction instructions directing a transfer of the first transaction amount of digital assets to be transferred from the third party requester digital wallet to an autonomous device digital wallet; (vi) initiating, at the autonomous device, the transfer of the first transaction amount of digital assets from the third party requester digital wallet to the autonomous device digital wallet; (vii) publishing, by the autonomous device, the transfer of the first transaction amount of digital assets from the third party requester digital wallet to the autonomous device digital wallet in a digital asset ledger maintained in a distributed network in the form of a blockchain; (viii) confirming, at the autonomous device, the transfer of the first transaction amount of digital assets from the third party requester digital wallet to the autonomous device digital wallet based on reference to the digital asset ledger; (ix) contacting, by the autonomous device, a digital asset exchange computer system associated with a digital asset exchange, including transmitting to the digital asset exchange computer system credential information associated with the autonomous device, the credential information including autonomous device digital wallet information; (x) receiving, at the autonomous device, authentication confirmation from the digital asset exchange computer system confirming that the autonomous device is authorized to access the digital asset exchange computer system and authorized user digital wallet information associated with an authorized user of the digital asset exchange computer system and to the autonomous device digital wallet; (xi) generating, at the autonomous device, a second transaction request including: (1) a second transaction amount of digital assets, (2) a digital signature of the autonomous device; and (3) transaction instructions instructing transfer of the second transaction amount of digital assets from the autonomous device digital wallet to an exchange digital wallet associated with an authorized user of the digital asset exchange; (xii) transmitting, by the autonomous device, the second transaction request to the digital asset exchange computer system; and (xiii) receiving, at the autonomous device, from the digital asset exchange computer system, a confirmation of the transfer of the second transaction amount of digital assets to the exchange digital wallet associated with the authorized user of the digital asset exchange, wherein the transfer of the second transaction amount of digital assets to the exchange digital wallet is published to the digital asset ledger by the digital asset exchange computer system.

In embodiments, the autonomous device digital wallet information includes a public key associated with the autonomous device that is also linked to the exchange digital wallet of the authorized user of the digital asset exchange.

In embodiments, the autonomous device digital wallet information is associated with the authorized user of the digital asset exchange computer system.

In embodiments, the product is at least one of a good or service provided by the autonomous device to the third party requester.

In embodiments, the transfer of the first amount of digital assets and the transfer of the second amount of digital assets are published directly to the digital asset ledger.

In embodiments, the transfer of the first amount of digital assets and the transfer of the second amount of digital assets are published directly to the digital asset ledger.

In embodiments, the transfer of the first amount of digital assets and the transfer of the second amount of digital assets are published to an exchange digital asset ledger, which is separated from the digital asset ledger, and published to the digital asset ledger after the publication of the transfers to the exchange digital asset ledger.

In embodiments, the transfer of the first amount of digital assets is consolidated with the transfer of the second amount of digital assets in the exchange digital ledger as a single transaction.

In embodiments, transfers published on the exchange digital asset ledger are published to the digital asset ledger periodically.

In embodiments, transfers published on the exchange digital asset ledger are published to the digital asset ledger aperiodically.

In embodiments, the digital assets include a stable value digital asset.

In embodiments, the digital assets include a stable value token.

In embodiments the step of initiating, at the autonomous device, the transfer of the first transaction amount of digital assets from the third party requester digital wallet to the autonomous device digital wallet includes: (1) transmitting, to a stable value token issuer computer system associated with an issuer of the stable value token, transaction instructions, the transaction instructions including: (a) the autonomous device digital wallet information; (b) the third party requester digital wallet information; and (c) transaction instructions instructing transfer of the first transaction amount of stable value tokens from the third party requester digital wallet to the autonomous device digital wallet; (2) receiving, at the autonomous device, from the token issuer computer system, confirmation of the transfer of the first transaction amount of stable value tokens from the third party requester digital wallet to the autonomous device digital wallet; and (3) confirming, at the autonomous device, the transfer of the first transaction amount of stable value tokens from the third party requester digital wallet to the autonomous device digital wallet, on a token ledger maintained in a distributed network in the form of a blockchain.

In embodiments the digital assets include at least one of bitcoin, Ethereum, Ripple, Cardano, Litecoin, NEO, Stellar, IOTA, NEM, Dash, Monero, Lisk, Qtum, Zcash, Nano, Steem, Bytecoin, Verge, Siacoin, Stratis, BitShares, Dogecoin, Waves, Decred, Ardor, Hshare, Komodo, Electroneum, Ark, DigiByte, E-coin, ZClassic, Byteball Bytes, PIVX, Cryptonex, GXShares, Syscoin, Bitcore, Factom, MonaCoin, ZCoin, SmartCash, Particl, Nxt, ReddCoin, Emercoin, Experience Points, Neblio, Nexus, Blocknet, GameCredits, DigitalNote, Vertcoin, BitcoinDark, Skycoin, ZenCash, NAV Coin, Achain, HTMLCOIN, Ubiq, BridgeCoin, Peercoin, PACcoin, XTRABYTES, Einsteinium, Asch, Gas, Counterparty, BitBay, Viacoin, Rise, Guiden, ION, Metaverse ETP, LBRY Credits, Crown, Electra, Burst, MinexCoin, Aeon, SaluS, DECENT, CloakCoin, Pura, ECC, DeepOnion, Groesticoin, Lykke, Steem Dollars, I/O Coin, Shift, HempCoin, Mooncoin, Dimecoin, Namecoin, Feathercoin, Diamond, Spectrecoin, Filecoin and Tezos.

BRIEF DESCRIPTION OF THE DRAWINGS

Exemplary embodiments of the present invention will be described with references to the accompanying figures, wherein:

Figure 2A:
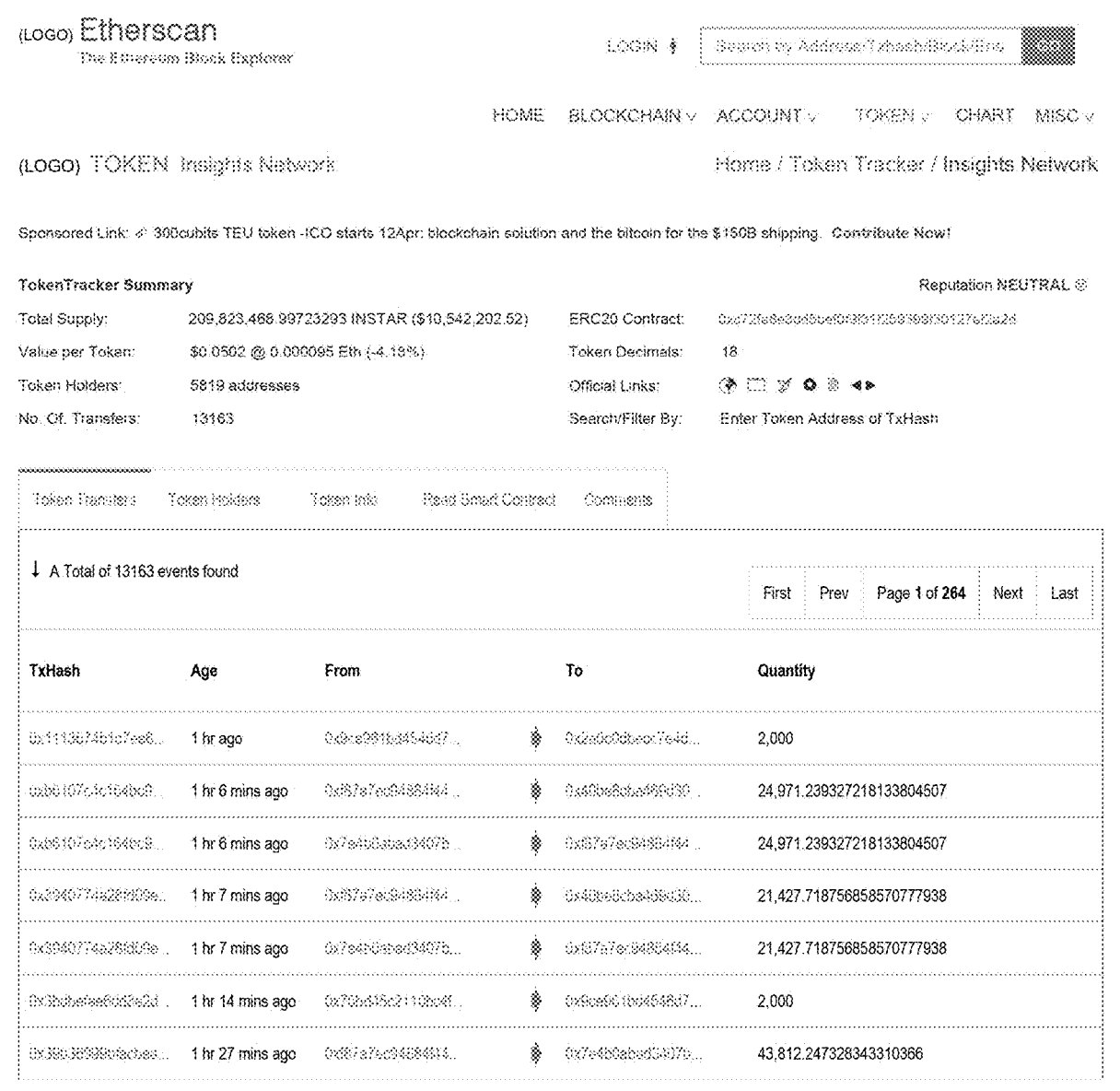

FIG. 2 is an exemplary screen shot of an excerpt of an exemplary bitcoin transaction log showing addresses in accordance with exemplary embodiments of the present invention;

FIG. 2A is an exemplary screen shot of a token ledger in accordance with embodiments of the present invention;

FIGS. 9A-1 through 9A-4 illustrate exemplary embodiments of a dashboard fiat interface which allows registered users to deposit and/or withdraw fiat with the digital asset exchange;

FIGS. 9B-1 through 9B-4 exemplary embodiments of a dashboard digital asset interface which allows registered users to deposit and/or withdrawal digital assets with the digital asset exchange system;

FIGS. 9C-1 and 9C-2 illustrate exemplary embodiments of a dashboard token interface which allows registered users to purchase and/or redeem tokens with the digital asset exchange system;

FIGS. 21A-H illustrate exemplary embodiments of a token that utilizes smart contracts in accordance with an embodiment of the present invention.

DETAILED DESCRIPTION OF THE INVENTION

Figure 1:
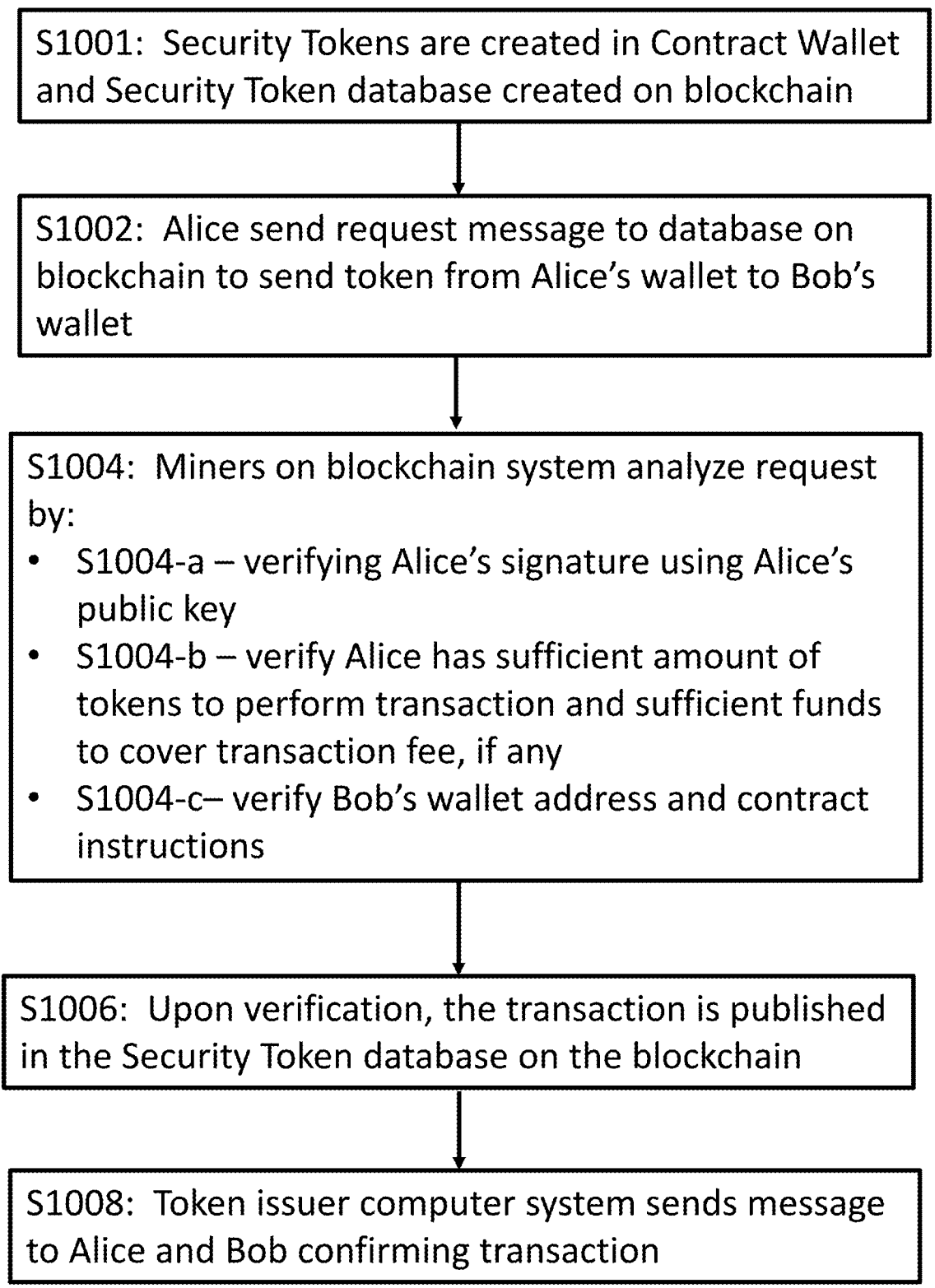
FIG. 1 is an exemplary flow chart of a process for sending tokens from Alice to Bob on the Ethereum blockchain in accordance with exemplary embodiments of the present invention.

The present invention generally relates to autonomous devices and systems, methods, and program products for authorizing and performing transactions by autonomous devices. Autonomous devices may comprise one or more processors and non-transitory computer-readable memory with one or more software modules stored thereon and running or configured to run on the one or more processors. The software modules may comprise programmed rules and/or may be configured to develop rules to govern device behavior. Autonomous devices may request to engage in transactions (e.g., from a user device operated by a user, from a vendor, and/or from a financial management system). Autonomous devices may engage in transactions autonomously, in response to user requests (e.g., received from a user device or via an input device), or in response to pre-programmed rules (e.g., to make a purchase when programmed thresholds are reached or exceeded). Accordingly, autonomous devices may act as agents of a user (e.g., who is the principal in the agency relationship) to carry out one or more functions involving a financial transaction, such as executing a purchase. In embodiments, such functions can include shopping and/or transportation (e.g., where the financial transaction comprises a fuel payment, a toll payment, a rental payment for use of the autonomous device, to name a few).

Autonomous devices may be pre-authorized to engage in transactions (such as an electric car recharging or a car with a gas engine filling its gas tank) on behalf of a user. The autonomous device may transact using an account (e.g., a sub-account) associated with a user financial account. The user financial account may be in a bank, a brokerage of digital asset exchange, to name a few. The user may set rules governing use of the account (e.g., frequency of transactions, spending limits, automated account replenishment rules, transaction pre-approval rules (e.g., requiring pre-approval for certain transactions or certain devices, and/or providing pre-approval for certain transactions or certain devices). Transaction rules may comprise fixed amounts, percentages, periods of time, and/or rates, to name a few.

In the exemplary systems illustrated in the figures described herein, each computer system may include one or more processors and non-transitory computer-readable memory with one or more software modules stored thereon and running or configured to run on the one or more processors. Each computer system may also include one or more communication portals, which may handle, process, support, and/or perform wired and/or wireless communications (e.g., transmitting and/or receiving data). Communications systems can comprise hardware (e.g., hardware for wired and/or wireless connections) and/or software. In embodiments, communications systems can include one or more communications chipsets, such as a GSM chipset, CDMA chipset, LTE chipset, Wi-Fi chipset, Bluetooth chipset, to name a few, and/or combinations thereof. Wired connections may be adapted for use with cable, plain old telephone service (POTS) (telephone), fiber (such as Hybrid Fiber Coaxial), xDSL, to name a few, and wired connections may use coaxial cable, fiber, copper wire (such as twisted pair copper wire), and/or combinations thereof, to name a few. Wired connections may be provided through telephone ports, Ethernet ports, USB ports, and/or other data ports, such as Apple 30-pin connector ports or Apple Lightning connector ports, to name a few. Wireless connections may include cellular or cellular data connections and protocols (e.g., digital cellular, PCS, CDPD, GPRS, EDGE, CDMA2000, 1×RTT, Ev-DO, HSPA, UMTS, 3G, 4G, and/or LTE, to name a few), Bluetooth, Bluetooth Low Energy, Wi-Fi, radio, satellite, infrared connections, ZigBee communication protocols, to name a few. Communications interface hardware and/or software, which may be used to communicate over wired and/or wireless connections, may comprise Ethernet interfaces (e.g., supporting a TCP/IP stack), X.25 interfaces, Ti interfaces, and/or antennas, to name a few. Computer systems may communicate with other computer systems or devices directly and/or indirectly, e.g., through a data network 5, such as the Internet, a telephone network, a mobile broadband network (such as a cellular data network), a mesh network, Wi-Fi, WAP, LAN, and/or WAN, to name a few.

In embodiments a digital asset may refer to at least one of bitcoin, Ethereum, Ripple, Cardano, Litecoin, NEO, Stellar, IOTA, NEM, Dash, Monero, Lisk, Qtum, Zcash, Nano, Steem, Bytecoin, Verge, Siacoin, Stratis, BitShares, Dogecoin, Waves, Decred, Ardor, Hshare, Komodo, Electroneum, Ark, DigiByte, E-coin, ZClassic, Byteball Bytes, PIVX, Cryptonex, GXShares, Syscoin, Bitcore, Factom, MonaCoin, ZCoin, SmartCash, Particl, Nxt, ReddCoin, Emercoin, Experience Points, Neblio, Nexus, Blocknet, GameCredits, DigitalNote, Vertcoin, BitcoinDark, Skycoin, ZenCash, NAV Coin, Achain, HTMLCOIN, Ubiq, BridgeCoin, Peercoin, PACcoin, XTRABYTES, Einsteinium, Asch, Gas, Counterparty, BitBay, Viacoin, Rise, Guiden, ION, Metaverse ETP, LBRY Credits, Crown, Electra, Burst, MinexCoin, Aeon, SaluS, DECENT, CloakCoin, Pura, ECC, DeepOnion, Groesticoin, Lykke, Steem Dollars, I/O Coin, Shift, HempCoin, Mooncoin, Dimecoin, Namecoin, Feathercoin, Diamond, Spectrecoin, Filecoin and Tezos.

Exemplary embodiments of the invention are described herein with respect to autonomous devices. However, the identity authentication systems and processes of the present invention may be applied to any user, device (autonomous or user-controlled), and/or account requiring identity verification and/or fraud detection.

Digital Math-Based Assets and Bitcoin

A digital math-based asset is a kind of digital asset based upon a computer generated mathematical and/or cryptographic protocol that may, among other things, be exchanged for value and/or be used to buy and sell goods or pay for services. A digital math-based asset may be a non-tangible asset that is not based upon a governmental rule, law, regulation, and/or backing. The Bitcoin system represents one form of digital math-based asset.

A bitcoin may be a unit of the Bitcoin digital math-based asset. Other examples of digital math-based assets include Ethereum, Ripple, Cardano, Litecoin, NEO, Stellar, IOTA, NEM, Dash, Monero, Lisk, Qtum, Zcash, Nano, Steem, Bytecoin, Verge, Siacoin, Stratis, BitShares, Dogecoin, Waves, Decred, Ardor, Hshare, Komodo, Electroneum, Ark, DigiByte, E-coin, ZClassic, Byteball Bytes, PIVX, Cryptonex, GXShares, Syscoin, Bitcore, Factom, MonaCoin, ZCoin, SmartCash, Particl, Nxt, ReddCoin, Emercoin, Experience Points, Neblio, Nexus, Blocknet, GameCredits, DigitalNote, Vertcoin, BitcoinDark, Skycoin, ZenCash, NAV Coin, Achain, HTMLCOIN, Ubiq, BridgeCoin, Peercoin, PACcoin, XTRABYTES, Einsteinium, Asch, Gas, Counterparty, BitBay, Viacoin, Rise, Guiden, ION, Metaverse ETP, LBRY Credits, Crown, Electra, Burst, MinexCoin, Aeon, SaluS, DECENT, CloakCoin, Pura, ECC, DeepOnion, Groesticoin, Lykke, Steem Dollars, I/O Coin, Shift, HempCoin, Mooncoin, Dimecoin, Namecoin, Feathercoin, Diamond, Spectrecoin, Filecoin and Tezos, to name a few. In embodiments, digital math-based assets, such as bitcoin, may be accepted in trade by merchants, other businesses, and/or individuals in many parts of the world.

In embodiments, a digital math-based asset may be based on an open source mathematical and/or cryptographic protocol, which may exist on a digital asset network, such as a Bitcoin network or an Ethereum network. The network may be centralized, e.g., run by one or more central servers, or decentralized, e.g., run through a peer-to-peer network. Digital math-based assets may be maintained, tracked, and/or administered by the network.

A digital math-based asset system may use a decentralized electronic ledger system, which may be maintained by a plurality of physically remote computer systems. Such a ledger may be a public transaction, which may track asset ownership and/or transactions in a digital math-based asset system. The ledger may be a decentralized public transaction ledger, which can be distributed to users in the network, e.g., via a peer-to-peer sharing. Ledger updates may be broadcast to the users across the network. Each user may maintain an electronic copy of all or part of the ledger, as described herein. In embodiments, a digital asset system may employ a ledger that tracks transactions (e.g., transfers of assets from one address to another) without identifying the assets themselves.

In embodiments, a digital asset ledger, such as the Bitcoin blockchain, can be used to achieve consensus and to solve double-spending problems where users attempt to spend the same digital assets in more than one transaction. In embodiments, before a transaction may be cleared, the transaction participants may need to wait for some period of time, e.g., a six confirmation wait (typically one hour in the context of the Bitcoin network, 15 minutes in the context of the Litecoin network, to name a few), before feeling confident that the transaction is valid, e.g., not a double count. Each update to the decentralized electronic ledger (e.g., each addition of a block to the Bitcoin blockchain) following execution of a transaction may provide a transaction confirmation. After a plurality of updates to the ledger, e.g., 6 updates, the transaction may be confirmed with certainty or high certainty.

In embodiments, a blockchain can be a public transaction ledger of the digital math-based asset network, such as the Bitcoin network. For example, one or more computer systems (e.g., miners) or pools of computer systems (e.g., mining pools) can solve algorithmic equations allowing them to add records of recent transactions (e.g., blocks), to a chain of transactions. In embodiments, miners or pools of miners may perform such services in exchange for some consideration such as an upfront fee (e.g., a set amount of math-based assets) and/or a payment of transaction fees (e.g., a fixed amount or set percentage of the transaction) from users whose transactions are recorded in the block being added.

The digital asset network (e.g., Bitcoin network) may timestamp transactions by including them in blocks that form an ongoing chain called a blockchain. In embodiments, the addition of a block may occur periodically, e.g., approximately every 2.5 minutes or every 10 minutes, to name a few. Such blocks cannot be changed without redoing the work that was required to create each block since the modified block. The longest blockchain may serve not only as proof of the sequence of events but also records that this sequence of events was verified by a majority of the digital asset network's computing power. The blockchain recognized by the nodes corresponding to the majority of computing power will become the accepted blockchain for the network. In embodiments, confirmation of a transaction may be attained with a high degree of accuracy following the addition of six blocks to the blockchain after a transaction was performed. As long as a majority of computing power is controlled by nodes that are not cooperating to attack the network, they will generate the longest blockchain of records and outpace attackers.

In embodiments, transaction messages can be broadcast on a best effort basis, and nodes can leave and rejoin the network at will. Upon reconnection, a node can download and verify new blocks from other nodes to complete its local copy of the blockchain.

In the exemplary Bitcoin system, a bitcoin is defined by a chain of digitally signed transactions that began with its creation as a block reward through bitcoin mining. Each owner transfers bitcoin to the next by digitally signing them over to the next owner in a bitcoin transaction. A payee can then verify each previous transaction, e.g., by analyzing the blockchain, to verify the chain of ownership.

Other examples of different types of blockchains noted above that are consistent with embodiments of present invention pose unique problems. Certain currencies present unique challenges in that transactions and/or wallets may be shielded. For example, Monero is based on the CryptoNight proof-of-work hash algorithm and possesses significant algorithmic differences relating to blockchain obfuscation. Monero provides a high level of privacy and is fungible such that every unit of the currency can be substituted by another unit. Monero is therefore different from public-ledger cryptocurrencies such as Bitcoin, where addresses with coins previously associated with undesired activity can be blacklisted and have their coins refused by others.

In particular, ring signatures mix the spender's address with a group of others, making it more difficult to establish a link between each subsequent transaction. In addition, Monero provides "stealth addresses" generated for each transaction which make it impossible to discover the actual destination address of a transaction by anyone else other than the sender and the receiver. Further, the "ring confidential transactions" mechanism hides the transferred amount as well. Monero is designed to be resistant to application-specific integrated circuit mining, which is commonly used to mine other cryptocurrencies such as Bitcoin, however, it can be mined somewhat efficiently on consumer grade hardware such as x86, x86-64, ARM and GPUs.

Another example of a modified blockchain consistent with embodiments of the present invention discussed above is Darkcoin. Darkcoin adds an extra layer of privacy by automatically combining any transaction its users make with those of two other users—a feature it calls Darksend—so that anyone analyzing the blockchain has a harder time figuring out where a particular user's money ended up.

Yet another example of a modified blockchain consistent with embodiments of the present invention discussed above is Zcash. The Zcash network supports different types of transactions: "transparent" and "shielded." Transparent transactions use a transparent address (e.g., "t-address"). In embodiments, transactions between two t-addresses behave like Bitcoin transactions and the balance and amounts transferred are publicly visible on the Zcash blockchain. Unlike the Bitcoin Blockchain, the Zcash network may also support shielded transactions using a shield address (e.g., "z-address"). In embodiments, the "z-address" provides privacy via zero-knowledge succinct noninteractive arguments of knowledge (e.g., "zk-SNARKS" or "zero-knowledge proofs"). The balance of a z-address is not publicly visible on the Zcash blockchain—the amount transferred into and out of a zaddress is private if between two z-addresses—but may be public if between a z-address and a t-address.

In embodiments, a digital asset based on a blockchain, may in turn include special programming, often referred to as "Smart Contracts", which allow for the creation of "tokens", which in turn are digital assets based on digital assets. In embodiments, tokens may be EC20 tokens, and used in conjunction with ERC20 token standard as a programming language. In embodiments, other protocols may be used.

For example, digital assets can include tokens, which like other digital assets that can represent anything from loyalty points to vouchers and IOUs to actual objects in the physical world. Tokens can also be tools, such as in-game items, for interacting with other smart contracts. A token is a smart contract running on top of a blockchain network (such as the Ethereum Blockchain, the Bitcoin Blockchain, to name a few). As such, it is a set of code with an associated database. In embodiments, the database may be maintained by an issuer. The code describes the behavior of the token, and the database is basically a table with rows and columns tracking who owns how many tokens.

If a user or another smart contract within the blockchain network (such as the Ethereum Network) sends a message to that token's contract in the form of a 'transaction,' the code updates its database.

Using a token based on the Ethereum Network for illustration purposes, when a wallet app sends a message to a token's contract the transfer funds from Alice to Bob, may occur in accordance with FIG. 1.

In embodiments, an underlying blockchain, like the Bitcoin Block chain, may have limited or no smart contract capabilities.

In such embodiments, an overlying protocol, such as Omni Layer (https://www.omnilayer.org/) may also be used to create custom digital assets on such an underlying blockchain, like the Bitcoin blockchain, as described in https://github.com/OmniLayer/spec. In embodiments, a smart contract may be used for transactions involving Bitcoin through the use of a two way peg with side chain. The side chain can share miners with the Bitcoin blockchain and allows smart contracts to be run, such as contracts using the Ethereum virtual machine. When Bitcoin is to be used in the smart contract side chain, the Bitcoin is locked and an equal amount of side chain currency, an example of which is Super Bitcoin (SBTC), is assigned to the corresponding address. After the smart contract transaction is completed, the side chain currency is locked and the Bitcoin is unlocked. An example of such a side chain is Rootstock.

In embodiments, the blockchain is the Bitcoin blockchain, and another protocol is used as a layer over the Bitcoin blockchain to provide for smart contract functionality. For example, the other protocol may be a two-way peg of stable value digital asset tokens to bitcoin and a sidechain that shares miners with the Bitcoin blockchain. In embodiments, the other protocol is an omni layer protocol.

For illustration purposes, FIG. 1 shall be described with respect to a token on a block chain with ERC20 smart chain capabilities, such as the Ethereum Block chain and the NEO Block chain, to name a few.

In step S1001, at the token issuer computer system, tokens are created. In embodiments, each token may have a "ECR20 Contract Wallet Address" ("Contract Address") which is used to write a smart contract. In embodiments, the smart contract may include instructions to perform at least: (1) token creation; (2) token transfer; (3) token destruction; and (4) updating smart contract coding. In embodiments, the Contact Address may be a designated cold storage wallet associated with the token issuer. In embodiments, the Contract Address may be a designated hot storage wallet associated with the token issuer. In embodiments, the Contract Address may be a designated cold storage wallet associated with the token issuer, but may also give at least some permission to perform operations by one or more hot wallets associated with the token issuer and/or a token administrator on behalf of the token issuer. Tokens may be created in batches (for example, 100,000 SVCoins worth $100,000 U.S. dollars) in the "Contract Wallet" and later moved to a hot wallet for transactions as necessary. In embodiments, a token database is maintained in a blockchain, such as the Ethereum blockchain, for example. In embodiments, tokens may be generated on the fly, however, in this case, the Contract Wallet may be a hot wallet, or a Supplementary Wallet authorized to perform such operations may be used, and may be a hot wallet with the Contract Wallet remaining a cold wallet.

In embodiments of the present invention, the minimal specification for a Token, such as a Stable Value Token, may include instructions to perform at least: (1) a "totalSupply" function, which when called, will respond with a count of the number of tokens in existence; (2) a "balanceOf" function, which when called with a specific account (address) as a parameter, responds with the count of the number of tokens owned by that account; and (3) a "transfer" function, which is an example of a state modifying function, that, when called, given one or more target accounts and corresponding transferred amounts as parameters, will decrease the balance of the caller account by the corresponding transfer amounts, and increase the target accounts by the target amounts (or fail if the caller account has insufficient amounts or if there are other errors in the parameters).

In embodiments, a Stable Value Token may be created with a fixed supply of tokens at the time of its creation. For example, a Stable Value Token may be created with a supply of 21 million tokens and set Address 1 (mathematically associated with a private key 1) as the owner of all 21 million tokens. Thereafter, private key 1 will be required to generate a call to the transfer function in order to assign some portion of the 21 million tokens with a second Address 2 (mathematically associated with a private key 2) or any other Address (also mathematically associated with a corresponding private key).

Currently, due to the immutable nature of the Ethereum blockchain, once a smart contract is written to a specific Contract Address it cannot be changed. However, in embodiments, the various functions called for in the Contract Address may be associated with specific authorized key pairs of public keys (or "addresses") and corresponding private keys (which are mathematically associated with public keys). In embodiments, one or more private keys may be stored off-line in, what is sometimes referred to as, a designated cold storage wallet associated with the token issuer. In embodiments, one or more private keys may be stored on-line in, what is sometimes referred to as a designated hot storage wallet associated with the token issuer. In embodiments, the Contract Address may include instructions which are associated with authorizing one or more designated key pairs stored off-line in, e g., one or more cold storage wallets on one or more air-gapped computer systems associated with the token issuer, but may also give at least some permission to perform operations by one or more designated key pairs stored on-line, in, e.g., one or more hot wallets associated with the token issuer and/or a token administrator on behalf of the token issuer on one or more computer systems connected to the digital asset computer system. In embodiments, the on-line computer systems would be co-located with the digital asset computer systems. In embodiments, the Stable Value Tokens may be created in batches (for example, 100,000 SVCoins worth $100,000 U.S. dollars) by a designated key pair (such as an off-line designated key pair) authorized by smart contract and assigned by such a key pair to a designated address associated with on on-line public key for transactions as necessary.

In embodiments, a Stable Value Token database is maintained in a blockchain, such as the Ethereum blockchain, for example. In embodiments, the ledger may be maintained, in the first instance, as a database in a sidechain by the issuer or agent and subsequently published and stored as part of a blockchain.

In embodiments, Stable Value Tokens may be generated on the fly, however, in this case, the contract code, which is the executable code that is stored at the Contract Address location on the blockchain, may designate one or more public addresses corresponding to one or more on-line private keys held in, e.g., a hot wallet(s), or one or more public addresses corresponding on one or more off-line public keys held in, e.g., a cold wallet(s), or some combination thereof, as the authorized caller of some functionality. A more detailed discussion of hot wallets and cold wallets is presented in U.S. Pat. No. 9,892,460 issued Feb. 13, 2018 entitled SYSTEMS, METHODS, AND PROGRAM PRODUCTS FOR OPERATING EXCHANGE TRADED PRODUCTS HOLDING DIGITAL MATH-BASED ASSETS, the entire contents of which is incorporated herein by reference. In embodiments, Contract Wallets may be maintained by the token issuer and which would hold the private key associated with the token on an associated device. In embodiments, Contract Wallets may be provided on a user computer device and hold the private key associated with the token. In such embodiments, a user computer device may include a software application to provide secure access to the token issuer such that the user can engage in transactions.

By way of illustration, an ERC-20 Contract can include the following representative type of functions as shown in Table 1 in its programming of a Smart Contract associated with a particular token, such as a security token:

TABLE 1

```
1  // ---------------------------------------------------------------
2  // ERC Token Standard #20 Interface
3  // https://github.com/ethereum/EIPs/blob/master/EIPS/eip-20-token-
   standard.md
4  // ---------------------------------------------------------------
5  contract ERC20Interface {
6    function total Supply( ) public constant returns (uint);
7    function balanceOf(address tokenOwner) public constant returns
     (uint balance);
8    function allowance(address tokenOwner, address spender) public
     constant returns (uint remaining);
9    function transfer(address to, uint tokens) public returns (bool
     success);
10     function approve(address spender, uint tokens) public returns
     (bool success);
11     function transferFrom(address from, address to, uint tokens)
     public returns (bool success);
12
13     event Transfer(address indexed from, address indexed to, uint
     tokens);
14     event Approval(address indexed tokenOwner, address indexed
     spender, uint tokens);
```

Some of the tokens may include further information describing the token contract such as shown in Table 2:

TABLE 2

```
1  string public constant name = "Token Name";
2  string public constant symbol = "SYM";
3  uint8 public constant decimals = 18; // 18 is the most common num-
   ber of decimal places
```

In embodiments, a more elaborate smart contract may be set up to allow token issuers to have hybrid control over which key pairs have authority to affect the token supply and distribution. In embodiments, a hybrid combination of on-line and off-line key pairs can be used to control the supply and distribution of tokens.

For example, in embodiments, a smart contract may include a state-changing function such as limitedPrint, where the authorized caller of such function would be authorized only to print (or issue) a specific limited amount of tokens. In embodiments, the limitedPrint function may be used with an on-line key pair (e.g., hot wallet), to allow for fast and efficient token creation, but limit risk of unauthorized takeover of the on-line key pair to the set limit.

In conjunction with a limitedPrint command, a separate state-changing function of raiseCeiling can be used to increase the authority for the on-line key pair using a different key pair, such as an off-line key pair (e.g., cold wallet), which is considered to be more secure.

In embodiments, using a limitedPrint function with a set limit that can be implemented by one or more designated on-line key pairs (e.g., hot wallets), and a raiseCeiling function which may change that limit under the authority of a different set of one or more designated off-line key pairs (e.g., cold wallets), the automated increases in the token supply through on-line control will only continue up until the ceiling is reached, at which point further intervention through off-line control is required.

One should consider the difference between the current token supply and the supply ceiling as part of the tokens at risk. If the current token supply has decreased through the use of burn, then the effective funds at risk could have increased without a corresponding decrease in the supply ceiling. The ceiling can be lowered by on-line control, through a function called lowerCeiling. This allows for relinquishing some portion of what has been granted through off-line control to limit the effective funds at risk through compromise of on-line key management systems. In embodiments, a limit on number of tokens that can be burned may also be included.

In embodiments, as illustrated in FIG. 21A, the token may be set up using at least three core smart contracts, e.g., ERC20Proxy 2110, ERC20Impl 2120, and ERC20Store 2130 that cooperatively implement an ERC20 compliant token.

In the context of a ERC20 compliant token on the Ethereum blockchain, there is one, and will only ever be one instance of ERC20Proxy 2110. This is the smart contract that users of the token treat as the token contract. Thus, ERC20Proxy 2110 can be considered the permanent face of interacting with the token on the Ethereum blockchain.

Figure 21C:
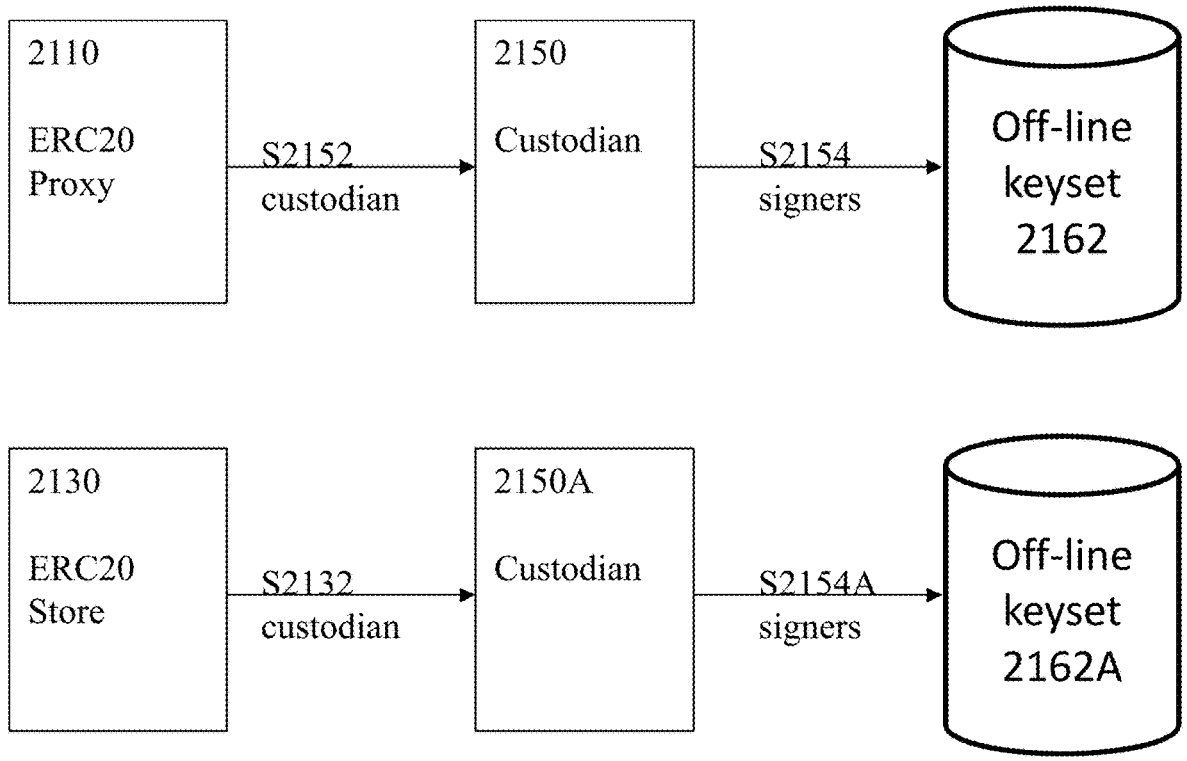

However, in embodiments, ERC20Proxy 2110 may have almost no code and does not keep any state information itself. Instead, in embodiments, ERC20Proxy 2110 has one or more implementations (e.g., ERC20 Impl 2120, ERC20 Impl (1) 2140, ERC20 Impl (2), to name a few) that executes the logic of the token. S2112 impl represents a delegation from ERC20 Proxy 2110 to ERC20Impl 2120. Thus, the instance of ERC20Impl 2120 executes the specific delegated functions. ERC20Impl 2120 may further limit the authority to implement to the specific delegated functions to only specified trusted callers (e.g., as shown in FIGS. 21C, 21G and 21H, one or more off-line key set 2162, to name a few). Arrow S2114 proxy illustrates the authorization of ERC20Impl 2120 executing logic on behalf of ERC20Proxy 2110, through call functions from one or more authorized addresses.

In embodiments, state information, such as token balances, may be maintained in a separate instance, e.g., ERC20Store 2130, a "backing store." In such embodiments, ERC20Store 2130 would own the delegated state of the token. The arrow S2122 illustrates the delegation of state information from ERC20Impl 2120 to ERC20Store 2130. In embodiments, the instance of ERC20Store 2130 may execute updates to the state of the token, such as updates to token balances that occur during a token transfer to one or more designated key sets. The arrow S2124 impl represents the address that the ERC20Store 2130 will permit to invoke the update functions. In embodiments, that address is the "Contract Address" of the active version of ERC20Impl 2120.

This separation of duties—public face, logic, and storage, for ERC20Proxy 2110, ERC20Impl 2120, and ERC20Store 2130, respectively—provides the ability for token issuer to replace the logic of the system at a later date. In embodiments, the logic may be replaced by changing the impl arrows (e.g., S21122 impl and S2124 impl).

FIG. 21B illustrates an embodiment where a token has been upgraded, by creating a new instance of ERC20Impl (ERC20Impl (2) 2120A) with a second version of the code previously implemented through ERC20Impl 2120. The instance of ERC20Proxy 2110 now delegates its implementation in S2112A impl to ERC20Impl (2) 2120A (version 2 of the code) instead of the previous ERC20Impl 2120 (version 1), and the instance of ERC20Store 2130 will now only accept calls from ERC20Impl 2120A (version 2). The original ERC20Impl 2120 (version 1) remains, but has become inert as it is unlinked from the other smart contracts.

Turning to FIGS. 21C-21F, custodianship will be discussed.

In embodiments, a fourth type of contract, Custodian 2150, may also be implemented. A Custodian 2150 is logic which designates which key pair (e.g., an Off-Line Keyset 2162), is authorized to control other contracts in the system (e.g., ERC20Proxy 2110). Contracts cooperate with Custodian 2150 by awaiting an approval from Custodian 2150 before executing certain actions. In turn, such approval will require a message from an authorized key pair (e.g., Off-Line Keyset 2162) authorizing the action (e.g., print tokens, limit tokens, transfer tokens, to name a few).

In embodiments, Custodian 2150 may include a range of control coding. In embodiments, control coding may include the requirement that at least two designated keysets authorize a specific action (e.g., print token). In embodiments, at the least two keysets may be a subset of a larger group of keysets (e.g., two of three designated keysets, or two of six designated keysets, or three of five designated keysets, to name a few). In embodiments, when a higher degree of security is desired, the keysets may be maintained off-line. In embodiments, when a high degree of automation or speed to access is required, the keysets may be maintained on-line, such as in a co-located, but separate computer system that is operatively connected to a customer facing digital asset system.

In embodiments, Custodian 2150 may also exercise control over various security operations of ERC20Proxy 2110 (e.g., time locking and revocation, to name a few).

In embodiments, Custodian 2150 may have custodianship over the proxy which grants exclusive power to replace the implementation for ERC20Proxy 2110 from its current implementation (e.g., ERC20Impl 2120 (version 1)) to a new implementation (e.g., ERC20Impl 2120A (version 2)), as illustrated in FIG. 21B, discussed above. As discussed, in embodiments, only authorized and designated key sets (e.g., off-line key set 2162) will have the authority in step S2154 signers to authorize the Custodian 6450 to modify an implementation of ERC20Proxy 2110.

In embodiments, Custodian contracts with their own respective authorized designated keysets can be set up for other contracts, such as ERC20Store 2130 as also shown in FIG. 21C. Thus, by way of example, ERC20Store 2130 may designate in S2132 Custodian 2150A as a custodian for certain operations of ERC20Store. Those operations will only be executed by ERC20Store 6430 when designated keyset (such as Off-Line keyset 6462A) sends a message through the blockchain to Custodian 2150A authorizing the Custodian 2150A to authorize the ERC20Store 2130 to perform the designated function. In embodiments, the off-line keyset 2162A may be the same as, overlap with, or be different from the Off-Line Key Set 2162A which may authorize Custodian 2150 with respect to ERC20Proxy 2110.

In embodiments, custodianship of the proxy and store also grants exclusive power to pass custodianship to a new instance of Custodian. Thus, one of the technical computer problems associated with the immutability of ERC20 smart contracts on the Ethereum blockchain has been solved, thus allowing for a self-upgrade of custodianship. In embodiments, since a set of signers for a given instance of a Custodian is fixed, a change to the off-line keyset may be implemented instead having a current Custodian authorize itself to be replaced by a new instance of Custodian with a new set of signers.

Figure 21D:
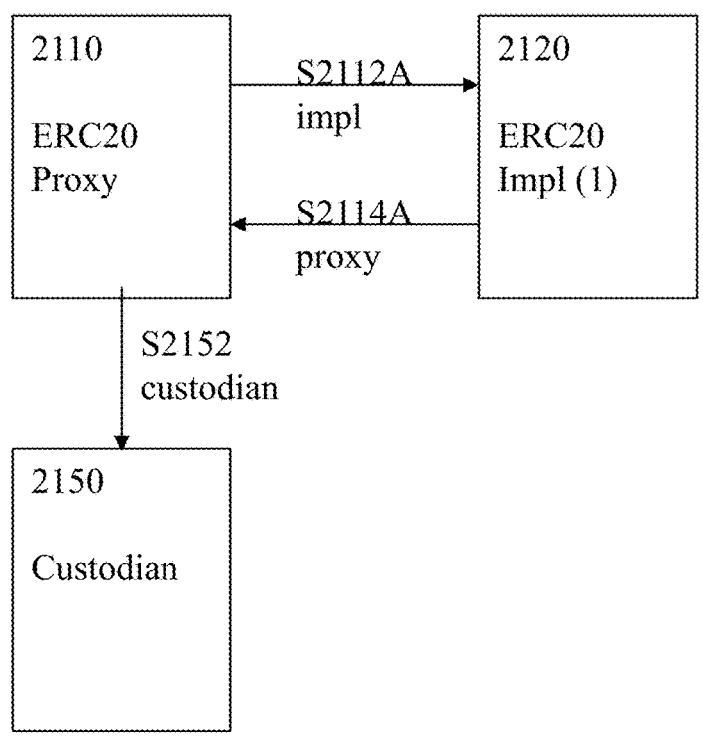
Figure 21E:
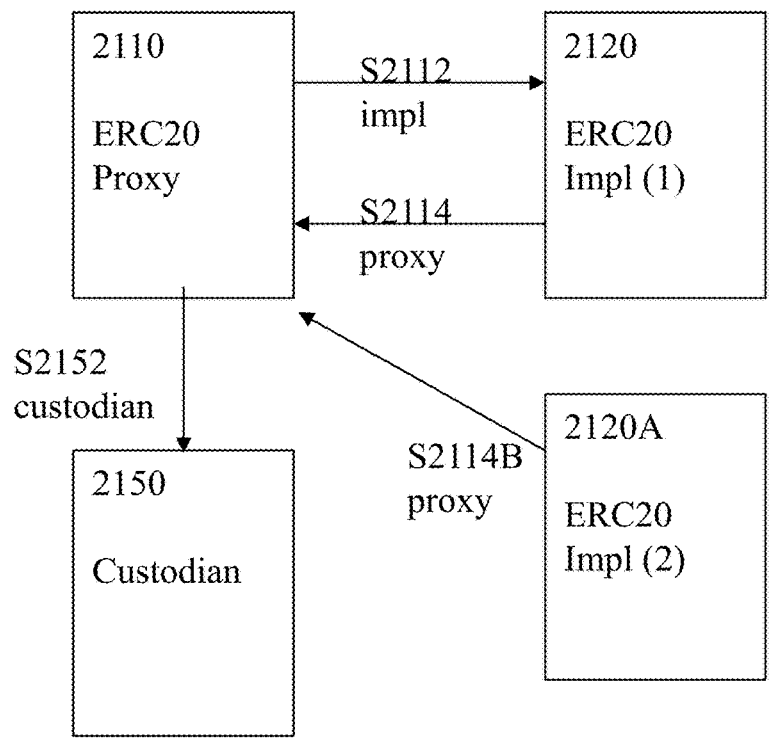
Figure 21F:
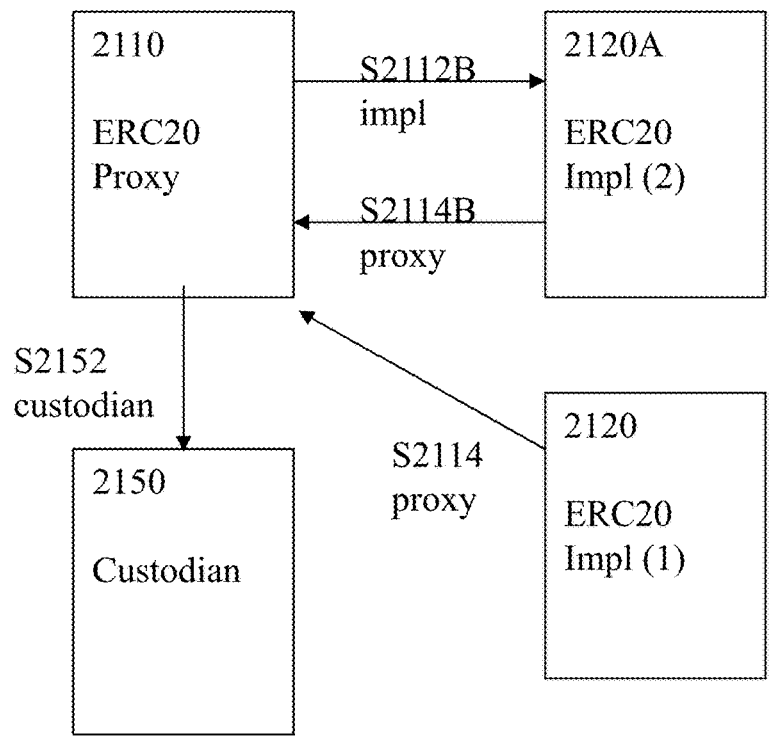
Figure 21G:
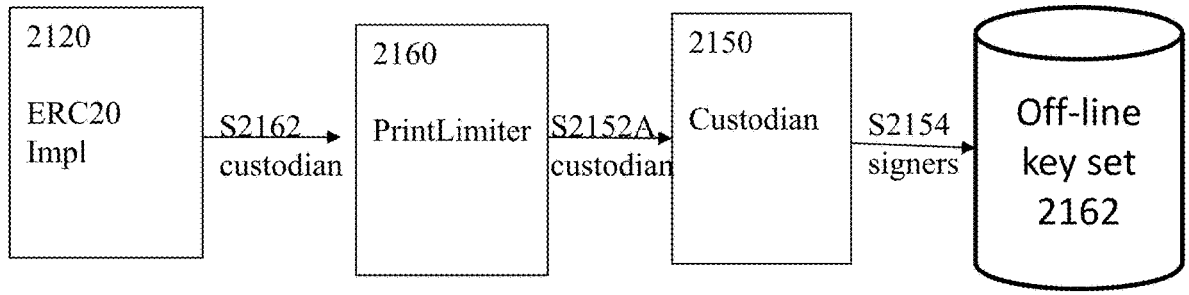
Figure 21H:
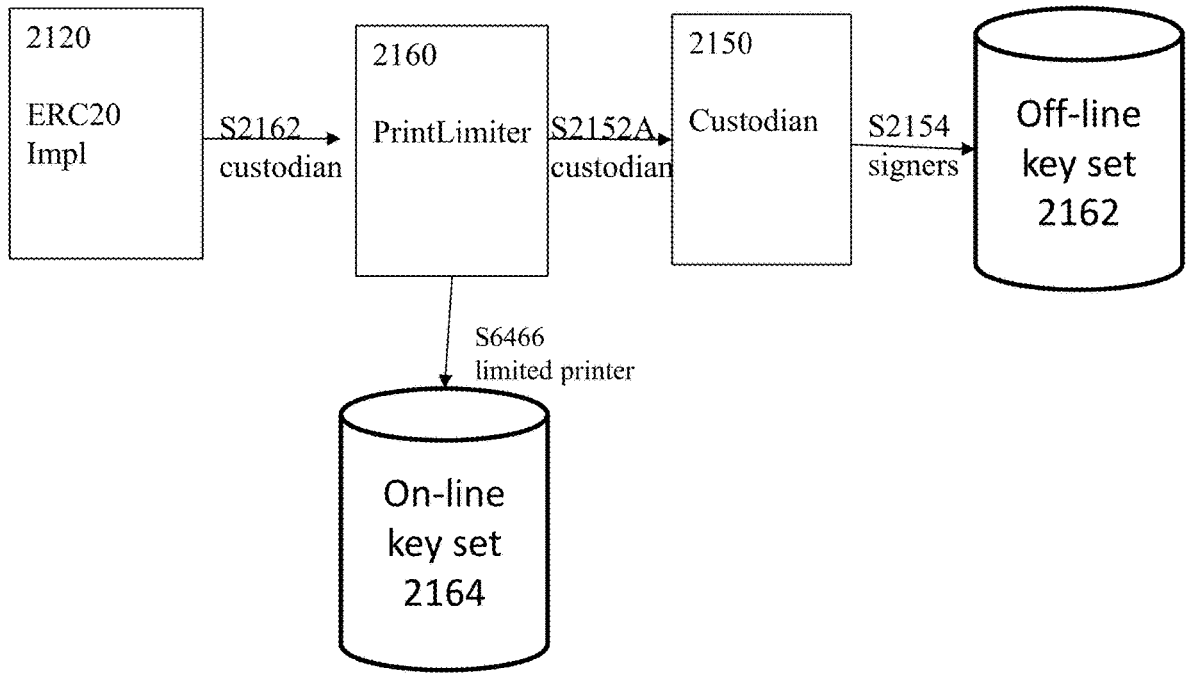

Referring now to FIGS. 21D-21F, the process of upgrading active implementation of the pointer relationship of ERCProxy 2110 from ERC20Impl 2120 (version 1) to ERC20Impl 2120A (version 2) will now be discussed.

FIG. 21D reflects the initial state in which ERC20Proxy 6410 has Custodian 2150 and in S2112A implemented ERC20 Impl 2120 (version 1) to act as a proxy in S2114A for certain functions of ERC20Proxy 2110.

To swap out the current ERC20Impl 1320 (version 1) with an updated ERC20Impl 2120 (version 2), as shown in FIG. 21E, the coding for ERC20 Impl 2120 (version 2) needs to be deployed on the blockchain and set its proxy point (S2114B proxy) to the same ERC20Proxy 2110.

Next, the implementation pointer from ERC20Proxy 2110 which is currently set at S2112 (impl) to point to ERC20Impl 6420 (Version 1), needs to be reset to be S2112B impl to point to ERC20Impl 2120A (version 2) instead. This change requires the authorization of Custodian 2150, which in turn requires two signatures from keys in its designated keyset (e.g., Off-Line Keyset 2162) sent to it on the blockchain.

Table 3 represents an exemplary embodiment of the functions used to implement this process:

TABLE 3

1. lockID = proxy.requestImplChange(imp_2)
2. request = custodian.requestUnlock(lockId,proxy.confirmImpl.Change)
3. Off-line signing of request
4. custodian.completeUnlock (request, signature_1, signature 2)
   a. proxy.confirmImplChange(lockID)

Referring to Table 3, in step 1, a request must be made to ERC20Proxy to change its instance of ERC20Impl. This request may come from any address, and when the request is made, the function returns a unique lockId that anyone can use to look up that request.

Next, in step 2, to confirm the pending request, the Custodian contract 2150 for ERC20 Proxy 2110 calls requestUnlock and passes as arguments the lockId generated for the change request, and the function in ERC20Proxy 2110 the Custodian 2150 needs to call to confirm the change request. This generates a request, which is a unique identifier for this unlock request.

In step 3, to complete the unlocking of Custodian and therefore propagate the change to ERC20Proxy 2110, the digital asset system operated by the token issuer uses its off-line key storage infrastructure to sign the request with the previously approved designated key sets. In this example, two signatures are required (signature 1 and signature 2), but other combinations of signatures may be used consistent with embodiments of the present invention.

In step 4, those signatures are passed into the Custodian's completeUnlock function along with the initial request. Once the request is validated against the signatures, completeUnlock parses the content of the request and issues the command. In this case, it calls ERC20Proxy's confirmImplChange using the lockId generated in the initial ERC20Impl change request.

As shown in FIG. 21F, ERC20Proxy 2110 now points with arrow S2112B to the updated ERC20Impl 2120A (version 2) contract, thus delegating all future calls from ERC20Proxy 2110 to the updated contract ERC20 Impl (version 2) 2120A. This process can be repeated in the future to upgrade the ERC20 Impl (version 2) 2120A to new versions as authorized by the Custodian 2150.

In embodiments, a similar process may also be used to upgrade the active Custodian 2150. Instead of the pair of functions requestImplChange and confirmImplChange, the pair of functions requestCustodianChange and confirmCustodianChange are used instead.

Referring to FIGS. 21G and 21H, a PrinterLimiter 2160 contract may also be used as an upgradeable limit on the token supply available.

In the context of FIG. 21G, ERC20Impl 2120 allows printing an unbounded amount of tokens to any arbitrary address. This printing can only be done by PrintLimiter 2160 contract, which serves as ERC20Impl's custodian. However, PrintLimiter 2160 can only call this unbounded printing if it receives a call from its custodian, a separate contract named Custodian 2150, which is in turn controlled by signatures from designated keysets (e.g., Off-Line Key Set 2162).

Thus, to print an unbounded amount of tokens, signatures from keys in Off-Line Key Set 2162 need to be sent through the blockchain, to Custodian 2150, which, in turn, then calls through the blockchain, PrintLimiter 2160, which then, in turn, calls through the blockchain ERC20Impl 2120 to confirm the print request.

Referring to FIG. 21H, a limited printing option may also be implemented. Thus, in embodiments consistent with FIG. 21H, ERC20Impl 2120 allows either printing an unbounded amount (which originates from Off-Line Key Set 2162 as described earlier), or a limited amount which does not require the off-line key set to enact. Within PrintLimiter 2160 is a "total supply ceiling" variable: a maximum total supply of tokens that any "limited print" operation cannot exceed. This value is set by Off-Line Key Set 2162. PrintLimiter 2160 allows printing new tokens while remaining under that ceiling from a special hot wallet address. That hot wallet address can call PrintLimiter 2160 directly, which then calls ERC20Impl 2120 to confirm the "limited" print operation. In embodiments, limits may also be expressed in or related to time periods.

The total supply ceiling can only be raised by Off-Line Key Set 2162. In embodiments, it can be lowered, however, by the On-Line Key Set 2164 or Off-Line Key Set 2162.

Table 4 illustrates exemplary embodiments of code used in smart contracts on the Ethereum blockchain which implement a cooperative relationship with an external account or contract that exerts custodianship over the contract following the pattern.

A contract following the pattern is capable of carrying out some action—a portion of the desired operations; however, rather than executing the action directly, the action is first requested, with a unique 'lock identifier' returned as the result of the request. The pending action is stored in the contract state, storing the data necessary to execute the action in the future, and with the lock identifier as the lookup key to retrieve the pending action. If the contract is called by its custodian, receiving a lock identifier as an argument, then the associated pending action, if any, is retrieved and executed.

In embodiments, as illustrated in Table 4, the contracts may include multiple inheritances, so for the purposes of code reuse, a function for generating unique lock identifiers is implemented in the contract LockRequestable.

TABLE 4

```
contract LockRequestable {
  uint256 public lockRequestCount;
  function LockRequestable( ) public {
    lockRequestCount = 0;
  }
  function generateLockId( ) internal returns (bytes32 lockId) {
    return keccak256(block.blockhash(block.number − 1), address(this),
      ++lockRequestCount);
  }
}
```

In embodiments, the function generateLockId returns a 32-byte value to be used as a lock identifier, which is a hash of the following three components: (1) The blockhash of the Ethereum block prior to the block that included the Ethereum transaction that executed this function; (2) The deployed address of the instance of the contract that inherits from LockRequestable; and (3) The current value of the count of all invocations of generateLockId (within 'this' contract).

Component three plays the role of a nonce (in cryptography, a nonce is an arbitrary number that can be used just once) ensuring that a unique lock identifier is generated no matter how many invocations of generateLockId there are within a single Ethereum transaction or a single Ethereum block.

Component two ensures that the lock identifier is unique among the set of cooperating contracts that use this identifier generation scheme. A noncooperative contract authored by a third party may choose to generate identifiers that overlap, but that is expected not to impact operation.

Finally, component three uses the relative previous blockhash to make future lock identifiers unpredictable.

Table 5 illustrates embodiments of code which uses LockRequestable in a template consistent with embodiments of the present invention.

TABLE 5

```
contract C is ..., LockRequestable {
  struct PendingAction {
    t v;
    ...
  }
  address public custodian;
  mapping (bytes32 => PendingAction) public pendingActionMap;
  function C(address _custodian, ...) public {
    custodian = _custodian;
    ...
  }
  modifier onlyCustodian {
    require(msg.sender == custodian);
    _;
  }
  function requestAction(t _v, ...) public returns (bytes32 lockId) {
    require(_v != 0);
    lockId = generateLockId( );
    pendingActionMap[lockId] = PendingAction({
      v: _v,
      ...
    });
    emit ActionLocked(lockId, _v, ...);
  }
  function confirmAction(bytes32 _lockId) public onlyCustodian {
    PendingAction storage pendingAction = pendingActionMap[_lockId];
    t v = pendingAction.v;
    require(v != 0);
    ... // copy any other data from pendingAction
    delete pendingActionMap[_lockId];
    ... // execute the action
    emit ActionConfirmed(_lockId, v, ...);
  }
  event ActionLocked(bytes32 _lockId, t _v, ...);
  event ActionConfirmed(bytes32 _lockId, t _v, ...);
}
```

The function requestAction generates a fresh lock identifier and captures the request parameters as a pending action, storing it in a mapping associated with the lock identifier.

The function confirmAction is callable only by the designated custodian. The given lock identifier is used to retrieve the associated pending action from the contract storage, if it exists, otherwise the function reverts. The pending action is deleted from storage, which ensures that the action will be executed at most once. Finally the logic of the action is executed.

In embodiments, there are two requirements to the confirmAction callback function: (1) the function does not have a return value; and (2) the function must only revert if there is no pending action associated with the lock identifier.

In these embodiments, the custodian receives a failure signal only when it called with an invalid lock identifier. Any failure cases that may occur in the execution of the action logic must be signaled by means other than return values or reversions (including abortive statements such as throw).

Programming consistent with Tables 4 and 5 may be used to implement a wide variety of functions in the context of a token including, by way of example:

Contracts that inherit from the ERC20ImplUpgradeable contract (e.g., ERC20Proxy and ERC20Store) control updates to the address that references an instance of the ERC20Impl contract;

The ERC20Impl contract to control increases to the token supply;

The ERC20Holder contract to control 'withdrawal' transfers out of its balance;

The PrintLimiter contract to control increases to its token supply ceiling state; and Contracts that inherit from the CustodianUpgradeable contract (e.g., ERC20Proxy, ERC20Impl, and ERC20Store) to control the passing of custodianship itself from the current custodian to a new custodian, to name a few.

In Step S1002, Alice's wallet may send a request message to the database maintained by the token issuer computer system (e.g., a digital asset exchange system) including: (a) Alice's ethereum wallet address (Source Address); (b) token identification information; (c) amount of token to be transferred; and (d) Bob's ethereum wallet address (Destination Address). In embodiments, if a fee is charged for the transaction, fee payment information may also be required and provided. The request message will also be digitally signed by Alice's private key.

In Step S1004, when the miners on the blockchain receive the transaction request directed to the request message, the miner's will confirm the transaction, including, at step S1004-a, verifying that the message was properly signed by Alice using Alice's public key. In Step S1004-b, the miners will verify that Alice has sufficient amount of tokens to perform the requested transaction, for example, by comparing Alice's balance against Alice's token balance as indicated on the blockchain. In Step S1004-c, the miners may also verify the validity of Bob's wallet address (the Destination Address). The miners may also compare the request with smart contract coding and instructions included in the Contract Wallet. The transaction fee discussed above is paid to the miners for confirming the transaction, as noted above.

In Step S1006, if the request is verified, the transaction is published in the token database of the blockchain reflecting a debit against Alice's token holdings and a corresponding credit to Bob's token holdings (less any applicable fees).

In Step S1008, response messages to the wallets of both Alice and Bob may be sent to reflect that the transaction was successfully processed. In embodiments, such messages may include information including: (i) the source wallet; (ii) the destination wallet; (iii) the amount of tokens transferred; and/or (iv) the new balances for each wallet. In embodiments, Alice, Bob and/or third parties may view the balances and transaction information based on the information stored in the blockchain, by, e.g., viewing token balances at websites like etherscan.io, to name a few.

In contrast to tokens, a blockchain based digital asset (such as ether) is hard coded into the blockchain (e.g., the Ethereum Blockchain) itself. It is sold and traded as a cryptocurrency, and it also powers the network (e.g., the Ethereum Network) by allowing users to pay for smart contract transaction fees. (In some networks, transactions fees may be paid for in digital assets, such as tokens (e.g., Gas) or blockchain based digital assets (e.g., bitcoin). In the Ethereum Network, all computations typically have a cost based on other digital assets, such as Gas.

In embodiments, when tokens are sent to or from a Contract Address, for example, a fee may be charged for that transaction (in this case, a request to the token's contract to update its database) in, e.g., some form of digital asset, such as ether, bitcoin, Gas, to name a few. In embodiments, the message may include a proposed fee amount and/or fee proposal including a limit in digital asset, e.g., ether, bitcoin or Gas. This payment is then collected by a miner who confirms the transaction in a block, which then gets added to the blockchain.

Digital Asset Exchange

A digital asset exchange, such as a digital math-based asset exchange, may allow users to sell digital assets in exchange for any other digital assets or fiat currency and/or may allow users to sell fiat currency in exchange for any digital assets. Accordingly, an exchange may allow users to buy digital assets in exchange for other digital assets or fiat currency and/or to buy fiat currency in exchange for digital assets. In embodiments, a digital asset exchange may integrate with a foreign exchange market or platform. A digital asset exchange may be configured as a centralized exchange or a decentralized exchange, as discussed herein.

A digital asset exchange may act as an issuer for token. In such a case, a digital asset exchange computer system will maintain one or more databases associated with the token. Such databases may include an electronic log of all transactions, including the source wallet, the destination wallet, the timestamp of the transaction, the amount of the transaction (e.g., the number of token), and/or the balance in each wallet before and/or after the transaction. In embodiments, the database may include a list of wallet addresses and balances in each wallet of the SV Coin. In embodiments, the issuer may maintain the database by using a smart contract in association with a Contract Digital Address as part of a blockchain network, such as the Ethereum Network.

Figure 3:
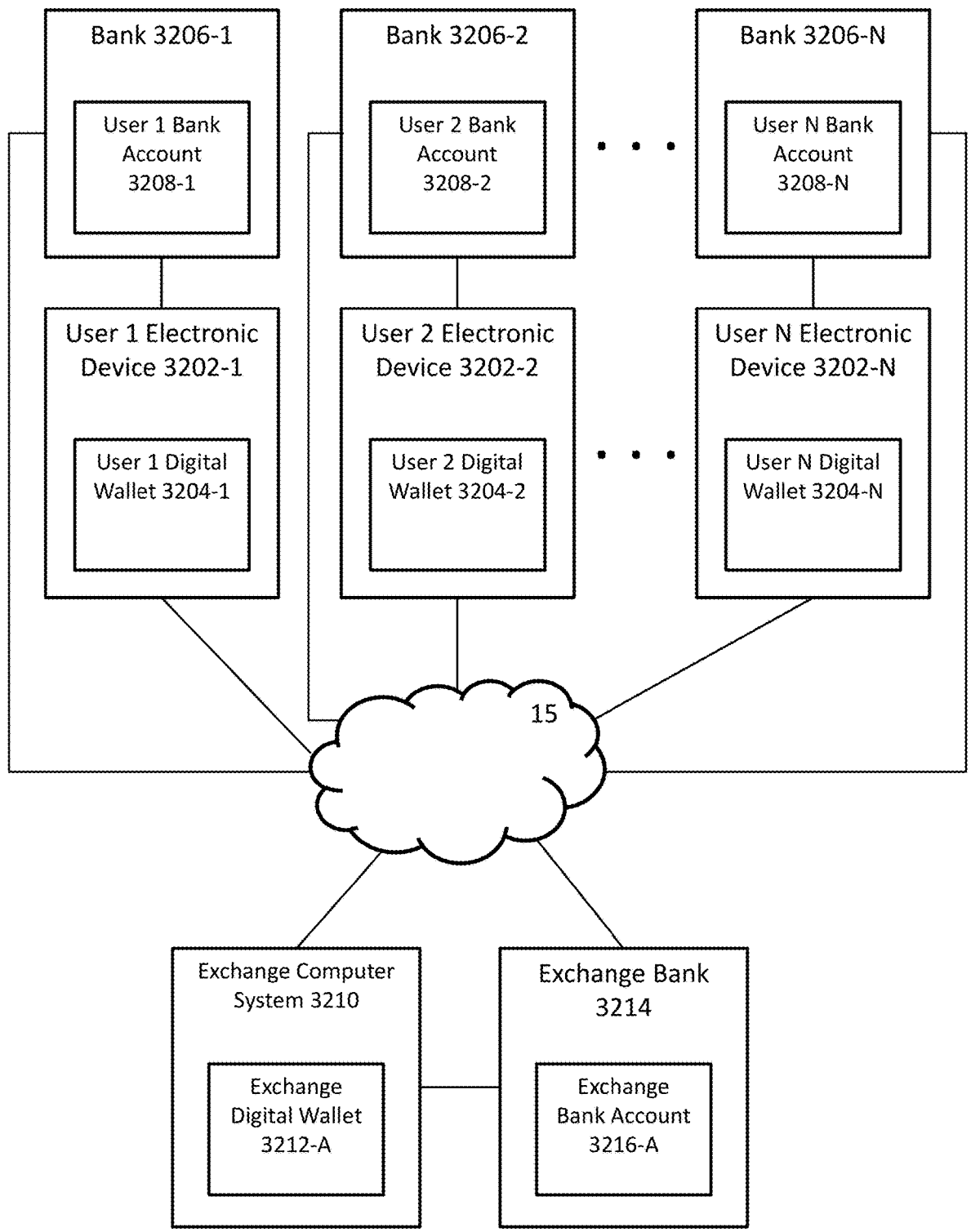
FIG. 3 is a schematic diagram illustrating participants in a digital asset exchange in accordance with exemplary embodiments of the present invention.

FIG. 3 is a schematic diagram illustrating various potential participants in a digital asset exchange, in exemplary embodiments. The participants may be connected directly and/or indirectly, such as through a data network 15, as discussed herein. Users of a digital asset exchange may be customers of the exchange, such as digital asset buyers and/or digital asset sellers. Digital asset buyers may pay fiat (e.g., USD, Euro, Yen, to name a few) in exchange for digital assets (e.g., bitcoin, ether, litecoin, dogecoin, to name a few). Digital asset sellers may exchange digital assets (e.g., bitcoin, ether, litecoin, dogecoin, to name a few) for fiat (e.g., USD, Euro, Yen, to name a few). In embodiments, instead of fiat, other forms of digital assets may also be used.

In embodiments, users may connect to the exchange through one or more user electronic devices 3202 (e.g., 3202-1, 3202-2, . . . , 3202-N), such as computers, laptops, tablet computers, televisions, mobile phones, smartphones, and/or PDAs, to name a few. A user electronic device 3202 may access, connect to, and/or otherwise run one or more user digital wallets 3204 (e.g., 3204-1, 3204-2, . . . , 3204-N). In embodiments, buyers and/or sellers may access the exchange using their own electronic devices and/or through a digital asset kiosk. A digital asset enabled kiosk can receive cash, including notes, coins or other legal tender, (of one or more fiat currencies) from a buyer to use in buying a quantity of digital assets. A digital asset kiosk may dispense cash (of one or more fiat currencies) to a seller of digital assets. In embodiments, a digital asset kiosk may receive funds from and/or dispense funds to a card, such as a prepaid or reloadable card, or electronic wallet, or electronic account. In embodiments, an electronic wallet may be stored on a user electronic device, such as a mobile electronic device, or other computing device. In embodiments, the user electronic device may be an autonomous device associated with the user.

Users may also have user bank accounts 3208 (e.g., 3208-1, 3208-2, . . . , 3208-N) held at one or more banks 3206 (e.g., 3206-1, 3206-2, . . . , 3206-N). In embodiments, users may be able to access their bank accounts 3208 (e.g. 3208-1, 3208-2, . . . 3208-N) from a user electronic device 3202 and/or from a digital wallet 3204.

A digital asset exchange computer system 3210 can include software running on one or more processors, as discussed herein, as well as computer-readable memory comprising one or more database. A digital asset exchange can include one or more exchange digital wallets, e.g., digital wallet 3212-A. Exchange digital wallets may be used to store digital assets in one or more denominations from one or more parties to a transaction. In embodiments, exchange digital wallets may store digital assets owned by the exchange, which may be used where an exchange is a counter-party to an exchange transaction, which can allow exchange transactions to occur even when a buyer and a seller are not otherwise both available and in agreement on transaction terms.

A digital asset exchange may have one or more bank accounts, e.g., bank account 3216-A, held at one or more banks 3214, such as exchange banks or exchange partner banks, which are banks associated with and/or in partnership with the exchange. In embodiments, exchanges may access other repositories for fiat currency. An exchange bank account may be a pass-through account that receives fiat currency deposits from a digital asset buyer and transfers the fiat currency to a digital asset seller. The exchange bank account may hold money in escrow while an exchange transaction is pending. For example, the exchange bank account may hold a digital asset buyer's fiat currency until a digital asset seller transfers digital assets to the buyer, to an exchange, or to an authorized third party. Upon receipt by the appropriate recipient of the requisite amount of digital assets, the exchange may authorize the release of the fiat currency to the digital asset seller. In embodiments, an exchange may hold funds in escrow in both bank accounts and digital wallets.

Figure 4A:
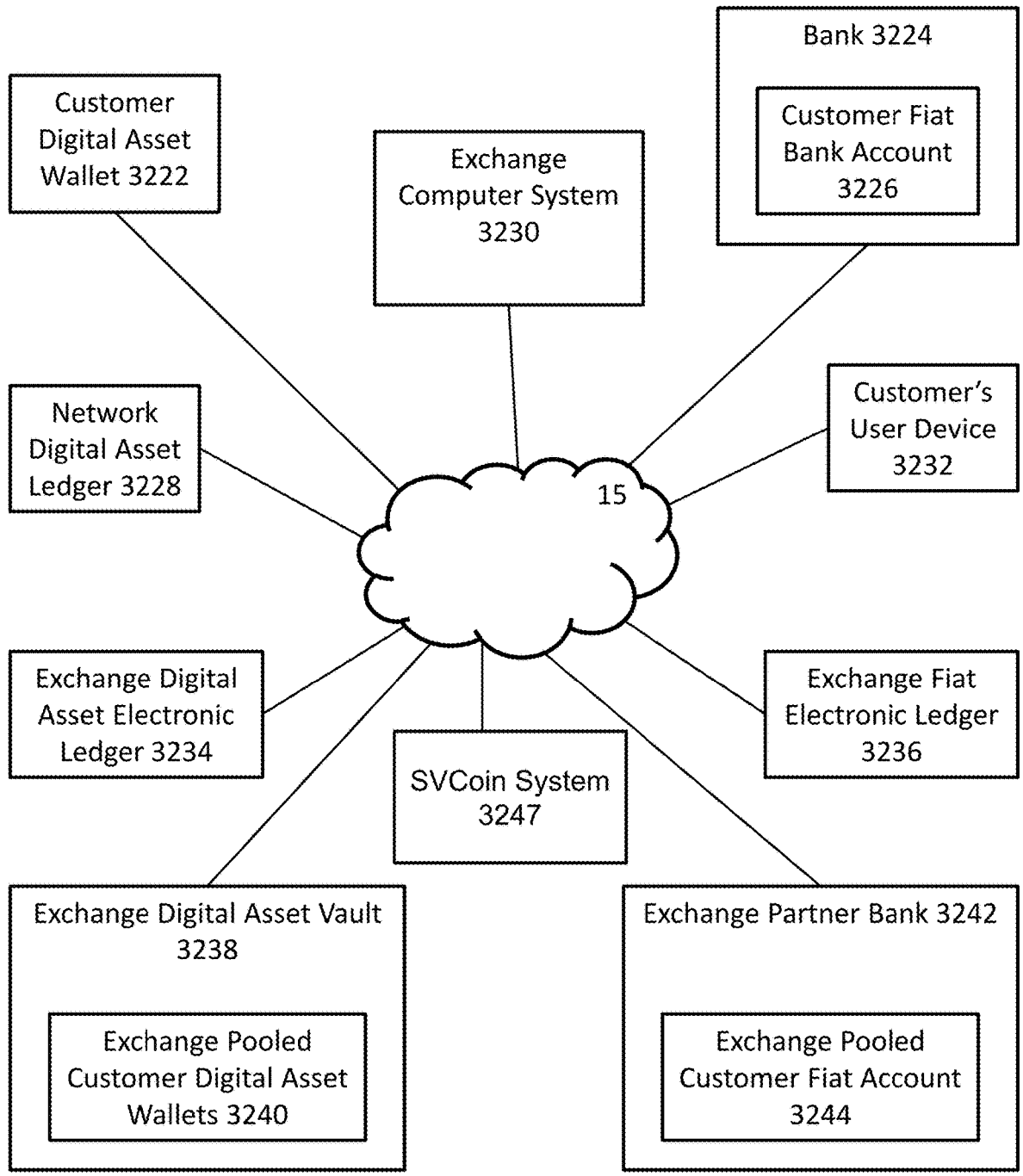
FIGS. 4A-B are schematic diagrams illustrating entities associated with a digital asset exchange in accordance with exemplary embodiments of the present invention.

FIG. 4A is another schematic diagram illustrating entities associated with a digital asset exchange in an exemplary embodiment of the present invention. Each entity may operate one or more computer systems. Computer systems may be connected directly or indirectly, such as through a data network. Entities associated with a digital asset exchange can include the exchange, an exchange computer system 3230, customer digital asset wallets 3222 (e.g., bitcoin wallets, ether wallets, to name a few), customer banks 3224 having customer fiat bank accounts 3226, a digital asset network ledger 3228 (e.g., the Bitcoin blockchain, the Ethereum blockchain, to name a few), a digital asset network (e.g., the Bitcoin Network, the Ethereum Network, to name a few), one or more exchange customers using one or more customer user device 3232, an exchange digital asset electronic ledger 3234, one or more exchange digital asset vaults 3238, an exchange fiat electronic ledger 3236, and one or more exchange partner banks 3242, which can have exchange pooled customer fiat accounts 3244. The exchange digital asset vaults 3238 can store a plurality of digital asset wallets, which may be pooled exchange customer wallets 3240. In embodiments, the exchange may have a single partner bank 3242 with a pooled exchange customer fiat account 3244. Such an account may be associated with insurance protection. In embodiments, the exchange may have a SVCoin token system 3247. Such a system may allow users to purchase tokens using fiat currency and/or digital assets and/or to redeem digital assets in the form of tokens, and/or to redeem token tokens for fiat currency. Token system 3246 may also be used to generate new token tokens, and cancel redeem token tokens. Token system 3246 is operatively connected to an token database that maintains a log of tokens.

The exchange may employ an electronic ledger system to track customer digital assets and/or customer fiat holdings. Such a system may allow rapid electronic transactions among exchange customers and/or between exchange customers and the exchange itself using its own digital asset and fiat holdings or those of its sponsor or owner. In embodiments, the electronic ledger system may facilitate rapid computer-based automated trading, which may comprise use by one or more computer systems of a trading API provided by the exchange. The electronic ledger system may also be used in conjunction with cold storage digital asset security systems by the exchange. Fiat (e.g., USD) and digital assets (e.g., bitcoin) can be electronically credited and/or electronically debited from respective (e.g., fiat and digital asset) electronic ledgers. Clearing of transactions may be recorded nearly instantaneously on the electronic ledgers. Deposits of fiat with the exchange and withdrawals from the exchange may be recorded on the electronic fiat ledger, while deposits and withdrawals of digital assets may be recorded on the electronic digital asset ledger. Electronic ledgers may be maintained using one or more computers operated by the exchange, its sponsor and/or agent, and stored on non-transitory computer-readable memory operatively connected to such one or more computers. In embodiments, electronic ledgers can be in the form of a database.

A digital asset exchange computer system can include one or more software modules programmed with computer-readable electronic instructions to perform one or more operations associated with the exchange. Each module can be stored on non-transitory computer-readable memory operatively connected to such one or more computers. An exchange may have a user on-boarding module to register users with the exchange and/or create accounts for new and/or existing exchange users. The exchange may employ systems and methods to ensure that the identity of exchange customers is verified and/or the destination of fiat currency and/or digital assets is known.

Figure 4B:
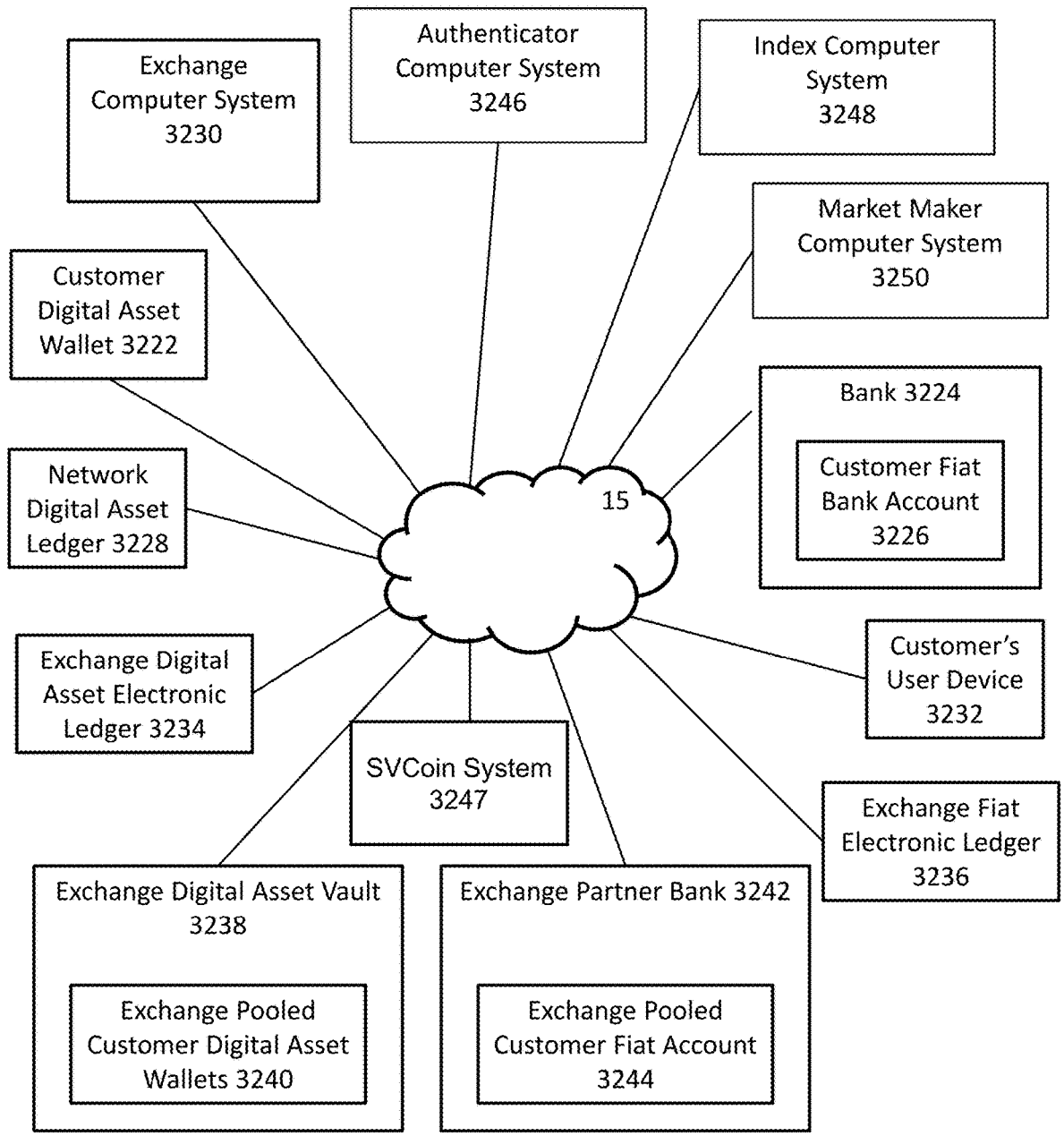

In embodiments, as illustrated in FIG. 4B, the digital asset exchange may also include or be in communication with additional systems such as an index computer system 3248, which may provide information on pricing, and a market maker computer system 3250, which is associated with one or more market makers. In embodiments, the digital asset exchange computer system may also include or be in communication with an authenticator computer system 3246, which may be used to authenticate users of the digital asset exchange.

Figure 5A:
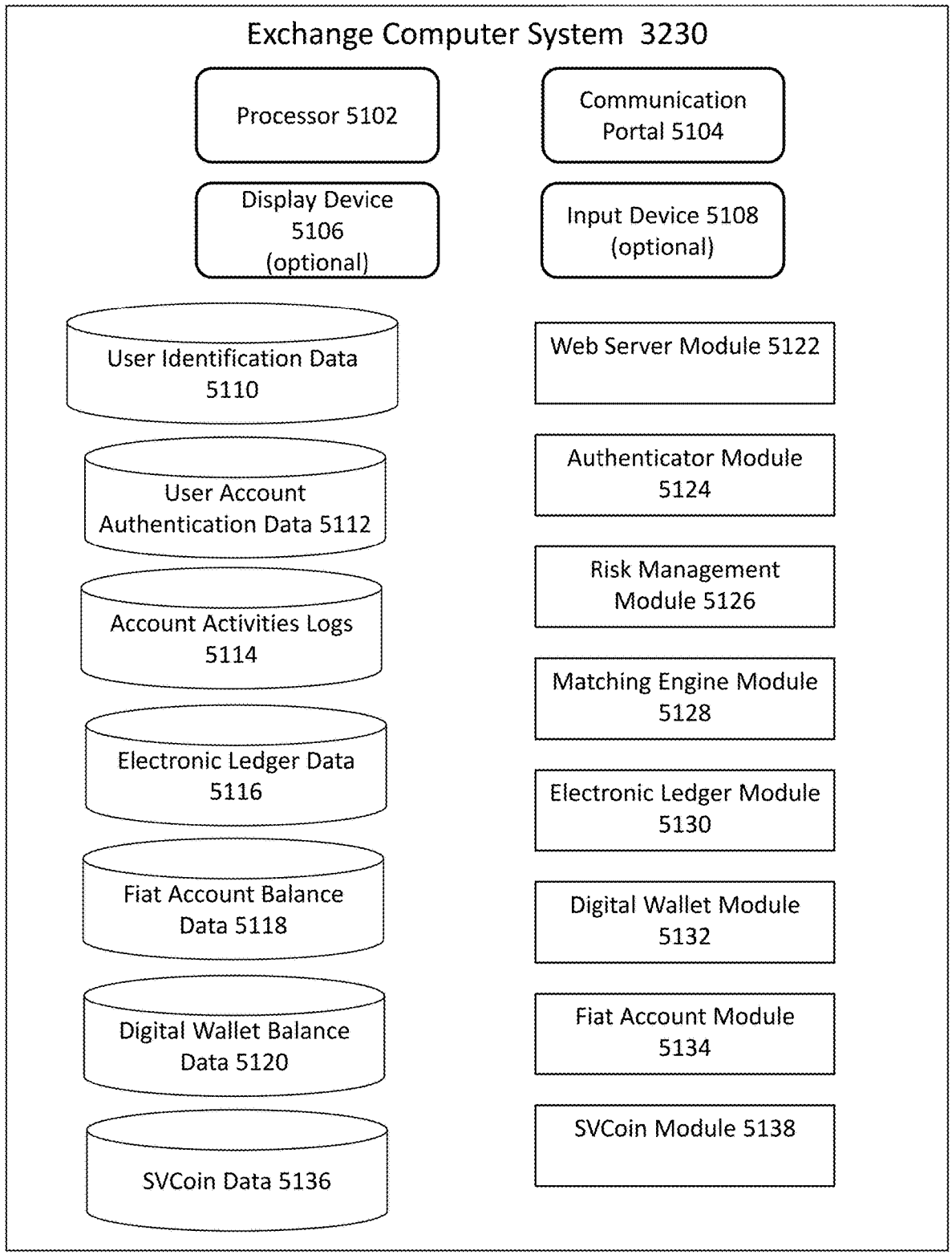
FIGS. 5A-B are schematic diagrams of exemplary exchange computer systems in accordance with exemplary embodiments of the present invention.
Figure 5B:
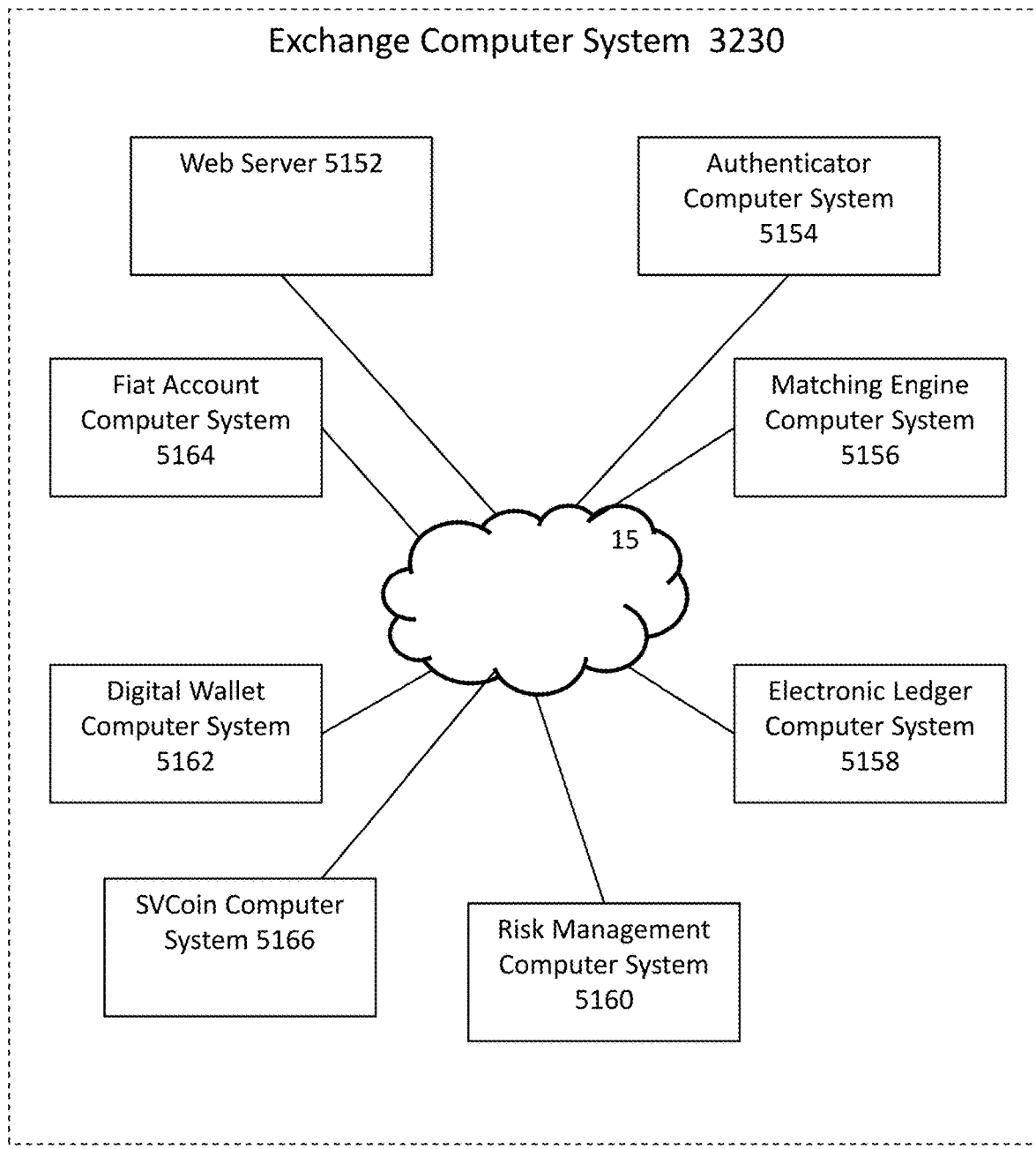

FIGS. 5A-B are schematic diagrams of exemplary exchange computer systems in accordance with exemplary embodiments of the present invention. FIG. 5A shows hardware, data, and software modules, which may run on one or more computers. FIG. 5B shows an exemplary distributed architecture for the exchange computer system.

As shown in FIG. 5A, an exchange computer system 3230 can include one or more processors 5102, a communication portal 5104 (e.g., for sending and/or receiving data), a display device 5106, and/or an input device 5108. The exchange computer system 3230 can also include non-transitory computer-readable memory with one or more databases and data stored thereon. Data may include user identification data 5110 (e.g., know your customer data obtained during the user onboarding process), user account authentication data 5112 (e.g., login credentials, multi-factor authentication data, and/or anti-money laundering verifications), account activities logs 5114, electronic ledger data 5116, fiat account balance data 5118, digital wallet balance data 5120, and/or token data 5136. One or more software modules may be stored in the memory and running or configured to run on the one or more processors. Such modules can include a web server module 5122, authenticator module 5124, risk management module 5126, matching engine module 5128, electronic ledger module 5130, digital wallet module 5132, fiat account module 5134, and/or token module 5138. The processes performed by such modules, the data produced thereby and/or the data accessed thereby, are described herein.

A matching engine module 5128 may apply a continuous order book price time priority matching algorithm. In embodiments, the matching engine may apply option points at low and/or high frequencies.

As shown in FIG. 5B, an exchange computer system 3230 can include a web server 5152, an authenticator computer system 5154, a matching engine computer system 5156, an electronic ledger computer system 5158, a risk management computer system 5160, a digital wallet computer system 5162, and/or a fiat account computer system 5164, and/or a SVCoin computer system 5166. The exchange computer system 3230 may communicate with one or more external computer systems, such as bank computer systems, index computer systems, user computer system (e.g., institutional or individual users), and/or user electronic devices. Each computer system may comprise one or more computers and/or one or more processors, a communication portal, display devices, and/or input devices, to name a few.

A web server 5152 may provide display data to one or more user devices 3232, 3202, e.g., user device 3202-1. Display data may comprise website content (e.g., HTML, JavaScript, and/or other data from which a user device can generate and/or render one or more webpages) and/or application content, such as mobile application content, to be used in generating or providing display content for one or more software application. In embodiments, the web server 5152 may authenticate a user account by verifying a received username and password combination.

An authenticator computer system 5154 may perform authentication of user login credentials, multi-factor authentication, and/or compare users against databases, such as government databases, for compliance with anti-money laundering laws and/or regulations.

A matching engine computer system 5156 may match buy (purchase) orders with sell orders, receive orders, and/or update an electronic order book, to name a few.

An electronic ledger computer system 5158 may track and/or store account balances, update account balances, compute account balances, report account balances, and/or place holds on account funds while transactions are in progress (e.g., set an account hold indicator), to name a few.

A risk management computer system 5160 may perform processes to detect fraudulent transactions and/or security breaches. Such a sub-system may monitor access data describing access of the exchange (e.g., IP addresses, accounts, times of access, to name a few), monitor trading data, analyze trading data, determine patterns, determine anomalies, and/or determine violations of pre-programmed security rules, to name a few.

A digital wallet computer system 5162 may generate digital wallets, generate instructions for digital wallet key storage and/or retrieval, allocate digital assets among digital wallets, track digital assets, store digital asset, and/or transfer digital assets, to name a few.

A fiat account computer system 5164 may manage omnibus or pooled accounts for holding customer funds. The fiat account computer system may process receipts of funds, e.g., from a bank, via a wire transfer, via a credit card or ACH transfer, and/or via check, to name a few. Accordingly, the fiat account computer system may communicate with one or more external systems, such as a bank computer system. In embodiments, the fiat account computer system may process withdrawals.

A SVCoin computer system 5166 may manage purchases of tokens using fiat currency and/or digital assets and/or redemption of digital assets in the form of tokens, and/or redemption of tokens for fiat currency. Token computer system 5166 may also generate new tokens, and cancel/redeem tokens. Token computer system 5166 is operatively connected to a token database 5136 that maintains a log of tokens.

Figure 6:
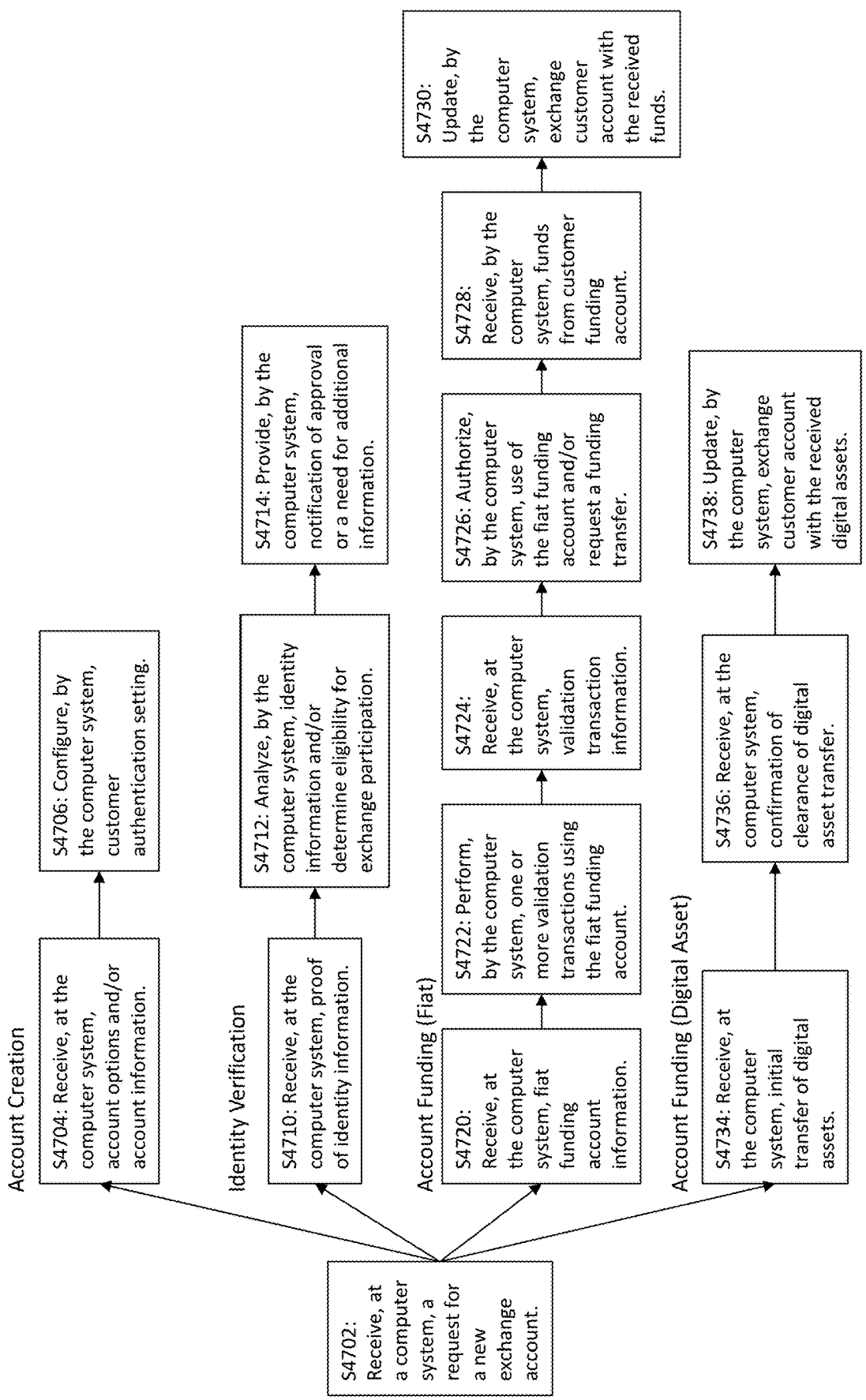
FIG. 6 is an exemplary flow chart for processes for digital asset exchange account creation and account funding in accordance with exemplary embodiments of the present invention.

Referring to the account creation process shown in FIG. 6, in a step S4704 the exchange computer system may receive account options. The exchange computer system, in embodiments, may also receive account information. In embodiments, the exchange computer system may receive account options and account information. Account options may include preferences (e.g. display preferences), and type of account (e.g. personal account, business account, savings account, investment account), to name a few. Account information, in embodiments, may include user identifying information, such as a name, address, phone number, electronic mail address, social security number, bank account number, bank institution, and credit card information, to name a few. In a step S4706, the computer exchange system may configure a customer authentication setting. In embodiments, the customer authentication setting may include, a unique password, a unique username and password combination, biometric data, tokenization, a two factor authentication, and unique security questions and answers, to name a few.

Referring to the identity verification process shown in FIG. 6, in a step S4710, the exchange computer system may receive proof of identity information. Proof of identity information in embodiments may include a unique password, a unique username and password combination, biometric data, tokenization, a two factor authentication, unique security questions and answer, a user name, user address, user phone number, user electronic mail address, user credit card information, user bank account information (e.g. bank account number, institution), and user social security number, to name a few. In a step S4712, the exchange computer system may analyze the identity information. For example, the exchange computer system, in embodiments, may compare a user name and password combination with a data base that stores user name and passwords. In embodiments, the exchange computer system may determine eligibility for exchange participation. For example, the exchange computer system may determine the eligibility for exchange participation by analyzing the credentials of the account to determine whether the account is eligible for exchange participation. In embodiments the exchange computer system may analyze the identity information and determine eligibility for exchange participation.

In a step S4714, the exchange computer system may, depending on the received proof of identity information and the analysis thereof, provide a notification of approval or a notification of a need for additional information. For example, if the proof of identity information is analyzed and the computer exchange system determines that the identity information is correct (e.g. correct user name and password combination), the computer exchange system may provide a notification of approval. The notification of approval may indicate that the identity information is acceptable. The notification of approval may further indicate whether the identity information is associated with an account that is eligible for exchange participation. As another example, if the proof of identity information is analyzed and the computer exchange system determines that the identity information is incorrect or incomplete (e.g. incorrect biometric data or only one of a plurality of security questions answered), the computer system may provide a notification that indicates additional information is needed. In embodiments, the computer exchange system generates the notification of approval. In embodiments, the computer exchange system generates the need for additional information notification.

Referring to the fiat account funding process shown in FIG. 6, in a step S4720 the exchange computer system may receive fiat funding account information. Such information can include a bank account number (e.g., a routing number), a bank name, an account type, and/or an account holder's name, to name a few. In a step S4722, the exchange computer system may perform one or more validation transactions using the fiat funding account. Such transactions may comprise small deposits into the fiat funding account. In a step S4724, the exchange computer system may receive validation transaction information, which may include a transaction amount, date, and/or time. In a step S4726, the exchange computer system may electronically authorize use of the fiat funding account and/or request a funding transfer. Accordingly, the exchange computer system may provide an electronic notification, e.g., via email, via a website, and/or via a mobile phone application (e.g., via a push notification), to name a few, that the fiat funding account is authorized for use with the exchange. A customer may electronically initiate a transaction, e.g., through an exchange-provided user interface or user electronic device operatively connected to the exchange, to transfer funds to the exchange. In a step S4728, the exchange computer system may receive an electronic notification indicating that funds were received, e.g., in an exchange bank account at a partner bank, from the customer fiat funding account. In a step S4730, the exchange computer system can update an exchange customer account with the received funds. Updating an exchange customer account can comprise electronically updating a fiat electronic ledger stored on one or more computer readable media operatively connected to the exchange computer system to reflect the received funds and/or updating a display of the amount of funds in the account or a data ledger on a user computer device or on a printed and/or digitally transmitted receipt provided to the user and/or a user device.

Referring to the digital asset account funding process shown in FIG. 6, in a step S4734, the exchange computer system can receive an initial transfer of digital assets. In a step S4736, the exchange computer system can receive a confirmation of clearance of the digital asset transfer. In a step S4738, the exchange computer system can update an exchange customer account with the received digital assets. Updating an exchange customer account can include making an electronic entry in an exchange digital asset electronic ledger and/or providing a notification that the digital assets are received.

Figure 7A:
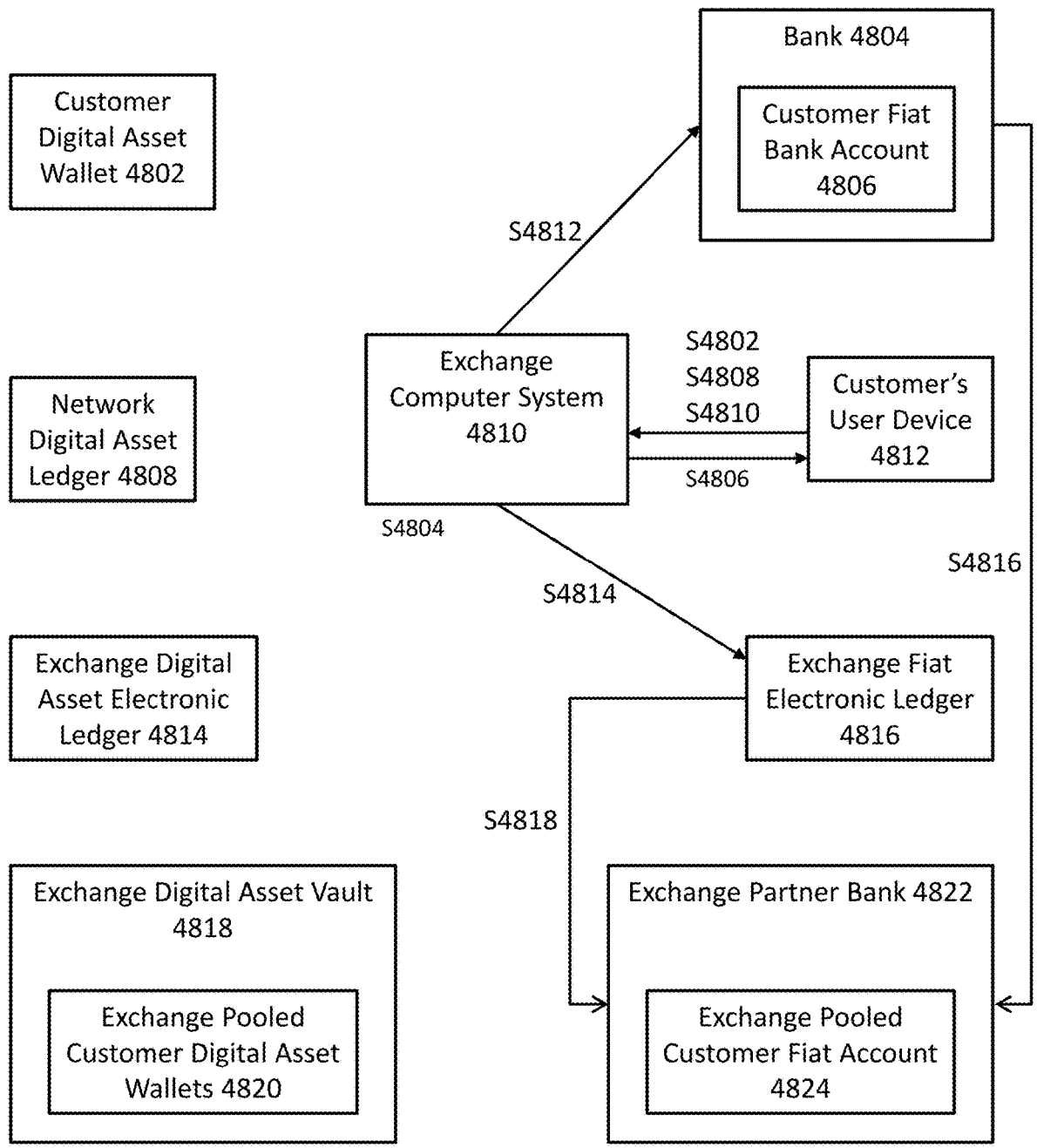
FIGS. 7A-B are an exemplary schematic diagram and a corresponding flow chart of a process for digital asset exchange customer account fiat funding via an exchange-initiated request in accordance with exemplary embodiments of the present invention.
Figure 7B:
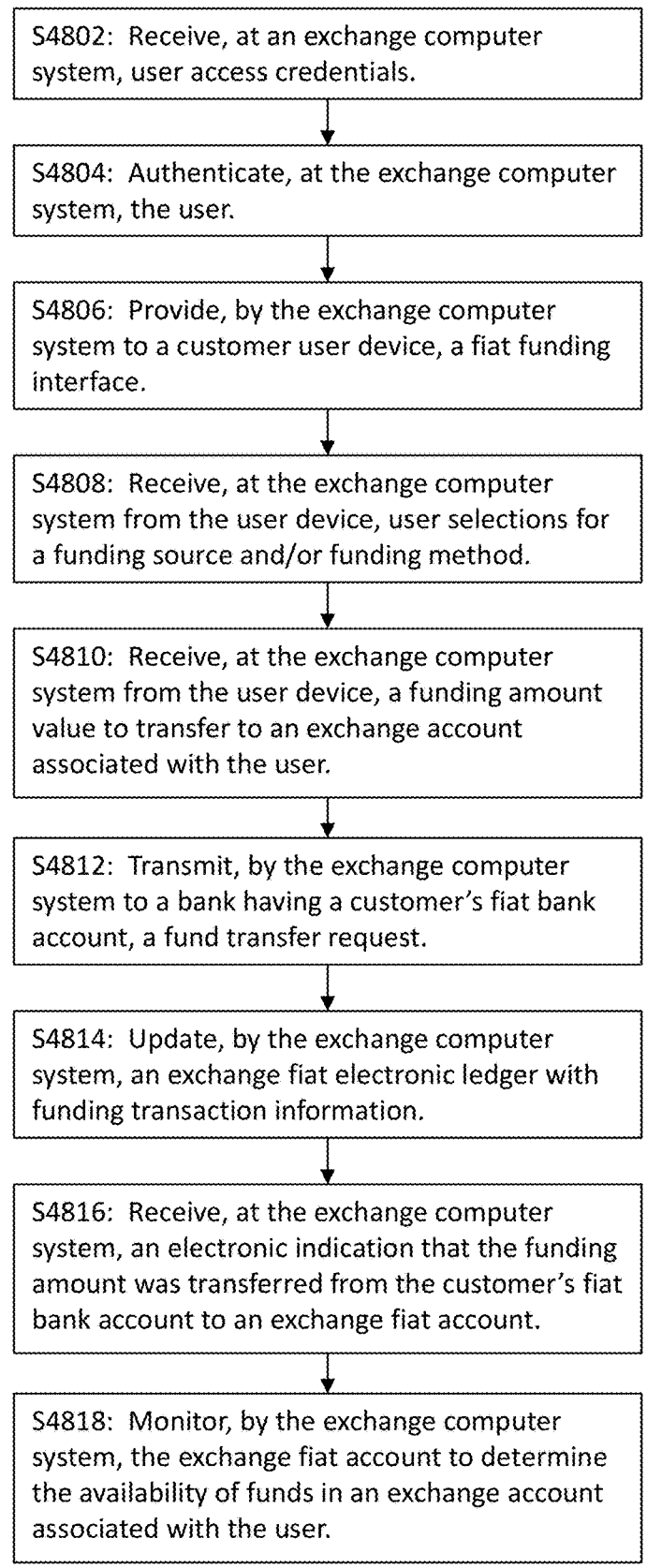

FIG. 7A is an exemplary schematic diagram of an exchange, and FIG. 7B is a corresponding flow chart of a process for digital asset exchange customer account fiat funding via an exchange-initiated request, such as ACH in accordance with exemplary embodiments of the present invention. An exchange computer system 4810 can interface with a customer digital asset wallet 4802, a bank 4804 with a customer fiat bank account 4806, an exchange partner bank 4822 with an exchange pooled customer fiat account 4824, a network digital asset ledger 4808, and/or a customer's user device 4812, to name a few. In addition to the exchange computer system 4810, the exchange can include an exchange digital asset electronic ledger 4814, an exchange fiat electronic ledger 4816, and an exchange digital asset vault 4818 with exchange pooled customer digital asset wallets 4820. Any of these entities or components may communicate directly and/or indirectly, e.g., through a data network, such as the Internet. In embodiments, encryption and/or other security protocols may be used. These entities and components are further described with respect to FIG. 4A.

Referring to FIG. 7B, in a step S4802 the exchange computer system can receive, e.g., from a user device, user access credentials. In a step S4804, the exchange computer system can authenticate the user, such as by verifying the received access credentials. In a step S4806, the exchange computer system may provide to a customer user device a fiat funding interface. In a step S4808, the exchange computer system may receive from the user device user selections for a funding source and/or funding method. The funding source may identify a bank account or other fiat account. The funding method may identify ACH transfer or wire transfer, to name a few. In a step S4810, the exchange computer system can receive from the user device a funding amount value to transfer to an exchange account associated with the user. In embodiments, S4808 and S4810 may be a single step. Accordingly, the exchange computer system may receive from a user electronic device a user electronic request comprising a funding amount and a funding method, wherein the funding method is an ACH transfer and the request further identifies a verified user bank account.

In a step S4812, the exchange computer system can transmit a fund transfer request to a bank where the customer has a fiat bank account. Accordingly, the exchange computer system may transmit to an exchange partner bank an electronic funding request comprising the funding amount and the user bank account identifier.

In a step S4814, the exchange computer system can update an exchange fiat electronic ledger with the funding transaction information. In a step S4816, the exchange computer system can receive an electronic indication that the funding amount was transferred from the customer's fiat bank account to an exchange fiat account, e.g., at a partner bank. In a step S4818, the exchange computer system can monitor the exchange fiat account to determine the availability of funds in an exchange account associated with the user. In embodiments, the exchange computer system may generate and/or provide an electronic notification to one or more user devices associated with a user account that funds are available for use on the exchange. In embodiments, the notification may indicate a current balance of a user account (e.g., in fiat currency and/or digital asset quantities).

Figure 7C:
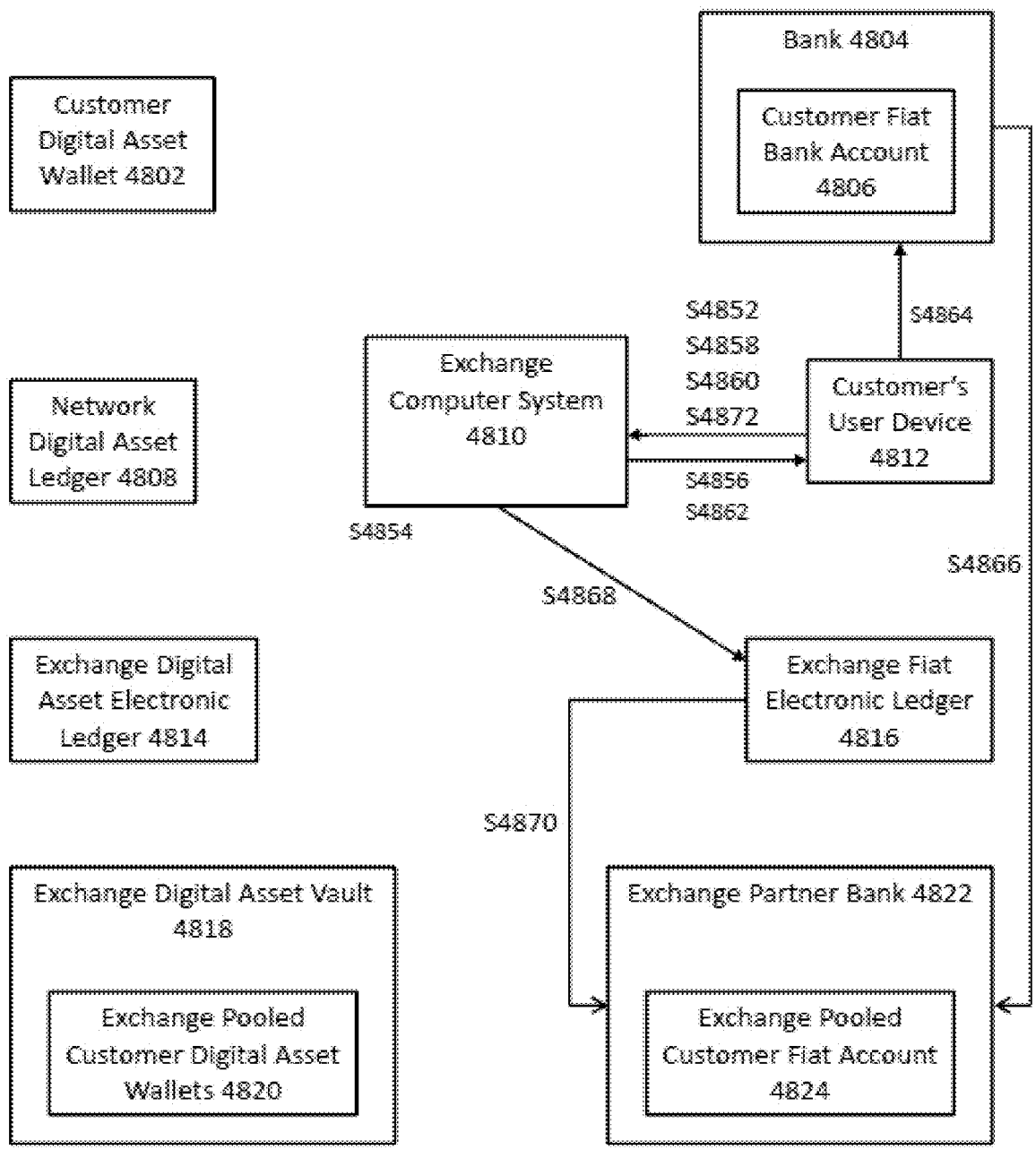
FIGS. 7C-E are an exemplary schematic diagram and corresponding flow charts of processes for digital asset exchange customer account fiat funding via a customer-initiated request in accordance with exemplary embodiments of the present invention.
Figure 7D:
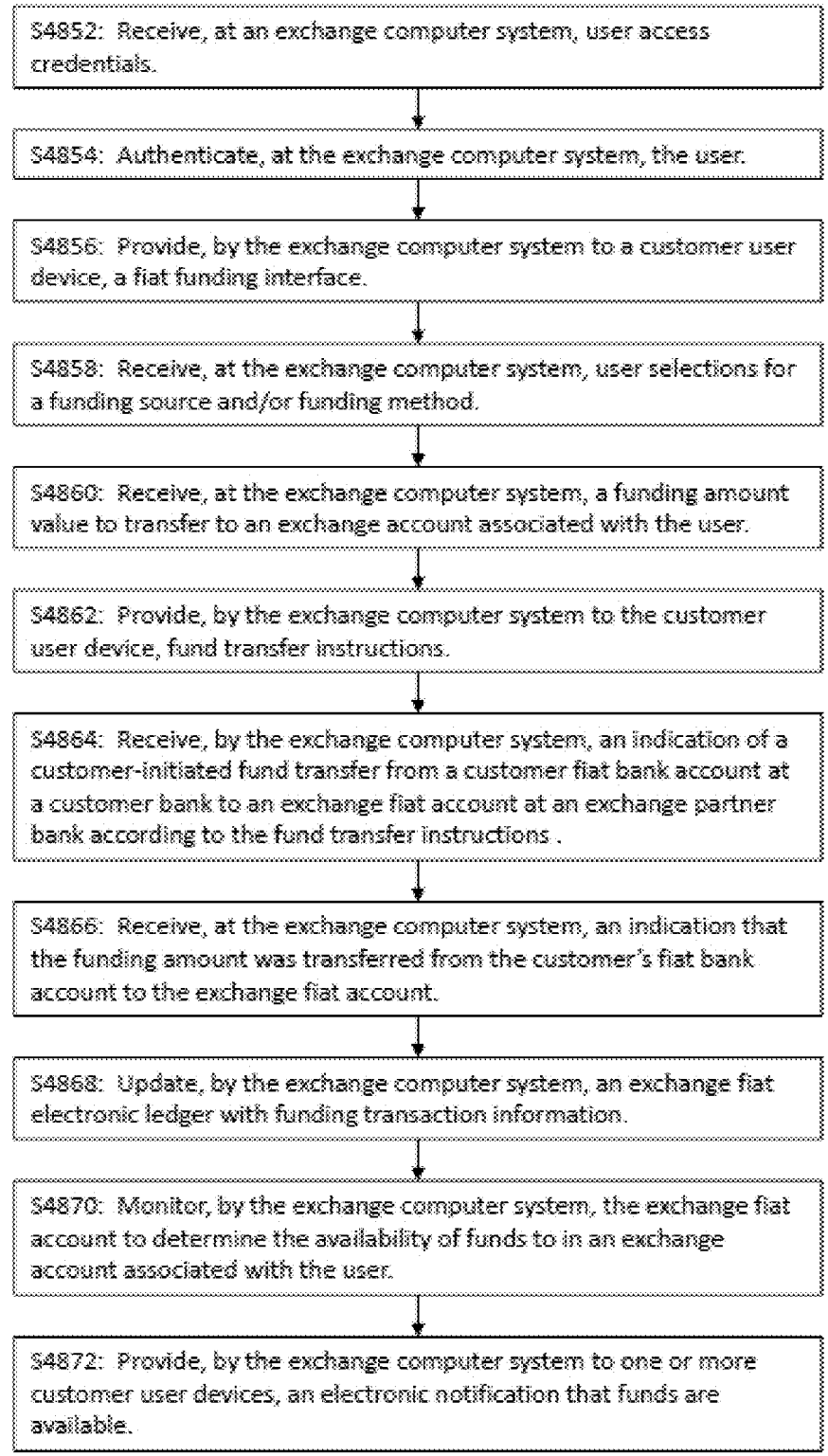

FIG. 7C is an exemplary schematic diagram of an exchange, and FIG. 7D is a corresponding flow chart of a process for digital asset exchange customer account fiat funding via a customer-initiated request, such as a wire transfer, in accordance with exemplary embodiments of the present invention. The components and entities associated with an exchange that are shown in FIG. 7C are described with respect to FIG. 4A.

FIG. 7D is a flow chart showing an exemplary process for digital asset exchange customer account fiat funding. In a step S4852, an exchange computer system can receive user access credentials. In a step S4854, the exchange computer system can authenticate the user by verifying the received access credentials. Verifying the access credentials can comprise comparing the credentials to a secure credentials database. In a step S4856, the exchange computer system can provide to a customer user device a fiat funding interface. In a step S4858, the exchange computer system can receive from the customer user device, user selections for a funding source and/or funding method. The funding method may be a customer-initiated method, such as a wire transfer. In a step S4860, the exchange computer system can receive a funding amount value to transfer to an exchange account associated with the user. In a step S4862, the exchange computer system can provide to the customer user device fund transfer instructions, e.g., wire instructions. In a step S4864, the exchange computer system may receive an electronic indication of a customer-initiated fund transfer from a customer fiat bank account a customer bank to an exchange fiat account at an exchange partner bank according to the fund transfer instructions. In embodiments, step S4864 may be skipped. In a step S4866, the exchange computer system may receive an indication that the funding amount was transferred from the customer's fiat bank account to the exchange fiat account. In a step S4868, the exchange computer system can update an exchange fiat electronic ledger with the funding transaction information, which may include an amount value, customer account ID, transaction date and/or time, to name a few. In a step S4870, the exchange computer system can monitor the exchange fiat account to determine the availability of funds in an exchange account associated with the user. In a step S4872, the exchange computer system can provide an electronic notification to one or more customer user devices that funds are available for use on the exchange.

Figure 7E:
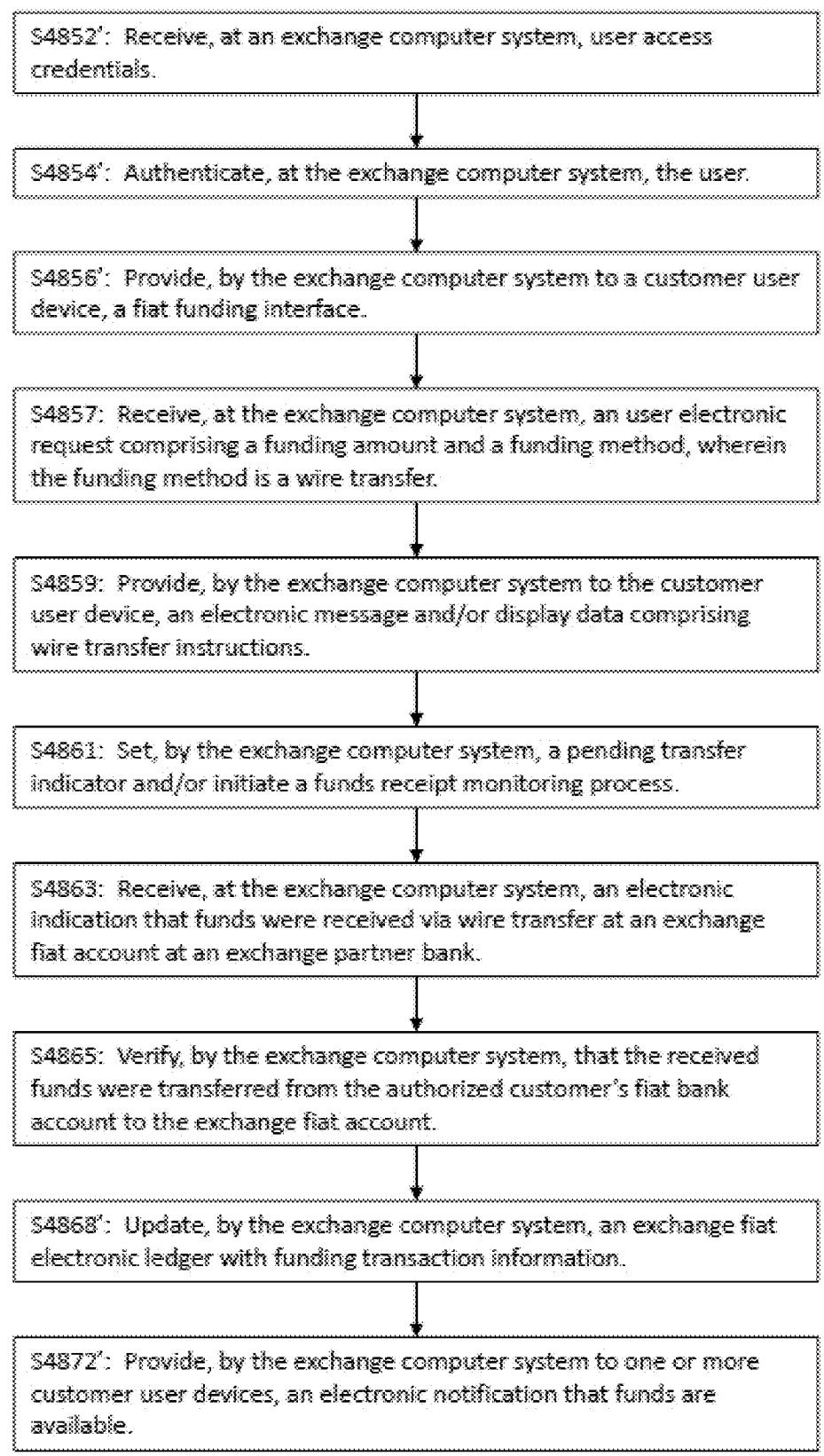

FIG. 7E is a flow chart showing another exemplary process for digital asset exchange customer account fiat funding. In a step S4852', an exchange computer system can receive user access credentials. In a step S4854', the exchange computer system can authenticate the user by verifying the received access credentials. Verifying the access credentials can comprise comparing the credentials to a secure credentials database. In a step S4856', the exchange computer system can provide to a customer user device a fiat funding interface. In a step S4857, the exchange computer system can receive a user electronic request comprising a funding amount and a funding method (e.g., a wire transfer). In a step S4859, the exchange computer system can provide to the customer user device, an electronic message and/or display data comprising wire transfer instructions. In a step S4861, the exchange computer system can set a pending transfer indicator and/or initiate a funds receipt monitoring process. In a step S4863, the exchange computer system can receive an electronic indication that funds were received via wire transfer at an exchange fiat account at an exchange partner bank. In a step S4865, the exchange computer system can verify that the received funds were transferred from the authorized customer's fiat bank account to the exchange fiat account. In a step S4868', the exchange computer system can update an exchange fiat electronic ledger with the funding transaction information, which may include an amount value, customer account ID, transaction date and/or time, to name a few. In a step S4870, the exchange computer system can monitor the exchange fiat account to determine the availability of funds in an exchange account associated with the user. In a step S4872', the exchange computer system can provide an electronic notification to one or more customer user devices that funds are available for use on the exchange.

Figure 8A:
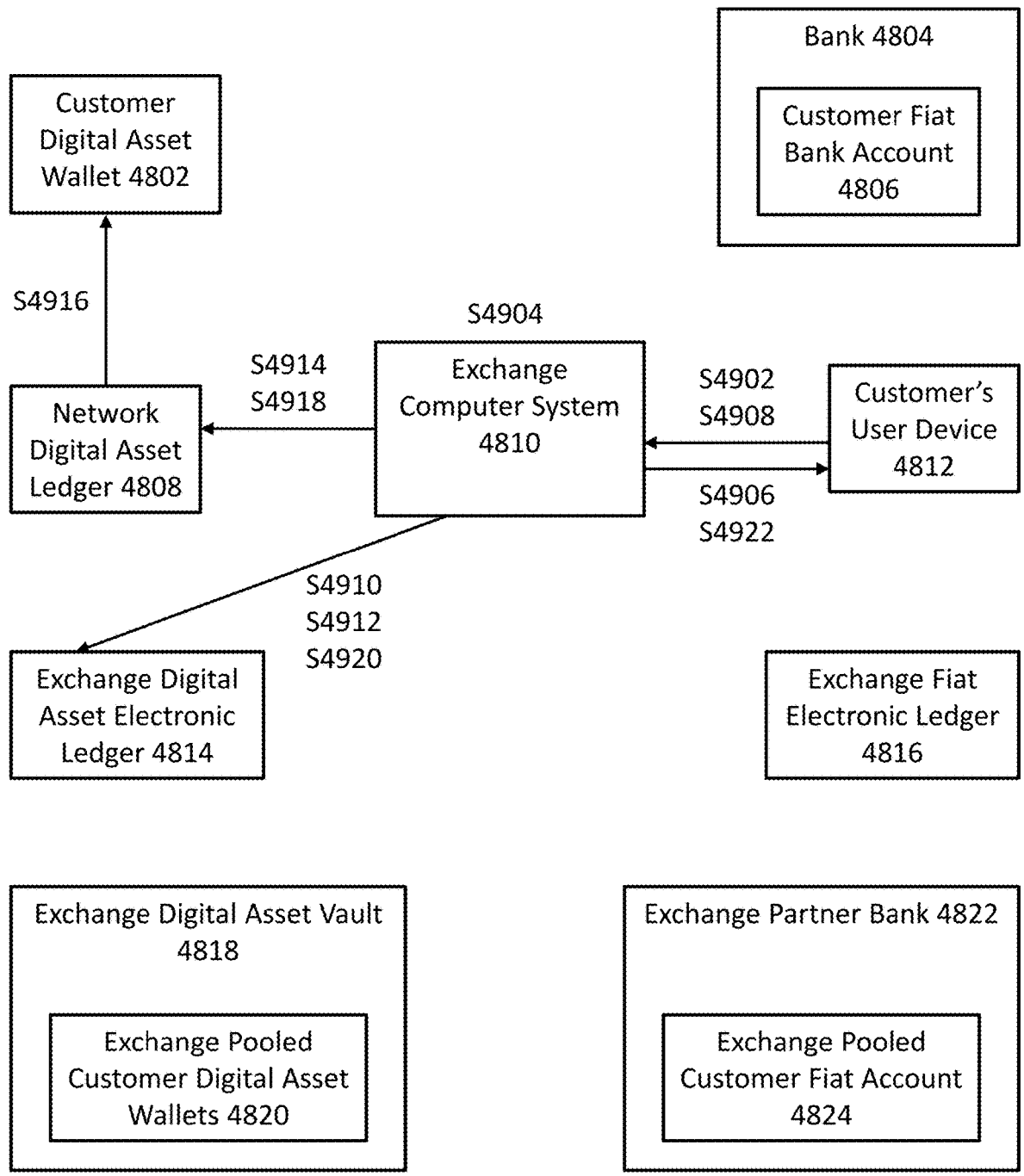
FIGS. 8A-B are a schematic diagram and a corresponding flow chart of a process for digital asset exchange account digital asset withdrawal in accordance with exemplary embodiments of the present invention.
Figure 8B:
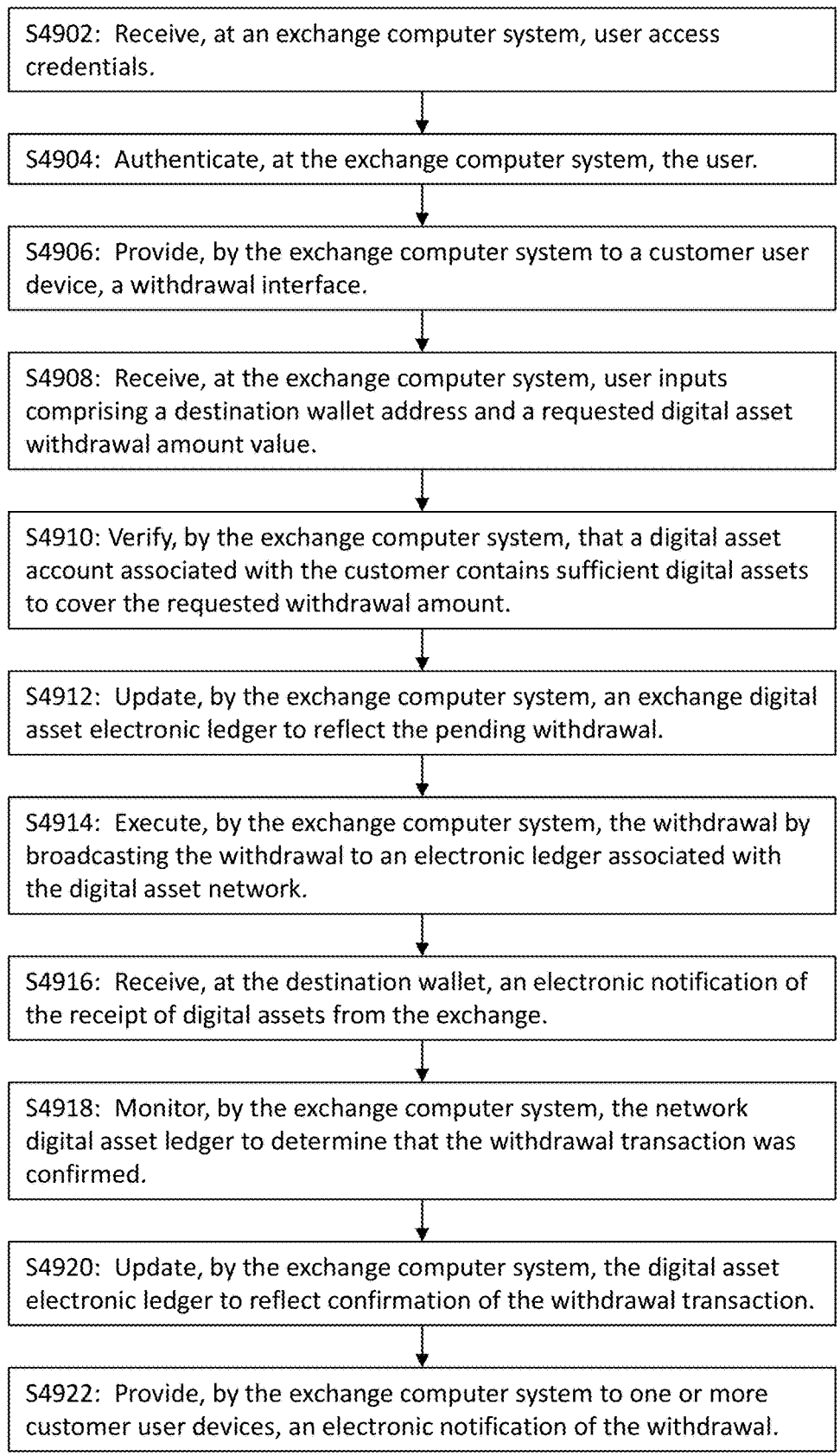

FIG. 8A is an exemplary schematic diagram of an exchange, and FIG. 8B is a corresponding flow chart of a process for digital asset exchange account digital asset withdrawal in accordance with exemplary embodiments of the present invention. The components and entities associated with an exchange that are shown in FIG. 8A are described herein with respect to FIG. 4A.

Referring to FIG. 8B, in a step S4902, an exchange computer system can receive user access credentials. User access credentials can include any of a username, password, fingerprints, access card scan (e.g., swipe of a card associated with the exchange and having a magnetic strip), and/or a pin (e.g., a number provided via SMS, other text message service, or email for multi-factor authentication), to name a few. In a step S4904, the exchange computer system can authenticate the user based upon the received user access credentials. In a step S4906, the exchange computer system may provide to a customer user device a withdrawal interface. In a step S4908, the exchange computer system may receive from the customer user device user inputs comprising at least a destination wallet address and a requested digital asset withdrawal amount value. In a step S4910, the exchange computer system may verify that a digital asset account associated with the customer contains sufficient digital assets to cover the requested withdrawal amount. In embodiments, such verification can comprise reading a digital asset electronic ledger and/or determining a customer digital asset balance, e.g., based on summing transactions recorded on a digital asset electronic ledger. In a step S4912, the exchange computer system may update an exchange digital asset electronic ledger to reflect the pending withdrawal. In embodiments, recording an entry in the electronic ledger prior to the withdrawal may be performed to prevent double spending. In other embodiments, such a step may be skipped. In a step S4914, the exchange computer system may execute the withdrawal, e.g., by broadcasting the withdrawal to a digital asset network electronic ledger, e.g., the Bitcoin Blockchain, the Ethereum Blockchain, to name a few. In a step S4916, the destination wallet may receive an electronic notification of the receipt of digital assets from the exchange. In a step S4918, the exchange computer system may monitor the network digital asset ledger to determine whether and/or when the withdrawal transaction is confirmed. In a step S4920, the exchange computer system may update the digital asset electronic ledger, e.g., by debiting the withdrawal amount from the customer's exchange account, to reflect confirmation of the withdrawal transaction. In a step S4922, the exchange computer system may provide to one or more customer user devices an electronic notification of the withdrawal. Such a notification can include at least the customer's new digital asset balance.

A digital asset exchange can include additional systems, which may include software modules, for performing various functions of the exchange. For example, an exchange can include an account management system, which may comprise a user account registration system for new users and/or an existing user account management system. The exchange can include a trading system, which may comprise an interactive trading interface system, an automated trading interface system, a trade confirmation notification system, and/or a trade transaction fee processing system. A fund transfer system can include a fiat account funding and redemption system, a digital asset accounting funding and redemption system, and an account funding and redemption fee processing system. An exchange can also include a trade settlement system. A customer service system can include a trade dispute resolution interface system and a customer account management assistance system. A customer reporting system can include a gain and loss reporting system and a transaction history system. A fraud analysis system can monitor transactions to detect fraudulent and/or unauthorized transactions. The exchange can also include a token system, which may comprise a purchase system, redemption system, and a dividend payment system. In a preferred embodiment, a token system is included to allow users to purchase and redeem stable value coins using fiat currency and/or other digital assets.

Exchange Digital Asset Storage Structure

Deposited customer fiat may be held in a pooled fiat account maintained in a partner bank. Meanwhile, digital assets held by the exchange may be maintained in pooled digital wallets. The exchange may store digital assets using any of the security and/or storage systems and methods discussed herein. The exchange can employ any combination of varying levels of secure storage for its wallets. For example, portions of digital assets held by the exchange may be maintained in cold storage with neither the wallet's private nor public keys ever having been exposed to a digital asset network or other external network, such as the Internet. Other digital assets may be stored in air-gapped hot wallets, which may be wallets generated offline with transactions generated offline, e.g., on an isolated computer, and transferred to a networked computer via a temporary physical connection or manual transfer. Other digital assets may be maintained in hot wallets, e.g., to satisfy withdrawals from the exchange. The exchange may determine the amount of assets to hold in hot wallets, which may be based on historical exchange activity and/or anticipated need. A hot wallet liquidity module may analyze and predict the amount of assets per wallet and/or during a time period required to meet anticipated need and may also initiate transfers of assets to or from hot wallets to maintain desired levels. For example, a hot wallet liquidity module could determine that it is desirable to maintain digital assets in certain defined amounts (e.g., 0.5 bitcoin), and/or certain defined fiat amounts (e.g., $100 worth of bitcoin) and/or of certain defined quantities sufficient to cover transactions anticipated during a defined period (e.g., the day's transaction). In embodiments, initiating an electronic transfer may comprise electronically generating and providing an electronic notification to devices associated with one or more exchange administrators of a need to transfer assets and/or an amount of assets to transfer. The exchange may designate one or more wallets for receiving incoming digital assets only. For example, the exchange may employ a single digital wallet for each receipt of digital assets, e.g., from exchange users. The receiving wallet may be destroyed after the received assets are transferred to one or more other wallets.

The exchange may employ any of a number of different exchange digital wallet systems. As discussed herein, the exchange may operate a pooled or omnibus digital wallet system, e.g., as part of a centralized exchange system. The pooled system may use an electronic ledger to track digital asset ownership for each exchange customer. Customers may transfer digital assets from their own digital wallets to an exchange address in order to fund their digital asset account on the exchange. The ledger can track (e.g., record) such funding events, as well as withdrawal events. Transfers of digital assets among customers can also be accounted for using the ledger. With a pooled wallet system, internal transactions on the exchange (e.g., transactions that do not entail transferring funds to or from the exchange or exchange wallets but rather transactions between exchange wallets) can be settled without delay, since the transfer can be logged through electronic ledger updates and does not have to otherwise be processed by a digital asset network.

In another embodiment, the exchange digital wallet system may comprise exchange operated wallets for each exchange customer. The wallets may be maintained in trust by the exchange for each customer. Transactions may be processed by the digital asset network, e.g., the Bitcoin network, the Ethereum network, to name a few. The keys to each customer wallet may be held by the customer and/or by the exchange. Transactions may be settled via the digital asset network in real-time (with any corresponding confirmation period) as they occur, or transactions may be settled in a batch, which may entail broadcasting a plurality of transactions to the network at a particular time or periodically throughout a day.

In another embodiment of an exchange digital wallet system, the exchange customers may own and/or manage their own wallets, e.g., as part of a decentralized exchange system. The exchange would not hold any customer digital assets, and customers would hold the private keys to their wallets. The exchange may match customers, as described herein, so that a digital asset seller can transfer digital assets from the seller's digital wallet to a digital wallet corresponding to a digital asset buyer.

In embodiments, the digital wallet may be a custodial digital wallet. The custodial digital wallet may be segregated, that is, unique to a particular customer or commingled, including digital assets of multiple customers. In such an embodiment, the custodian holds digital assets in the custodial wallet for the benefit of its customers. The custodian would hold the private key to each custodial wallet whether it be segregated or commingled. Transactions may be made between different custodial wallets or between custodial wallets and exchange customer wallets in the manner described above.

Centralized Digital Asset Exchange

In embodiments, the exchange may hold customer fiat currency and/or digital assets in centralized, pooled accounts or wallets. The exchange may maintain an electronic ledger to record transactions among users of the exchange. Separate electronic fiat account ledgers and electronic digital asset ledgers may be maintained. Maintaining a ledger may involve electronically updating the ledger to reflect pending transactions and/or completed transactions, which may involve debiting assets from a user's account and/or crediting assets to a user's account. Broadcast to a digital asset network and confirmation from a digital asset network may not be performed for transactions within the exchange, e.g., transactions between a digital asset seller selling digital assets that are stored by the exchange and a buyer paying with fiat currency that is held in an exchange bank account, such as a pooled account.

In embodiments, for both a decentralized and a centralized exchange the exchange may provide the ability for customers to purchase digital assets from the exchange and/or sell digital assets to the exchange such that the exchange operator or owner is the counterparty to the transaction. Transaction amount limits may be place on such transactions and/or additional fees may be charged. In addition, in embodiments, the exchange may provide a dashboard interface for users (such as registered users) to purchase tokens using fiat currency and/or digital assets and/or to redeem digital assets in the form of tokens. In embodiments, the dashboard interface for the exchange may also allow users to redeem tokens for fiat currency. Since tokens are pegged to a fiat currency, when tokens are purchased an equal amount of fiat will be set aside by the exchange as a reserve for when the tokens are redeemed. Similarly, when tokens are redeemed, payment for such redemption shall come from reserves set aside for such redemption.

Exchange Operations Systems

In embodiments, a digital asset exchange may require users to open designated accounts associated with the user in order to participate in the exchange. Each user may have a digital math-based asset account to record and maintain such user's digital math-based assets and a fiat account to record and maintain such user's fiat assets. In embodiments, the fiat assets recorded in the fiat account may be U.S. Dollars ("USD") held in one or more omnibus bank accounts with one or more FDIC-insured depository institutions or banks. In embodiments, a digital math-based asset computer system of a digital asset exchange may record in an electronic ledger information associated with a user account, such as digital math-based asset purchase orders, digital math-based asset sell orders, digital math-based asset purchase offers, digital math-based asset sell offers. In embodiments, digital math-based asset purchase offers and digital math-based asset sell offers may be converted into digital math-based asset purchase orders and digital math-based asset sell orders, respectively, according to a user's instructions, if certain user-specified factors are met (e.g., digital math-based assets are within a given price, quantity, period of time, to name a few). In embodiments, when the digital math-based asset computer system matches an electronic digital math-based asset purchase order with an electronic digital math-based asset sell order, the digital math-based asset computer system may record the trade in an electronic ledger, effectively transferring ownership of the seller's traded digital math-based assets to the buyer, and ownership of the related purchase price in fiat currency from the buyer to the seller. In embodiments, the changes in a user's ownership of digital math-based assets and fiat currency recorded in the electronic ledger are reflected in a user's digital math-based asset account and fiat account.

In embodiments, a digital asset exchange may accept payment methods (e.g., credit card transactions; Automated Clearing House (ACH) debits, wire transfers, digital asset transactions, to name a few) for purchases of digital assets.

In embodiments, a digital asset exchange may hold digital math-based assets and/or fiat currency in trust for users. Fiat currency may be maintained in accounts with a state or federally chartered bank and may be eligible for FDIC insurance, subject to compliance with applicable federal regulation. In embodiments, a digital asset exchange may also operate a digital math-based asset storage system, in which users may deposit digital math-based assets. In embodiments, fiat currency may be transmitted to a digital asset exchange's omnibus account. In embodiments, the exchange may transmit fiat currency back to a user upon receiving a request from a user.

In embodiments, a digital asset exchange may comply with relevant laws and regulations whereby the exchange may operate in a highly regulated banking environment and permit necessary supervision by relevant legal authorities.

In embodiments, when a user commences an electronic digital math-based asset purchase order to acquire digital math-based assets, the user may either have fiat currency in an associated user account or the buyer may send fiat currency to the digital asset exchange's omnibus account at the applicable bank. In embodiments, when a seller commences an electronic digital math-based asset sell order to sell digital math-based assets, the seller may either have digital math-based assets in an associated user account or may send digital math-based assets to a digital math-based asset account. In embodiments, the seller may send digital math-based assets to one or more of digital wallets held by the exchange. In embodiments, exchange transactions may only be completed after the digital math-based asset computer system verifies that the digital math-based asset accounts and fiat accounts associated with the users involved in the transaction at least equal the quantities required by the transaction.

Exchange-Based Token to Fiat Portal

In embodiments, the exchange may permit trading twenty-four hours a day, seven days a week. In embodiments, the exchange may shut down for scheduled maintenance periods. In embodiments, the exchange may prohibit users from transferring fiat currency outside of normal business hours, in order to comply with applicable laws and regulations. In embodiments, the exchange may allow users to deposit and withdraw digital math-based assets outside of normal business hours. In embodiments, the exchange may permit users to sell digital math-based assets for fiat currency or buy digital math-based assets with fiat currency if the user holds sufficient fiat currency in its associated account prior to initiating the transaction. In embodiments, registered users of a digital asset exchange system, such as Gemini, may purchase and/or redeem tokens for fiat and/or other digital assets though one or more digital asset dashboard interfaces. In embodiments, the one or more digital asset dashboard interfaces may include: (i) a dashboard fiat interface which allows registered users to deposit and/or withdrawal fiat with the digital asset exchange; (ii) a dashboard digital asset interface which allows registered users to deposit and/or withdrawal digital assets with the digital asset exchange system; and (iii) a dashboard token interface which allows registered users to purchase and/or redeem tokens with the digital asset exchange system. Each of these dashboard interfaces will now be described in turn.

Figures 1, 9A:
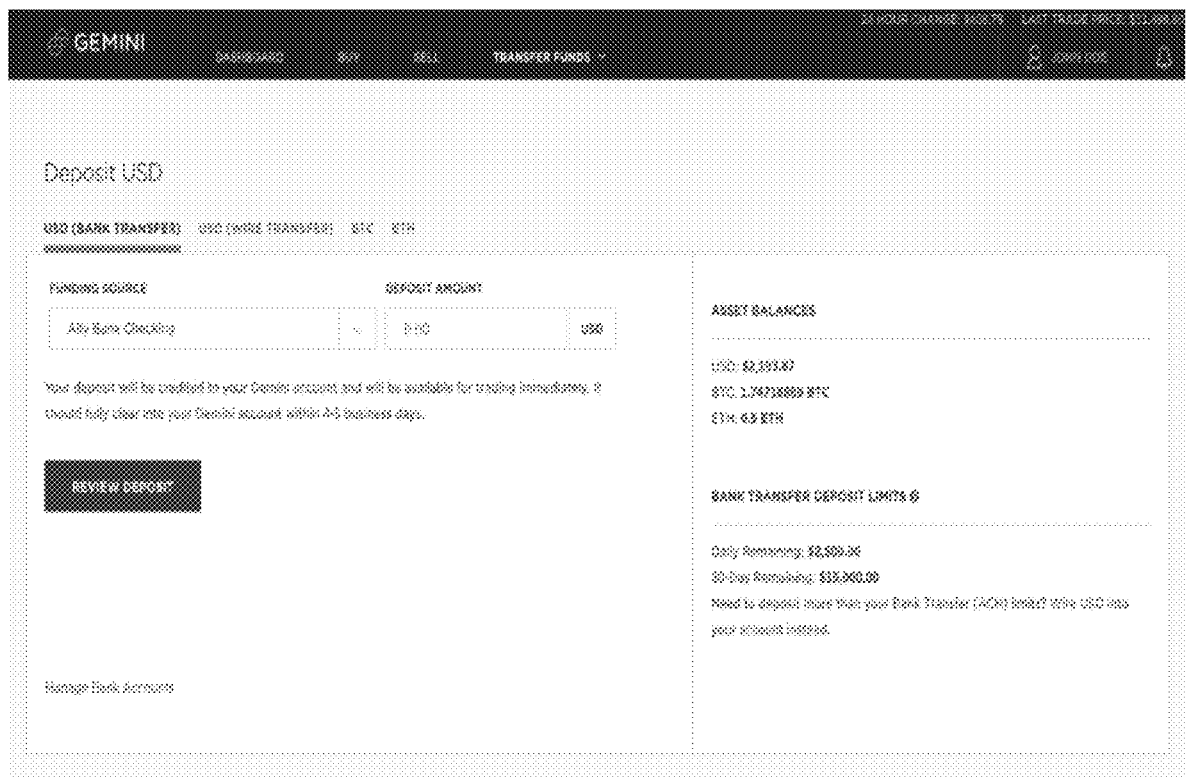
Figures 2, 9A:
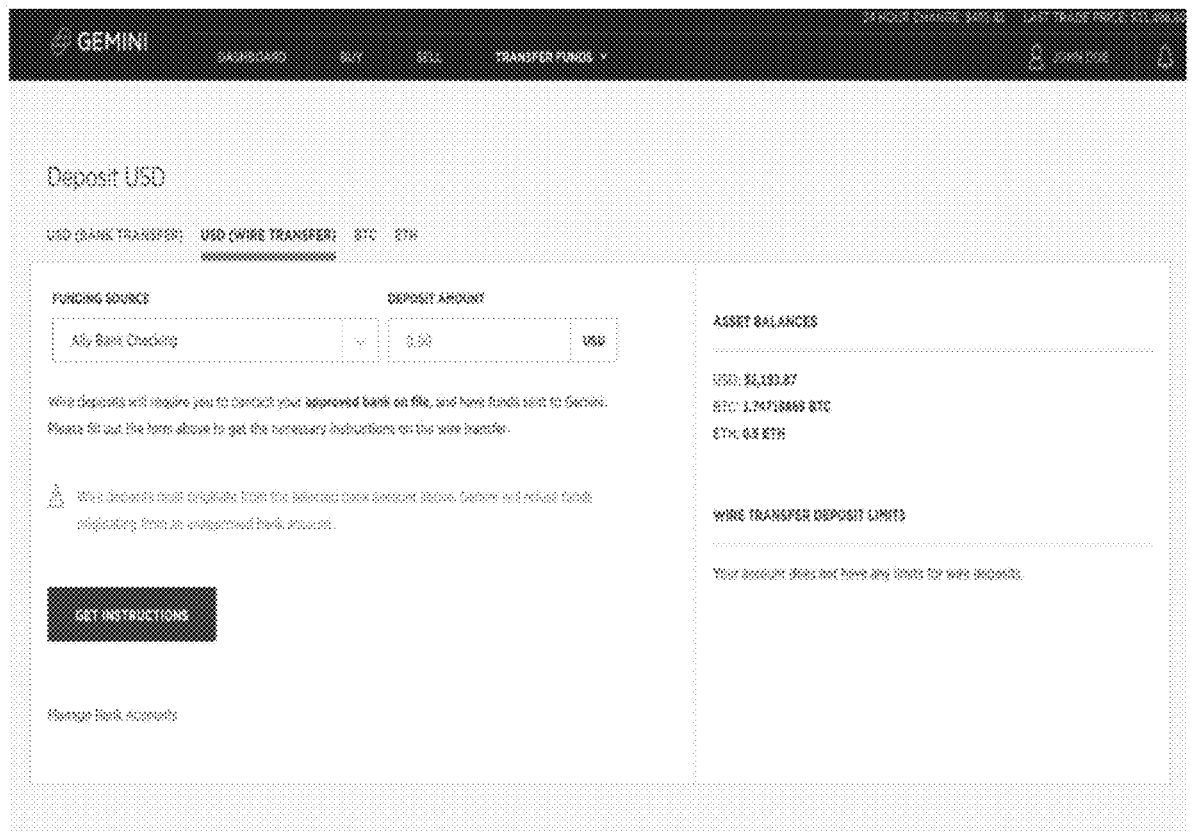
Figures 3, 9A:
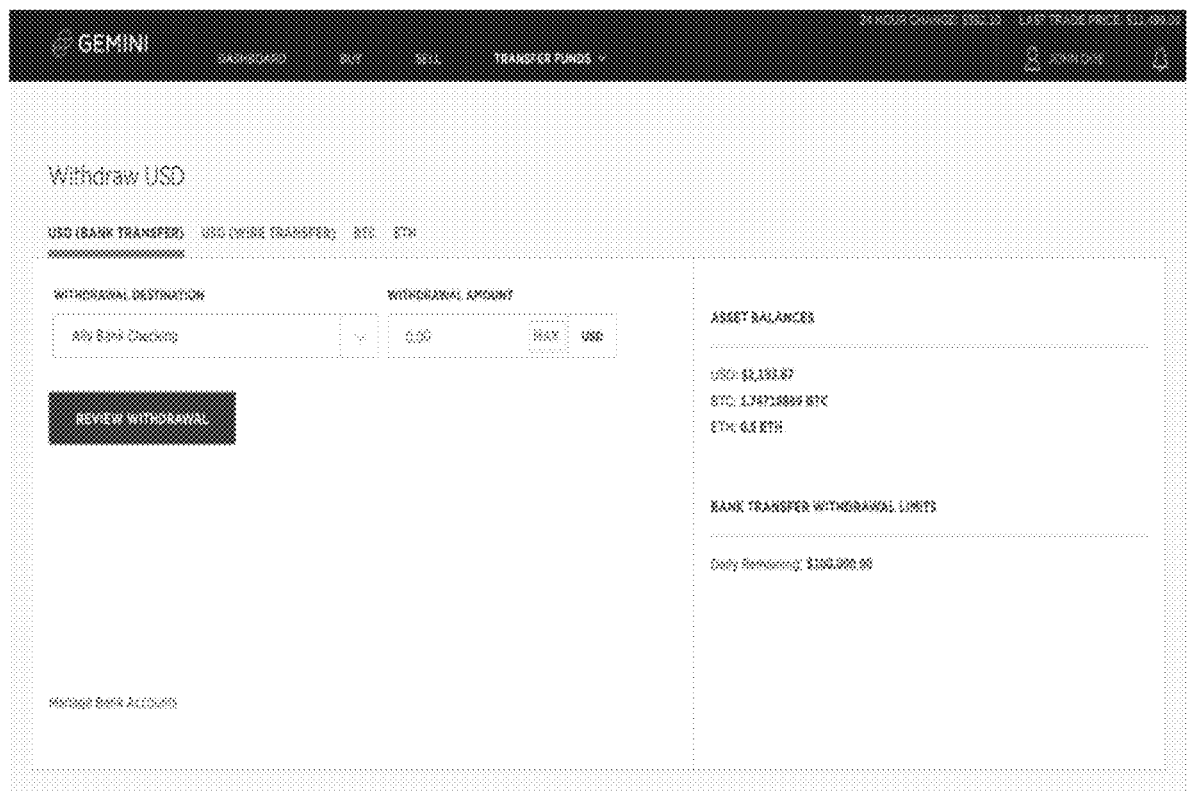
Figures 4, 9A:
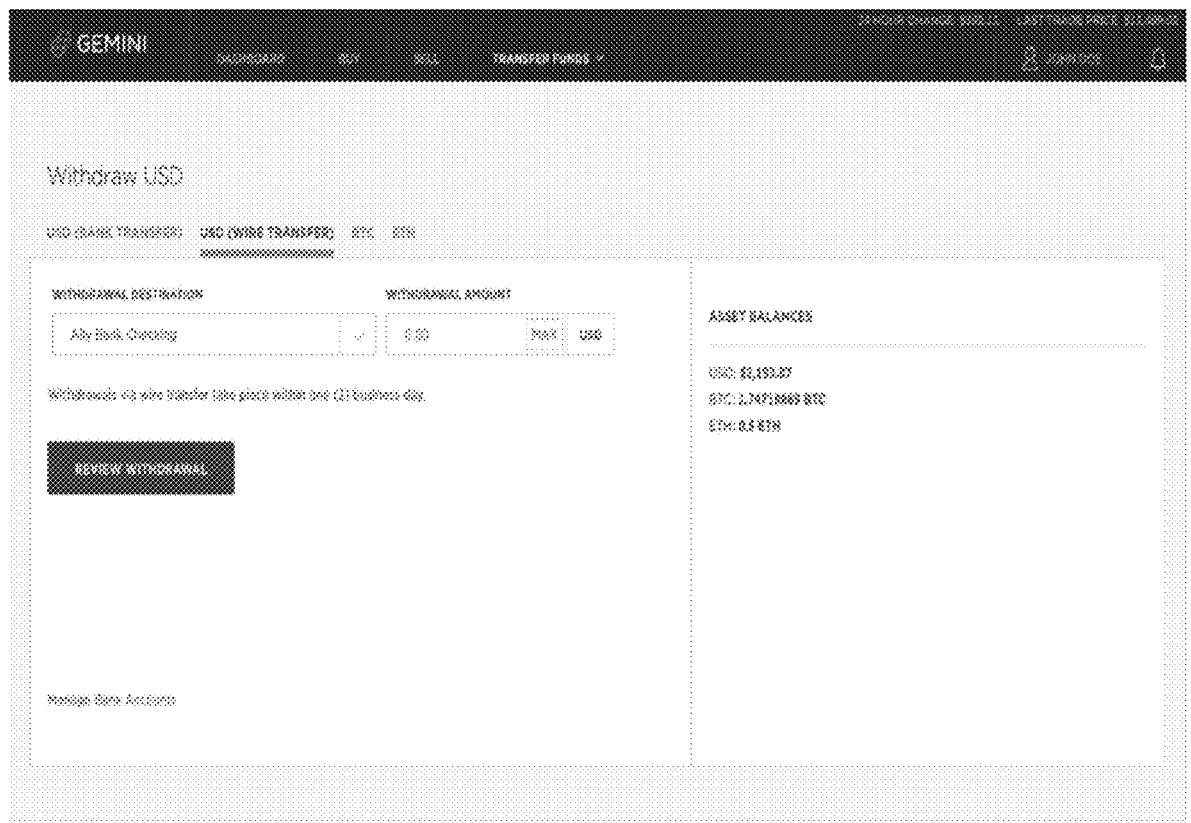

FIGS. 9A-1 through 9A-4 illustrate exemplary embodiments of a dashboard fiat interface which allows registered users to deposit and/or withdraw fiat with the digital asset exchange.

Figures 1, 9B:
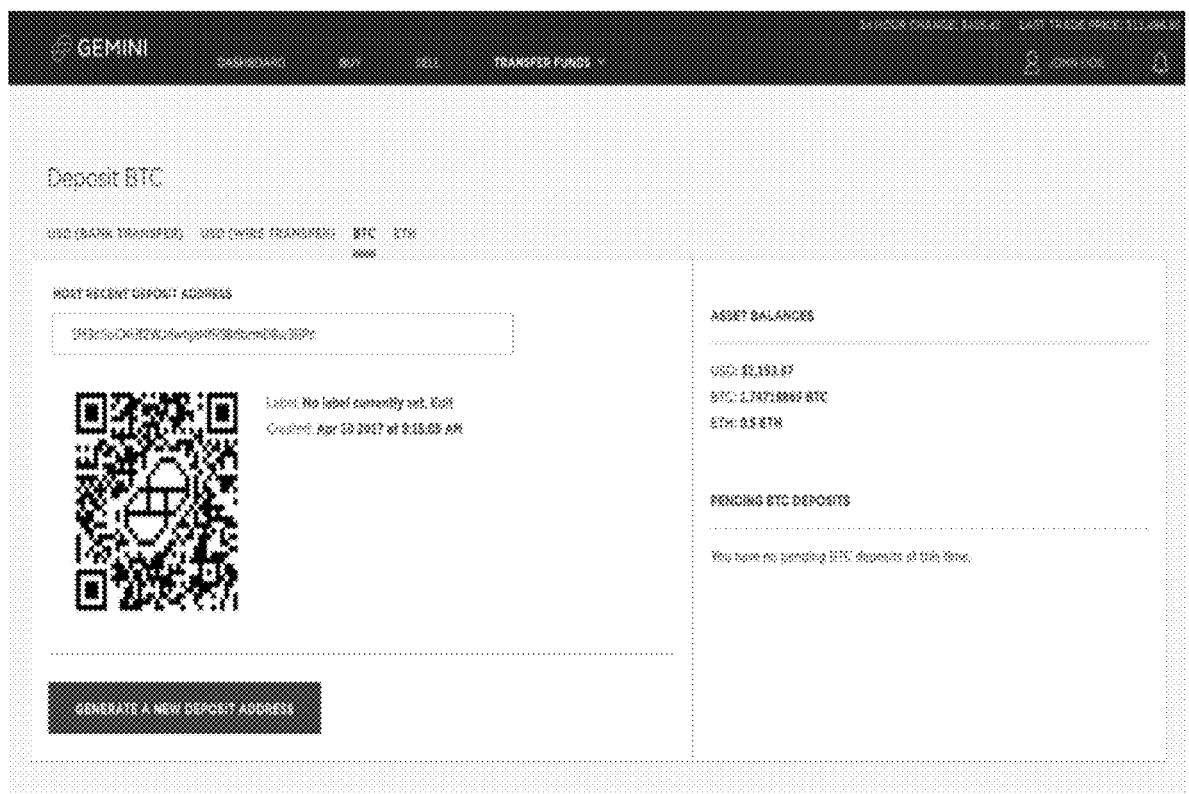
Figures 2, 9B:
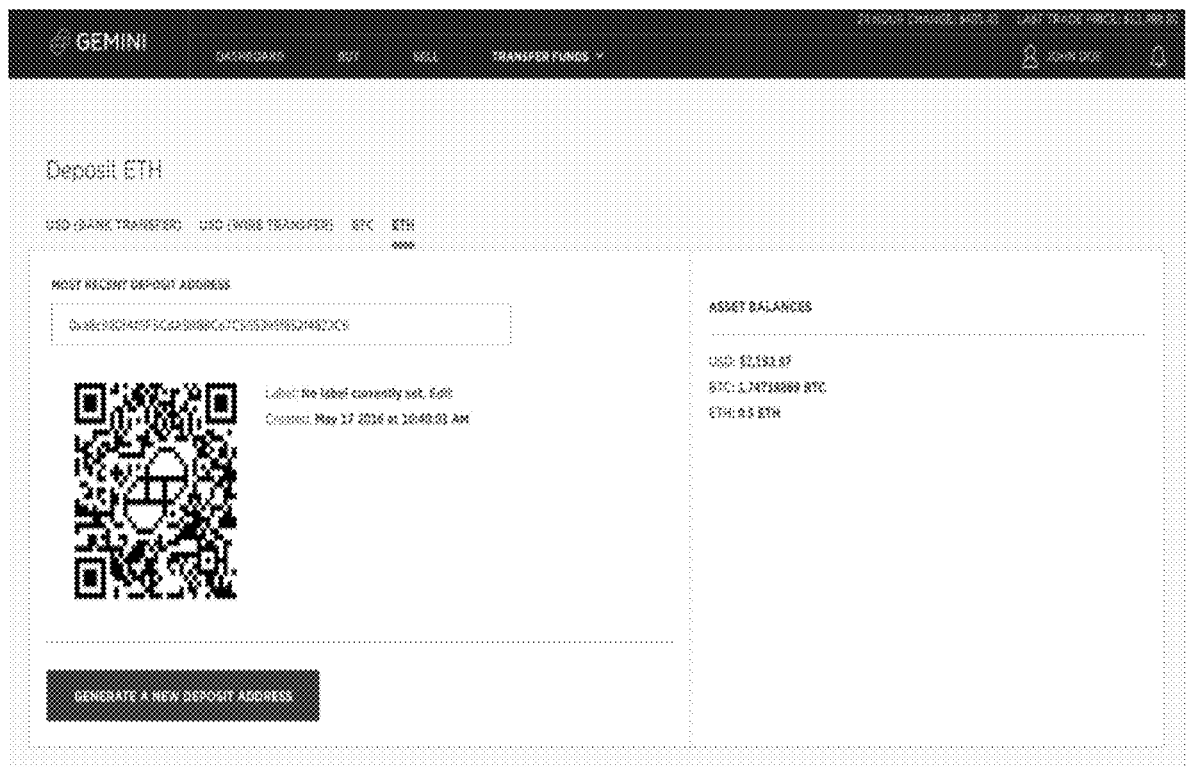
Figures 3, 9B:
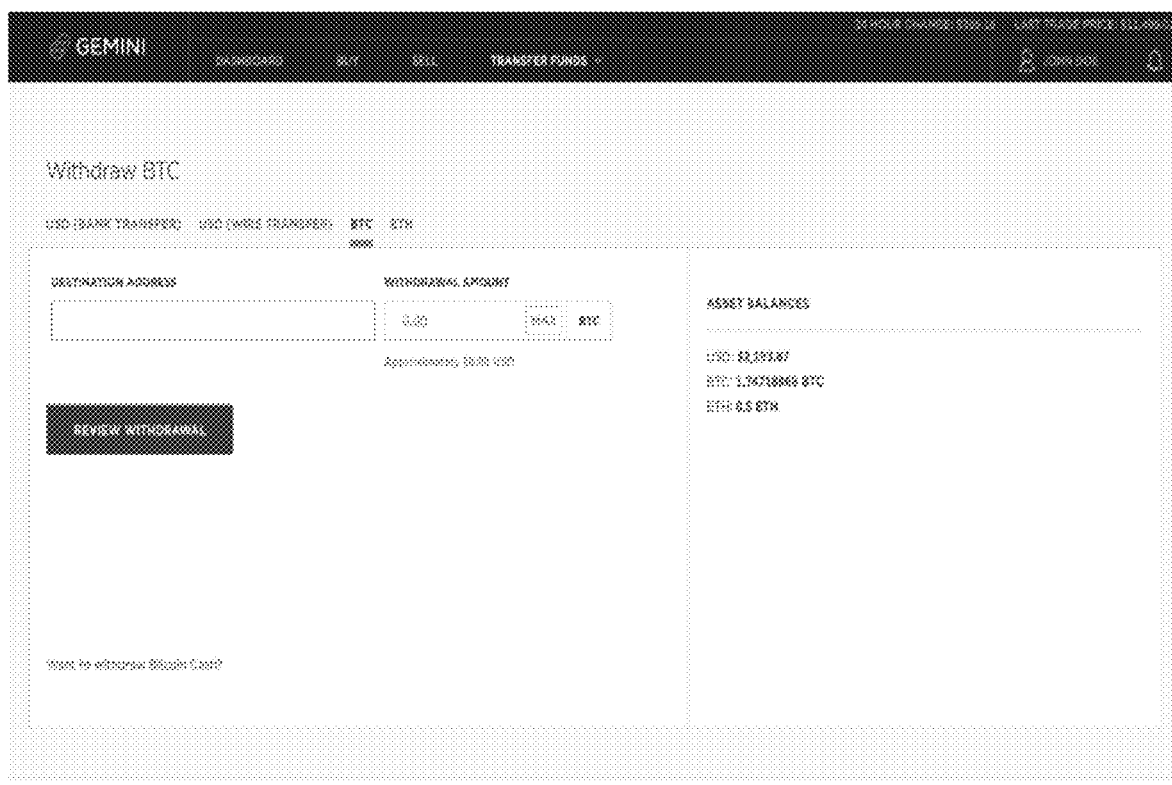
Figures 4, 9B:
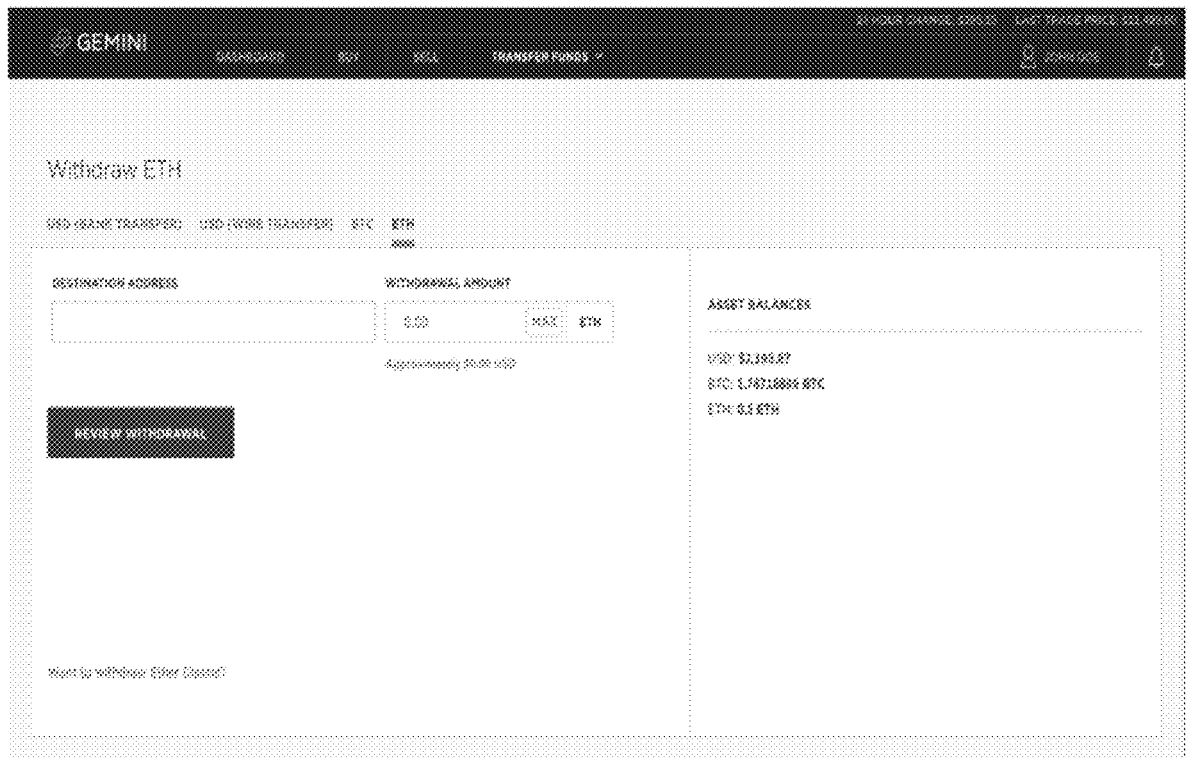

FIGS. 9B-1 through 9B-4 illustrate exemplary embodiments of a dashboard digital asset interface which allows registered users to deposit and/or withdrawal digital assets with the digital asset exchange system.

Figures 1, 9C:
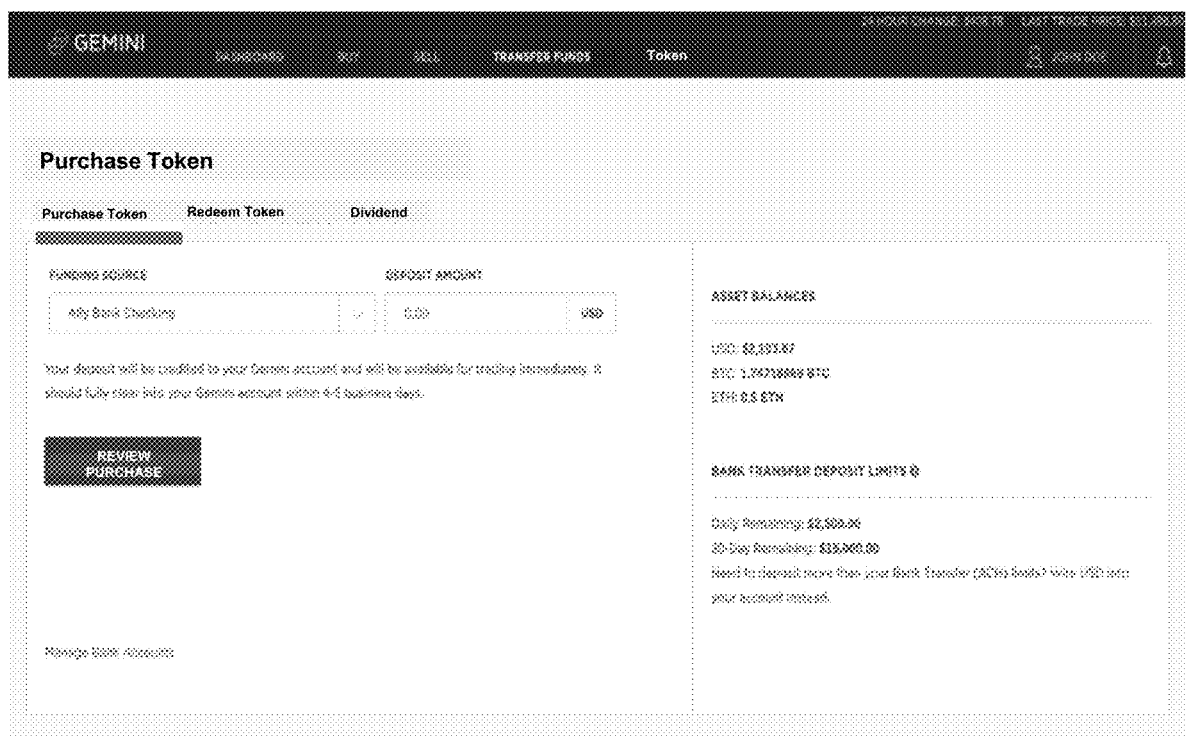
Figures 2, 9C:
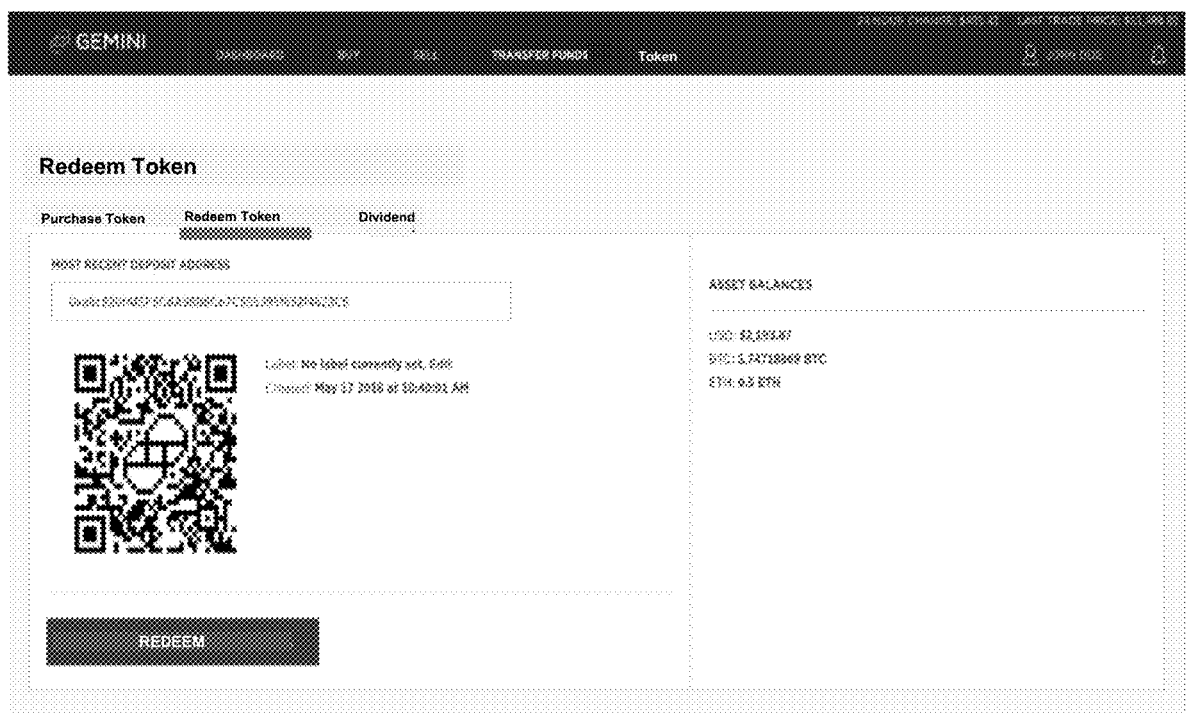

FIGS. 9C-1 through 9C-2 illustrates an exemplary embodiment of a dashboard token interface which allows registered users to purchase and/or redeem tokens with the digital asset exchange system.

Autonomous Devices

Figure 10:
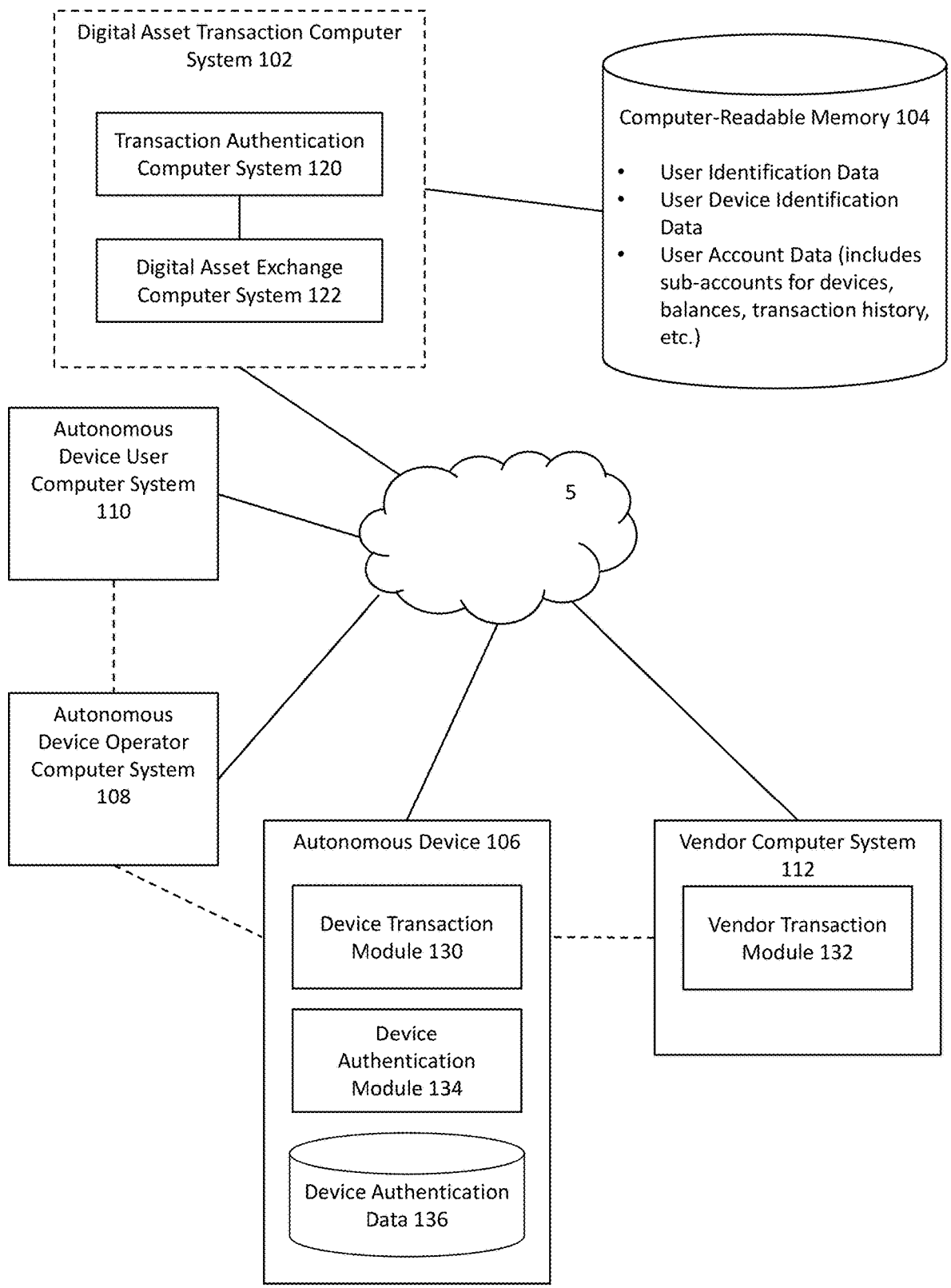
FIG. 10 is a schematic diagram of a digital asset authentication and transaction system for autonomous devices in accordance with exemplary embodiments of the present invention.

Turning to FIG. 10, a digital asset authentication system for autonomous devices can include one or more autonomous devices 106, an autonomous device operator computer system 108, an autonomous device user computer system 110, and/or a vendor computer system 112. The system can also include a digital asset transaction computer system 102, which may comprise a digital asset transaction authentication computer system 120 and/or a digital asset exchange computer system 122. A digital asset exchange computer system 122 may provide, execute, and/or facilitate one or more transactions, such as payments and/or exchanges of digital assets. In embodiments, the digital asset exchange computer system 122 may handle fiat currency transactions. In embodiments, a digital asset transaction authentication computer system 120 and a digital asset exchange computer system 122 may be separate computer systems. In embodiments, they may have a common owner or operator. In embodiments, a digital asset transaction authentication computer system 120 and a digital asset exchange computer system 122 may be the same computer system. Accordingly, the functions of a digital asset transaction authentication computer system 120 and a digital asset exchange computer system 122 are described herein with respect to an exemplary digital asset transaction computer system 102.

The digital asset transaction computer system 102 may be operatively connected to non-transitory computer-readable memory 104, which may be internal or external memory. Such memory may comprise a plurality of memory storage devices and/or may comprise one or more databases. The memory 104 may store user identification data (e.g., login credentials, biometric data, security codes, multi-factor authentication data, to name a few). Memory 104 may also store user device identification data, which may comprise descriptions, device nicknames, serial numbers, digital signatures, or other information from which a device, such as an autonomous device, may be recognized (e.g., by a vendor computer system, by the digital asset transaction computer system 102, by a user computer system 110, by other autonomous devices, to name a few).

A vendor computer system 112 may include a vendor transaction module 132, which may handle payments (e.g., determine payment amounts, request payment amounts, receive payment amounts, to name a few) and/or which may request transaction authorization from a digital asset transaction computer system 102 (e.g., to verify that an autonomous device is associated with a known user, to verify that an autonomous device is authorized to transact by its user principal, to verify that an autonomous device is authorized to transact by one or more government or regulatory agencies, and/or to verify that sufficient funds are available in a device account, to name a few).

An autonomous device 106 may have a device transaction module 130, which may request a transaction from a vendor computer system 112, request transaction authorization from a user (e.g., by communicating with a user computer system 110 or other user electronic device, such as a computer, tablet computer, personal digital assistant (PDA), cell phone, smart phone, to name a few), and/or enter into a transaction, to name a few. The device transaction module 130 may generate and/or transmit an electronic transaction request to the digital asset transaction computer system 102 or the digital asset exchange computer system 122 may be the same computer system. The request may comprise transaction parameters, such as a destination device identifier (e.g., a unique alphanumeric sequence) and/or destination account identifier (e.g., a digital asset address), an autonomous device identifier associated with the autonomous device 106, a source account identifier, which may indicate a master account digital asset associated with the autonomous device 106 and/or a respective sub-account, a transaction amount, a transaction request timestamp, and/or a device location, to name a few.

In embodiments, the device transaction module 130 may negotiate a transaction amount of digital assets with the vendor computer system 112 for at least one product. In embodiments, the negotiation for the at least one product is processed by the vendor transaction module 132. Such negotiation may include the vendor transaction module 132 assessing a value of the at least one product by, for example, referencing an internal and/or external database of product values. The vendor transaction module 132 may then generate a transaction amount bid request and send the transaction amount bid request to the vendor computer system 112 or to a plurality of different vendor computer systems in the case of multiple bidding vendors. The transaction amount bid request may include a description of the product (e.g., identification number, model number, quantity, brand, etc.) and a specific request for cost. The vendor transaction module 132 may then process a bid response received from the vendor computer system 112 (or multiple bid responses in the case of multiple vendors) by comparing the bid response to the referenced product value. If the bid response is within a predetermined range of the reference product value, the vendor transaction module 132 may generate a bid acceptance message for delivery to the vendor computer system 112. If the bid response is not within a predetermined range of the reference product value, the vendor transaction module 132 may generate either a bid rejection message or a counter-offer for delivery to the vendor computer system 112. Upon agreement on the transaction amount, the vendor transaction module 132 may send a bid acceptance message to the vendor computer system 112, after which the vendor computer system 112 may send a transaction confirmation including vendor digital wallet information associated with a vendor digital wallet and a confirmation from the vendor of products that the transaction amount of digital assets is acceptable.

In other exemplary embodiments, the device transaction module 130 may negotiate a transaction amount of digital assets by referencing vendor data pertaining to one or more vendors and determining whether such vendor data satisfies predetermined criteria. The vendor data may be contained within one or more internal or external databases, or may be accessed through data made available through a network of pre-selected vendors that offer a product that is the subject of the transaction. The autonomous device 106 may then compare the acquired vendor data to predetermined criteria to determine information such as, for example, whether the vendor is within a specified distance from the autonomous device 106, whether the vendor satisfies a minimum approval rating, whether the vendor provides the product at a cost that falls within a predetermined cost range and whether the vendor has the quantity of desired product available for purchase, to name a few. For example, if the autonomous device 106 is a vehicle and the product is gasoline, the autonomous device 106 may first detect what gas suppliers are within a predetermined geographic range of the autonomous device 106, and then further limit selection to those vendors that are not only within the geographic range, but also provide gasoline that meet a predetermined criteria at a predetermined price range.

In other exemplary embodiments, the autonomous device 106 may negotiate a transaction amount with a customer user device for at least one product. For example, the device transaction module 130 may respond to a price quote request received from a customer user device by providing a price quote in the form of, for example, an estimated price, an estimated price range, or an exact calculated cost for a requested product. In exemplary embodiments, the device transaction module 130 may reference other vendor information, such as competitor vendor information, to determine a competitive cost that would more likely be accepted by the customer. For example, if the autonomous device provides a transportation service, the autonomous device may reference pricing offered by competitors, such as Uber, Via and Lyft, to name a few, to determine competitive pricing to be offered by the autonomous device. The device transaction module 130 may receive in response from the customer user device either an indication of acceptance or a counter-offer in the form of an alternative price or price range. Upon agreement on the transaction amount, the vendor transaction module 132 may send a transaction amount acceptance message to the customer user device, including autonomous device digital wallet information associated with an autonomous device digital wallet.

In exemplary embodiments, the device transaction module 130 may negotiate a transaction amount of digital assets based on volume pricing associated with the at least one product. This may occur in regards to products that are often sold in varying and/or bulk quantities, such as, for example, electrical power and gasoline.

In exemplary embodiments, negotiation of the transaction amount may initially involve the autonomous device 106 determining that a product is required by, for example, detecting a low level of the product (e.g., a low level of gasoline in an autonomous vehicle, or a low level of milk contained in an autonomous refrigerator). The autonomous device 106 may then seek to replenish the product by negotiating a transaction amount with a pre-approved vendor or list of pre-approved vendors, or by requesting the owner of the autonomous device to identify a vendor for negotiation. In exemplary embodiments, the owner of the autonomous device may request the autonomous device to initiate purchase of the product, in which case the autonomous device may be given permission to access the owner's account to make a purchase or to seek competitive bids to obtain an optimal price.

The autonomous device 106 can further comprise a device authentication module 134, which may digitally sign electronic transaction requests. A digital signature may comprise encrypting data, such as the requested transaction parameters, using a private key of an asymmetric key pair associated with the autonomous device 106. In embodiments, the corresponding public key of the asymmetric key pair may be provided along with the encrypted message so that the receiving device can decrypt the data to verify the digital signature. The digital signature may provide an assurance of the message integrity and/or of the identity of the sending autonomous device 106. In embodiments, the autonomous device 106 may encrypt an electronic message using a public key associated with the digital asset transaction computer system 102, such that only the digital asset transaction computer system 102 can decrypt the message using its corresponding private key to view and/or access the message contents and/or payload.

In embodiments, the device may generate and/or transmit authentication data to the digital asset transaction computer system 102 or the digital asset exchange computer system 122 may be the same computer system. The authentication data can comprise a data value, such as a randomly generated number, which may be transmitted along with a previous data value so as to provide assurance that the same autonomous device 106 is sending the messages without its identity being mimicked or spoofed. If the digital asset transaction computer system 102 determines that the previous authentication data value does not match a locally stored copy of the last received data value, then a second device likely transmitted either the currently received message or the previous message, and all messages or transaction requests apparently coming from the autonomous device 106 may be flagged and/or rejected.

In embodiments, the authentication data value may comprise a hash value computed according to a hash algorithm or hash function. The hash function may be a cryptographic hash function, which is designed to be a one-way function from which it is easy (e.g., not computationally intensive and/or time intensive) to reproduce results but difficult to reverse the function given the result. Examples of hash functions are SHA-1, SHA-2, SHA-256, and MDA, to name a few. The hash value may hash a previous hash value along with new data, such as any of a random number, all or part of the transaction data, a timestamp, GPS coordinates or other geolocation or position data (e.g., position of the device, position associated with a transaction location or merchant location, to name a few), and/or a device identifier, to name a few. In embodiments, any continuously or periodically generated information may be used, e.g., as an input to a hash algorithm, to generate the hash value. The hash value and the new data may be provided to the digital asset transaction computer system 102, which may compute a verification hash value based upon a stored copy of a last previously received hash value and the new data. If the resulting verification hash value does not match the newly received hash value, there was a discrepancy in the underlying data, namely the previous hash value, indicating either that the message originated from a different device posing as the autonomous device 106 or that the previously received message originated from a different device. Accordingly, the device authentication module 134 may generate and/or maintain a hash chain, which is a sequence of linked hash values linked by using the last previous hash value as an input into the hash algorithm to produce the next hash value. The hash chain may be a version of a blockchain, in which successive data entries or blocks are linked to the previous blocks. A fraudulent or impostor device can cause a fork in this authentication blockchain since the fraudulent device's version of the blockchain will be adding different entries or blocks from the true device. Thus when more than one device attempts to pose as the same device, detectable forks can be created. In embodiments, the device may store the previous hash value for use in generating the next hash value, and the entire sequence of hash values may not be stored individually, as they have each been incorporated into each successive hash value.

In embodiments, the authentication data may be transmitted regularly and/or periodically, such as according to a schedule (e.g., at predefined dates and/or times) and/or at a predefined frequency (e.g., once every hour, once every 30 minutes, once every 5 minutes, once every 30 seconds, to name a few). In embodiments, the authentication data may be transmitted according to a randomized and/or aperiodic schedule. The authentication data transmissions may comprise a device heartbeat that uniquely identifies the device. Such transmissions that are continuous and/or frequent can enable rapid detection of a compromised autonomous device 106, which may be compromised by fraudulent duplication or mimicking and/or by hacking or takeover to send unauthorized transaction requests. The detection may occur within one period of the heartbeat frequency and/or following the time of a scheduled heartbeat transmission. In the case of mimicking the authentication data transmissions must also be mimicked accurately and/or, in certain embodiments, without interruption. If they are not so mimicked, there will be a discrepancy determined at the digital asset transaction computer system 102, which can flag the device 106 or apparent device 106. In the case of hacking, an interruption in the heartbeat may signal that the device 106 was compromised.

In embodiments, the authentication data may be transmitted along with and/or as part of electronic transaction requests or may be triggered to be transmitted before or after transmitting an electronic transaction request. Authentication data transmitted as such will enable a collision or discrepancy in the authentication data to be detected at the digital asset transaction computer system 102 once authentication data has been received from two different devices.

The autonomous device 106 may store device authentication data 136, which may include the device asymmetric key pair. The device authentication data can also include at least the previous authentication data value, which may be a hash value. In embodiments, the device authentication data can include the hash chain.

The device authentication module 134 may comprise a hardware security module, which may be a physically secure processing device that can store the device's asymmetric key pair and/or use it to generate digital signatures. The hardware security module may also generate the authentication data and/or perform any other required cryptographic operations. Upon detection of tampering, the hardware security module may destroy and/or delete its contents. The hardware security module may generate alerts when tampering is detected and/or may provide auditable logs that can be examined to identify unauthorized access.

In embodiments, one or more software modules, such as a device authentication module 134, and/or software libraries may be provided for download and/or installation on one or more devices, such as user devices and/or autonomous devices, to enable such devices to take advantage of the identity verification and/or transaction authorization and/or execution systems and methods of the present invention. Accordingly, a transaction module or a payment module may be provided for installation, integration, modification, and/or use by a device to perform transactions, identity verifications, and/or to implement fraud avoidance methods. Such devices may be registered with the digital asset transaction computer system 102. In embodiments, the digital asset transaction computer system 102 may provide an application programming interface (API) that can be used be one or more devices to transact, verify identities, and/or monitor for fraud.

An exemplary transaction process involving an autonomous device 106 can include any of the following steps. An autonomous device 106 may request device account status information from a digital asset transaction computer system 102. Such status information can include a device account balance. The transaction computer system 102 may determine and/or retrieve the device account balance and transmit it to the device 106. The autonomous device 106 may request a purchase transaction from a vendor computer system 112 (e.g., by communicating directly with the vendor computer system 112 or with a vendor point of sale, such as a product scanner or digital asset register). In embodiments, the autonomous device may transmit a message to negotiate with the vendor computer system. In embodiments, the message may propose a price for a good or service of the vendor. In embodiments, the price may be an amount of fiat or an amount of digital assets, including an amount of tokens such as SVCoins. A vendor point of sale system may relay transaction information (e.g., device identification information, vendor identification information, and/or transaction parameters, such as prices and/or quantities, to name a few) to a vendor remote system, which may be the vendor computer system 112. In embodiments, the vendor computer system 112 may in fact be the point of sale system. In embodiments, the processes described herein with respect to the vendor computer system 112 may be performed by a vendor point of sale system and/or by a vendor remote system. The vendor computer system 112 may request transaction authorization from the digital asset transaction computer system 102. Accordingly, the vendor computer system 112 may transmit the transaction information to the digital asset transaction computer system 102. In embodiments, the autonomous device 106 may request the authorization from the digital asset transaction computer system 102. In embodiments the autonomous device may transmit transaction information to the digital asset transaction computer system 102.

The digital asset transaction computer system 102 may then analyze the transaction information, evaluating it using stored transaction rules and/or by comparing it against transaction permissibility data (e.g., acceptable transaction parameters or thresholds, device-specific thresholds, device account thresholds, limits, or permissions, and/or vendor permissions, such as data identifying approved vendors) stored in one or more databases. The digital asset transaction computer system 102 may ensure that the device is not flagged and/or that it is associated with a registered user who is also not flagged (e.g., to ensure compliance with anti-money laundering laws, know your customer laws, bank secrecy rules). In embodiments the digital asset transaction computer system 102 may confirm receipt of an electronic signature of the autonomous device to authorize a transaction. Accordingly, the digital asset transaction computer system 102 may determine that an autonomous device 106 is authorized to engage in the transaction and/or may transmit an electronic authorization notification to the vendor computer system 112. The vendor computer system 112 may then proceed with the transaction, which may comprise transacting directly with the autonomous device and/or indirectly by instructing the digital asset transaction computer system 102 (e.g., a digital asset exchange computer system 122) to execute the transaction. In the case of an indirect transaction the digital asset transaction computer system 102 may request purchase authorization from a user principal (e.g., by transmitting an electronic authorization request to a user electronic device). Where the vendor computer system 112 requests the transaction the digital asset transaction computer system 102 may also transmit a transaction parameter confirmation to the autonomous device 106 to prevent vendors systems from executing unsolicited transactions. Upon receipt of transaction parameter confirmation and/or purchase authorization, the digital asset transaction computer system 102 may execute the transaction and/or generate and transmit an electronic transaction notification to the vendor computer system 112, the autonomous device 106, and/or the user electronic device of the user principal.

Although the transaction herein are described with respect to digital assets they may comprise fiat transactions performed by a bank and/or financial exchange, which may be a digital asset exchange that also handles fiat transactions. In embodiments, autonomous devices or devices with embedded or operatively connected computer systems may perform exchange transactions, e.g., to purchase digital assets, including tokens such as SVCoins from a digital asset exchange and/or to purchase fiat currency amounts from an exchange.

Figure 20:
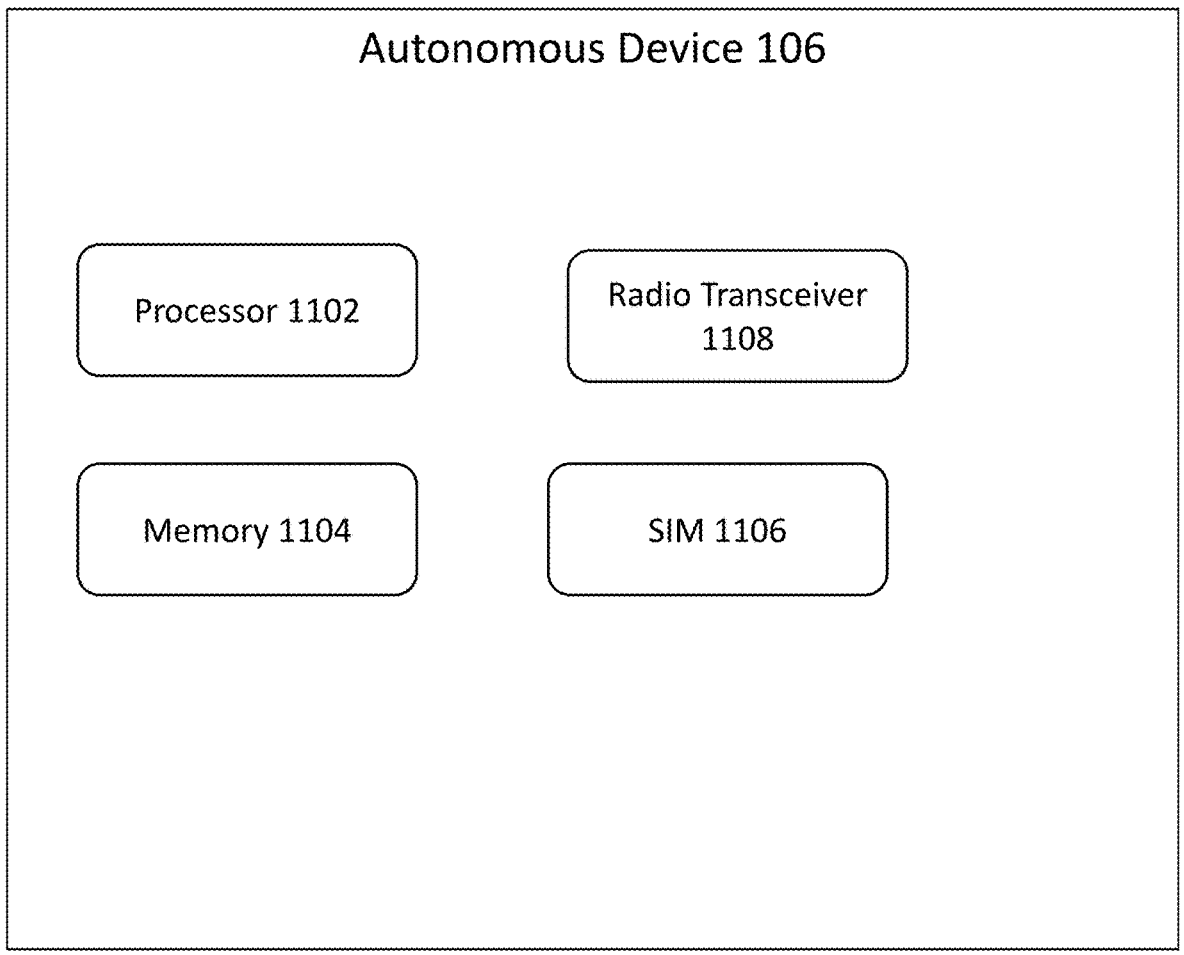
FIG. 20 is a block diagram of an autonomous device in accordance with an exemplary embodiment of the present application.

In embodiments, the autonomous device 106 may communicate with the digital asset exchange computer system 122 in order to obtain assets prior to engaging in a transaction with a vendor. As illustrated in FIG. 20, in embodiments, the autonomous device 106 may include a processor 1102 operatively connected to processor memory module 1104. The processor memory module 1104 may store information, including authentication information used to identify the device 106 which is discussed in further detail below. The processor memory module 1104 may be a secure memory or may include a secure portion. In embodiments, the autonomous device 106 may include a subscriber identity module ("SIM") 1106, or SIM card which may also store authentication information. In this embodiments, authentication information may be preloaded into the subscriber identity module 1106 and placed in the autonomous device 106 when it is manufactured or thereafter.

In embodiments, the autonomous device 106 may provide authentication information to the digital asset exchange computer system 122 to identify the autonomous device. In embodiments, this transfer of authentication information is part of a secure communication protocol to establish secure communications between the autonomous device 106 and the digital asset exchange computer system 122. In embodiments, the secure communication will take place over a wireless communication network. Examples of such wireless communication networks include personal area networks (PAN), wireless local area networks (WLAN), wireless wide area networks (WAN), cellular telephone networks to name a few. In embodiments, the autonomous device 106 also includes at least one radio transmitter and preferably a radio transceiver 1108 to allow the device 106 to transmit and receive information via the wireless networks discussed above or other networks.

In embodiments, the autonomous device 106 is associated with an authorized user of the digital asset exchange computer system 122. The authentication information is provided to the digital asset exchange computer system 122, via the wireless network, for example, such that the digital asset exchange computer system 122 can confirm the identity of the autonomous device and confirm that it is associated with a particular authorized user of the digital asset exchange. The authentication information may include the device asymmetric key pair, a previous authentication data value, which may be a hash value or a hash chain, to name a few. In embodiments, the digital asset exchange computer system 122 may provide an application programming interface (API) that can be used be one or more autonomous devices to conduct transactions, authenticate or otherwise verify the identity of the individual autonomous devices and/or monitor for fraud.

Once authenticated, or otherwise verified, the autonomous device 106 may request a transfer of assets from an account of the authorized user to the subaccount associated with the autonomous device. In embodiments an autonomous device electronic wallet may be associated with the autonomous device 106 and used to store digital assets that have been transferred to the subaccount of the digital wallet. In embodiments the digital assets may be digital math based assets or tokens, to name a few. In embodiments, the assets that are stored in the autonomous device digital wallet may be used by the autonomous device 106 to engage in transaction with third parties such as the vendors discussed above.

In embodiments, the autonomous device 106 may transfer assets from its subaccount to the account of the authorized user. In an example, the autonomous device 106 may transfer digital assets from the autonomous device electronic wallet to an electronic wallet of the authorized user of the digital asset exchange. In embodiments, the autonomous device 106 may contact the digital asset exchange computed system 112 in the manner discussed above. Once authenticated, the autonomous device 106 may provide instructions to transfer digital assets from the autonomous device electronic wallet to that of the authorized user of the exchange associated with the autonomous device. In embodiments, the autonomous device may provide instructions to transfer digital assets from the autonomous device electronic wallet to other electronic wallets associated with the digital asset exchange.

Autonomous device transactions may comprise purchases of goods and/or services directly from sellers or other vendors (e.g., individuals with respective seller user electronic devices, other autonomous devices, and/or seller computer systems, to name a few). Such transactions can comprise electronic transfers of funds, such as digital assets or fiat amounts. Transfers of digital assets may be performed on an internal electronic ledger of a transaction computer system 102 (e.g., a digital asset exchange computer system 122). In embodiments, transfers of digital assets may be broadcast to and/or performed using a public ledger, such as a decentralized public ledger (e.g., a blockchain such as the Bitcoin Blockchain or Ethereum blockchain). Such transactions may be broadcast by the autonomous device 106, the vendor computer system 112, and/or the digital asset transaction computer system 102 or other computer system such as the digital asset exchange computer system. The systems and processes of the present invention may be used to provide (or deny) authorization for any such transactions.

In embodiments, the autonomous device 106 may contact a third party, such as the vendor computer system 112 associated with a vendor of goods or services in order to negotiate purchase of goods or services. In embodiments, the autonomous device 106 may contact the vendor via the wireless network or otherwise. In embodiments, the autonomous device 106 generates a transaction message that includes authentication information regarding the autonomous device and a request for a good or service. In embodiments, the transaction message may also include a transaction priced for the good or service. The transaction message is published to the then transmitted to the third party, e.g. the vendor computer system 112.

In embodiments, the vendor computer system 112 processes the transaction message and generates a vendor response. The vendor response may include vendor identity information associated with the vendor. In embodiments, the vendor response may include a vendor transaction price, or a confirmation of acceptance of the transaction price included in the transaction message.

The autonomous device may receive the vendor response and process it. The autonomous device 106 may accept the transaction amount or may acknowledge the confirmation of the acceptance from the vendor computer system 112. The autonomous device 106 may then generate purchase instructions. The purchase instruction include identification of the autonomous device and the vendor computer system. In embodiments, this identification information may include an autonomous device signature, autonomous device electronic wallet information, vendor electronic wallet information and transaction instruction to transfer the transaction amount of digital assets from the autonomous device electronic wallet to the vendor electronic wallet. The purchase instruction may be published to the decentralized ledger. In embodiments, the autonomous device 106 may subsequently receive one or more of a good or service from the vendor.

In embodiments, the autonomous device 106 may be a vendor. The autonomous device 106 may take the place of the vendor in the example discussed above and may negotiate with another autonomous device, for example, to provide one or more of a good or service. In embodiments the autonomous device 106 may be a vehicle that may, for example, provide a delivery service. In such embodiments, the autonomous device electronic wallet will receive the transaction amount of digital assets from the other autonomous device or other parties for a good or service. In embodiments, the autonomous device 106 may transfer the transaction amount of digital assets, or any portion thereof, to another account. In embodiments, the autonomous device 106 may be limited to transferring digital assets to only to certain accounts. In an example, the autonomous device 106 may transfer digital assets to the account of the authorized user of the digital asset exchange as is discussed above. In embodiments, the autonomous device 106 may transfer the digital assets to a vendor computer system 112 in order to pay for goods and services as is discussed above.

In embodiments, an autonomous device 106 may determine times at which to purchase goods or services, such as fuel or electricity, which determination may be based at least in part upon present need, anticipated need (e.g., predictions based upon usage and/or usage patterns), and/or based upon cost (e.g., determining when cost, such as electricity supply cost, is lowest).

The autonomous device authorization systems and processes described herein may ensure compliance with regulations, such as anti-money laundering laws, know your customer laws, and/or bank secrecy rules, regardless of the place of domicile of the autonomous devices (e.g., whether operating domiciled in a different U.S. state or a different country from the purchase location). In embodiments, compliance with such regulations may be assessed upon a first transaction request by a device at a particular vendor or upon an individual's first contracting of use of an autonomous device. In other embodiments, compliance may be assessed for each requested transaction or may be assessed periodically. In embodiments, the autonomous device is associated with an authorized user of a digital asset exchange such that compliance with regulations if accomplished via the digital asset exchange.

These processes and systems may also enable compliance with government or other regulations as well as compliance with user-generated transaction rules for autonomous devices that are not owned by the principal user but are instead being rented or leased by the principal user. Accordingly, an autonomous device operator computer system 108 may own and/or operate the autonomous device, and a user may contract with the operator for use of the autonomous device (e.g., to perform one or more tasks, or for use at the user's will for a particular time period). Any transactions performed or sought to be performed by the autonomous device 106 may then be associated with the particular user for whom the device 106 is acting as an agent. The operator may be a company that sells or rents autonomous devices or that handles daily operation of the devices, such as navigation or other operational processes.

Figure 11:
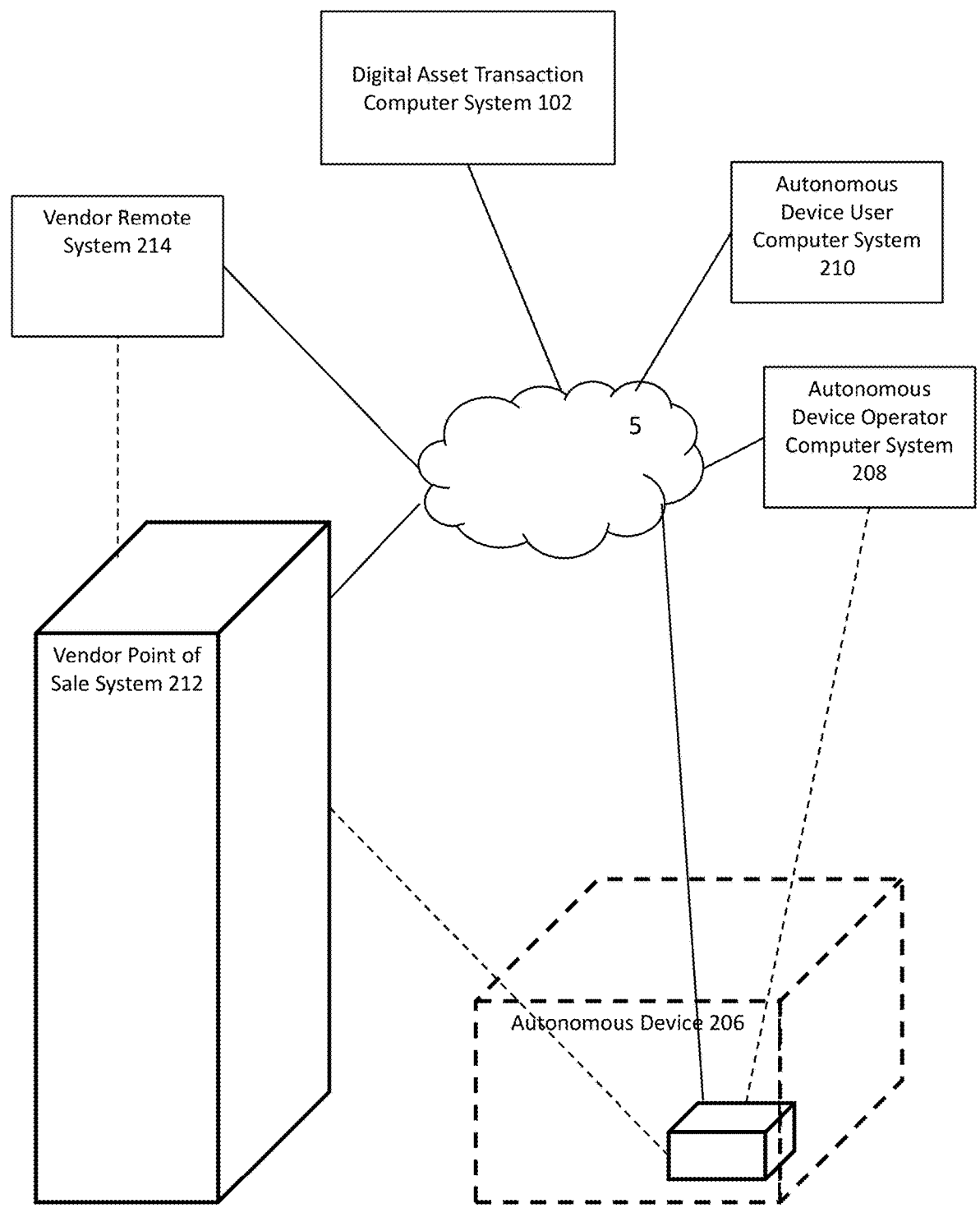
FIG. 11 is a schematic diagram of a digital asset authentication and transaction system for autonomous devices in accordance with exemplary embodiments of the present invention.

FIG. 11 is a schematic diagram of a digital asset authentication and transaction system for autonomous devices in accordance with exemplary embodiments of the present invention. In embodiments, autonomous device 206 may be an autonomous vehicle. While the autonomous device 206 is provided with a different reference number than the autonomous device 106 discussed above, in embodiments, the autonomous device 206 includes the same features and functions as the autonomous device 106 discussed above. It may include one or more computer systems 208, 210. For example, a navigation computer system may control the transportation performance of the device, while a transaction computer system controls transactions. In embodiments, software modules running on the same computer system 208, 210 may perform such functions. The vendor point of sale system 212 and vendor remote system 214 may be included in or associated with the vendor computer system 112 discussed above in connection with FIG. 10, and specifically, may be a gas station or an electric recharging station. An autonomous device 206 may be authorized (e.g., via user-defined rules input to the digital asset transaction computer system 102 and transformed into electronic processing rules at the digital asset transaction computer system 102) to perform transactions meeting certain predefined criteria, such as only purchasing a particular type of good (e.g., fuel) or service (e.g., automotive repair), not exceeding a threshold spending limit (e.g., within a time period), and/or only transacting with particular vendors. In embodiments, the autonomous device may be authorized to engage in transactions based on specified conditions, e.g. when a fuel level drops below a predetermined threshold, when a charge level drops below a predetermined threshold, to name a few.

Figure 12:
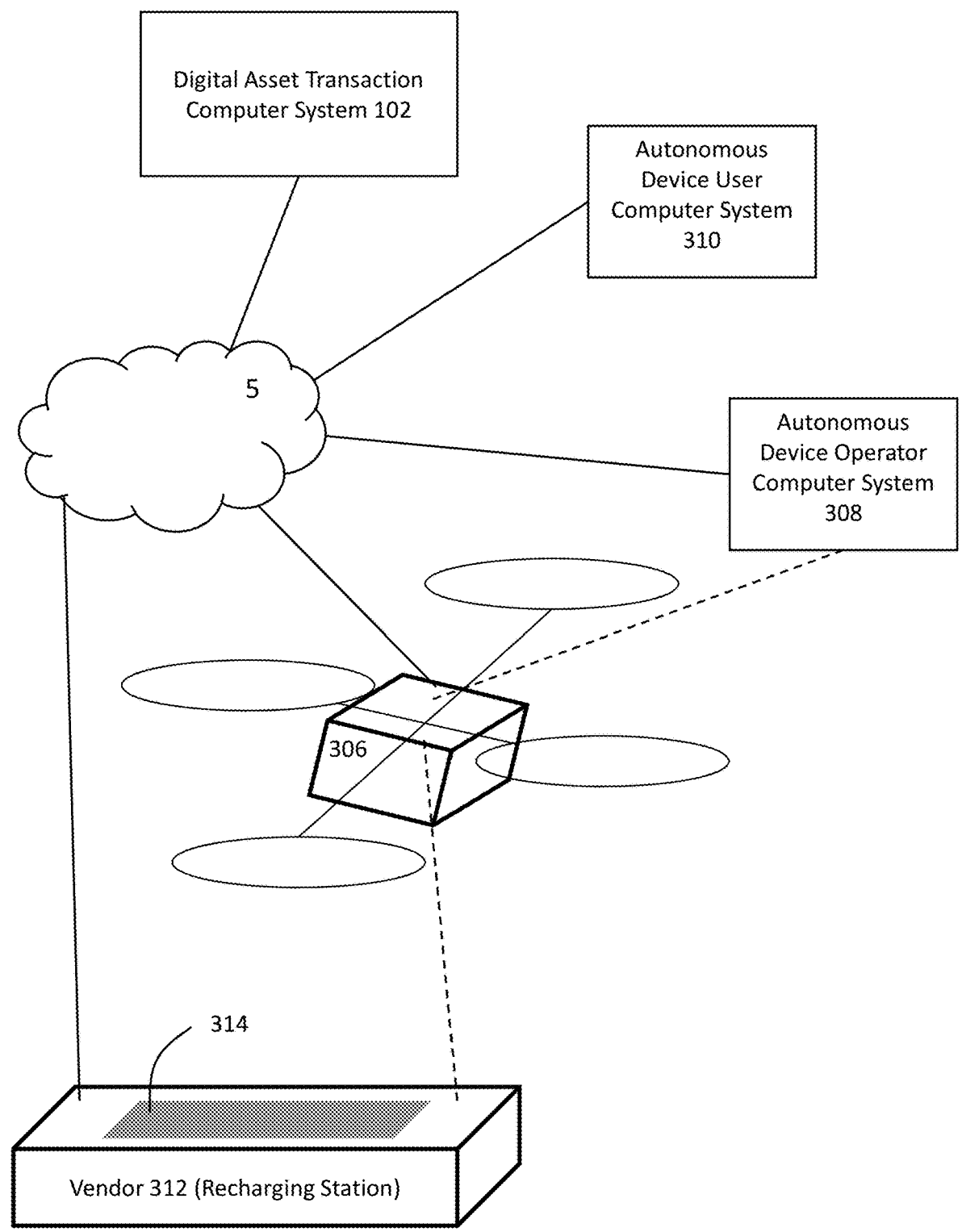
FIG. 12 is a schematic diagram of a digital asset authentication and transaction system for autonomous drone vehicles in accordance with exemplary embodiments of the present invention.

FIG. 12 is a schematic diagram of a digital asset authentication and transaction system for autonomous drone vehicles in accordance with exemplary embodiments of the present invention. A drone vehicle 306 may be an aerial vehicle, such as an unmanned aerial vehicle. Such drones may be operated by an operator with an associated operator computer system 308. An individual may contract for use of the drone 306. Accordingly, using the authorization and transaction systems described herein, any transactions performed on behalf of the contracting user (e.g., through autonomous device user computing system 310) may be associated with that user since the drone 306 is acting as the agent of that user. In other embodiments, a company or individual may own and/or operate the drone 306, and transactions performed by the drone 306 (e.g., recharging batteries (e.g., using vendor recharging station 312 and inductive charging surface 314), paying tolls, paying for parking, paying for repair, paying for goods or services) will be associated with the company or individual. In embodiments, the vehicle 306 may also include the attributes and features of autonomous device 106 discussed above.

Figure 13:
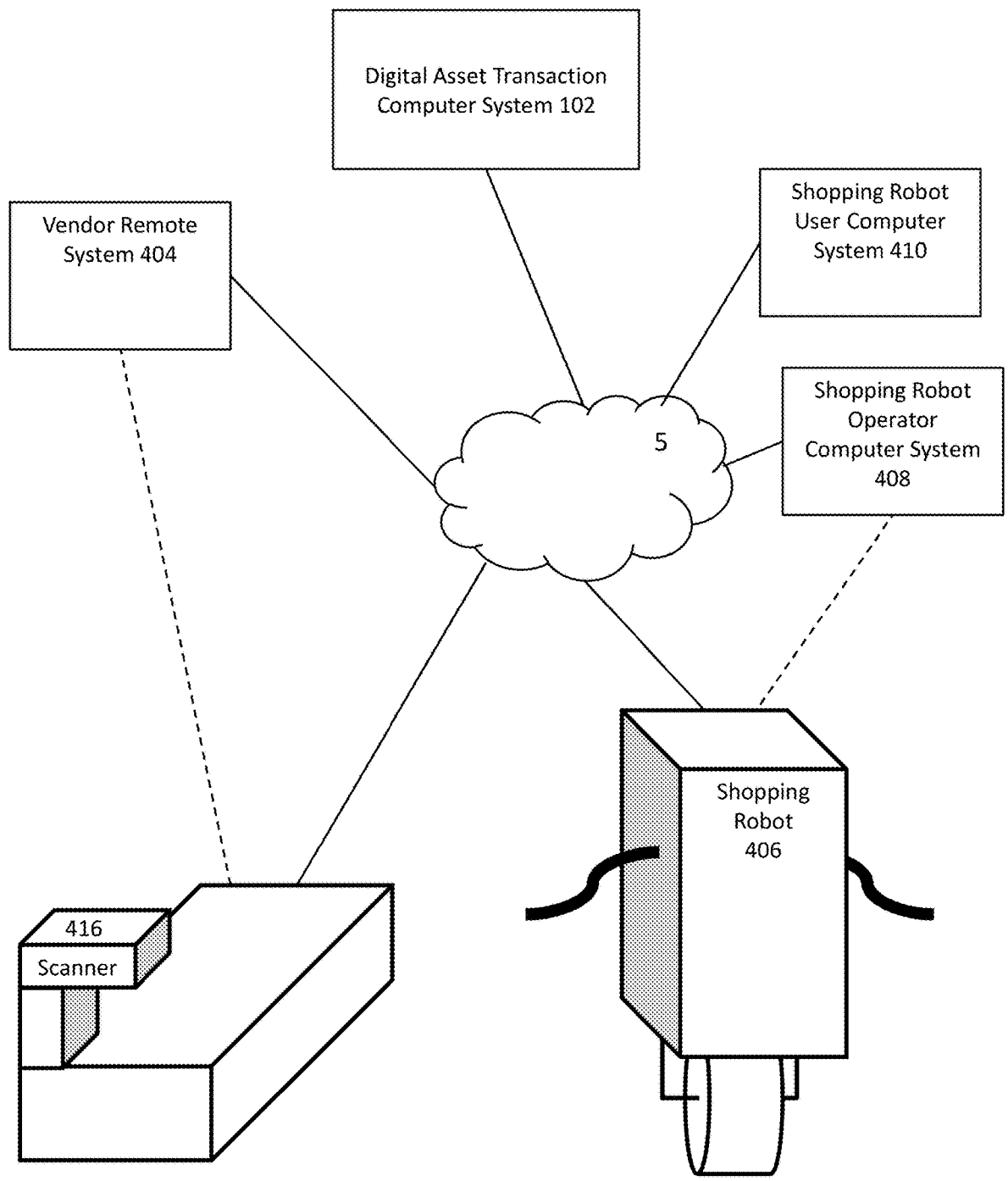
FIG. 13 is a schematic diagram of a digital asset authentication and transaction system for autonomous drone shopping agents in accordance with exemplary embodiments of the present invention.

FIG. 13 is a schematic diagram of a digital asset authentication and transaction system for autonomous drone shopping agents in accordance with exemplary embodiments of the present invention. An autonomous or remotely controlled robot 406 may shop on behalf of a user principal. In embodiments, the autonomous robot may also include the attributes and features of the autonomous device 106 discussed above. In embodiments, an autonomous shopping computer may perform remote transactions, such as online shopping. The computer may be authorized as an agent of an individual to perform such transactions. Accordingly, a computer may monitor prices and/or inventory availability and transact when price or inventory thresholds are reached. Such transactions may not require user authorization at the time of transaction but may instead use a sub-account designated for the shopping computer and associated with a user umbrella account.

In embodiments, the remotely controlled robot 406 may include robot operator computer system 408. The robot 406 my interact with a vendor remote system 404 to purchase one or more of goods and services. In embodiments, such a purchase may be made using a scanner 412.

Figure 14:
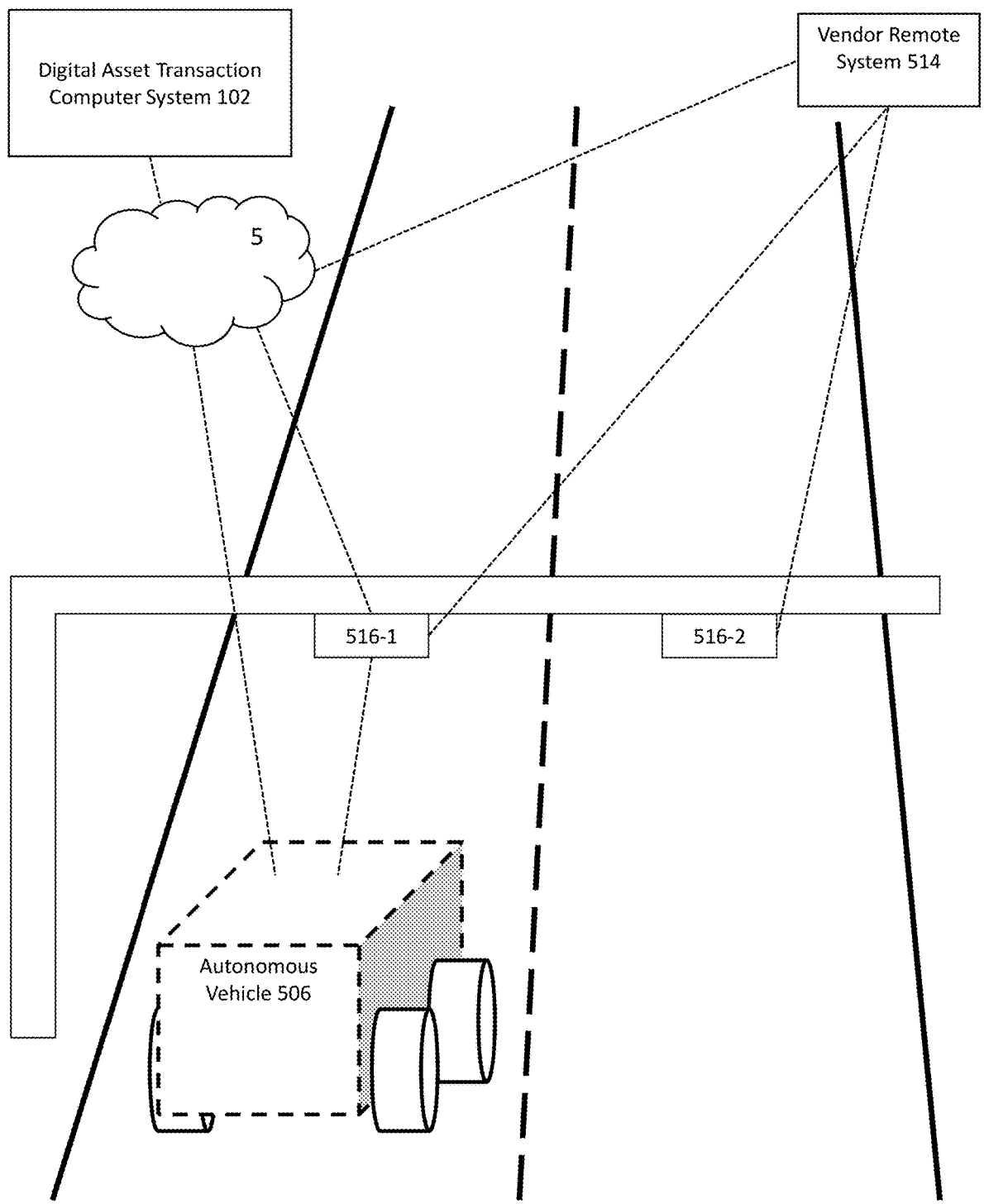
FIG. 14 is a schematic diagram of a digital asset authentication and transaction system for autonomous vehicle toll payments in accordance with exemplary embodiments of the present invention.

FIG. 14 is a schematic diagram of a digital asset authentication and transaction system for autonomous vehicle toll payments in accordance with exemplary embodiments of the present invention. An autonomous vehicle 506 (which may operate in any transportation medium or terrain) may pay tolls automatically using a vehicle digital asset account. In embodiments, the vehicle 506 may include the attributes and features of the autonomous device 106 discussed above. Toll scanners 516 (e.g., toll scanner 516-1 on the right lane or toll scanner 516-2 on the left lane) may detect and/or identify vehicles and/or may request transactions (e.g., payment of a toll). In embodiments, an autonomous vehicle 506 may communicate directly with a vendor remote system 514, which may transact with the vehicle 506 to request and/or accept payment of a toll.

Figure 15:
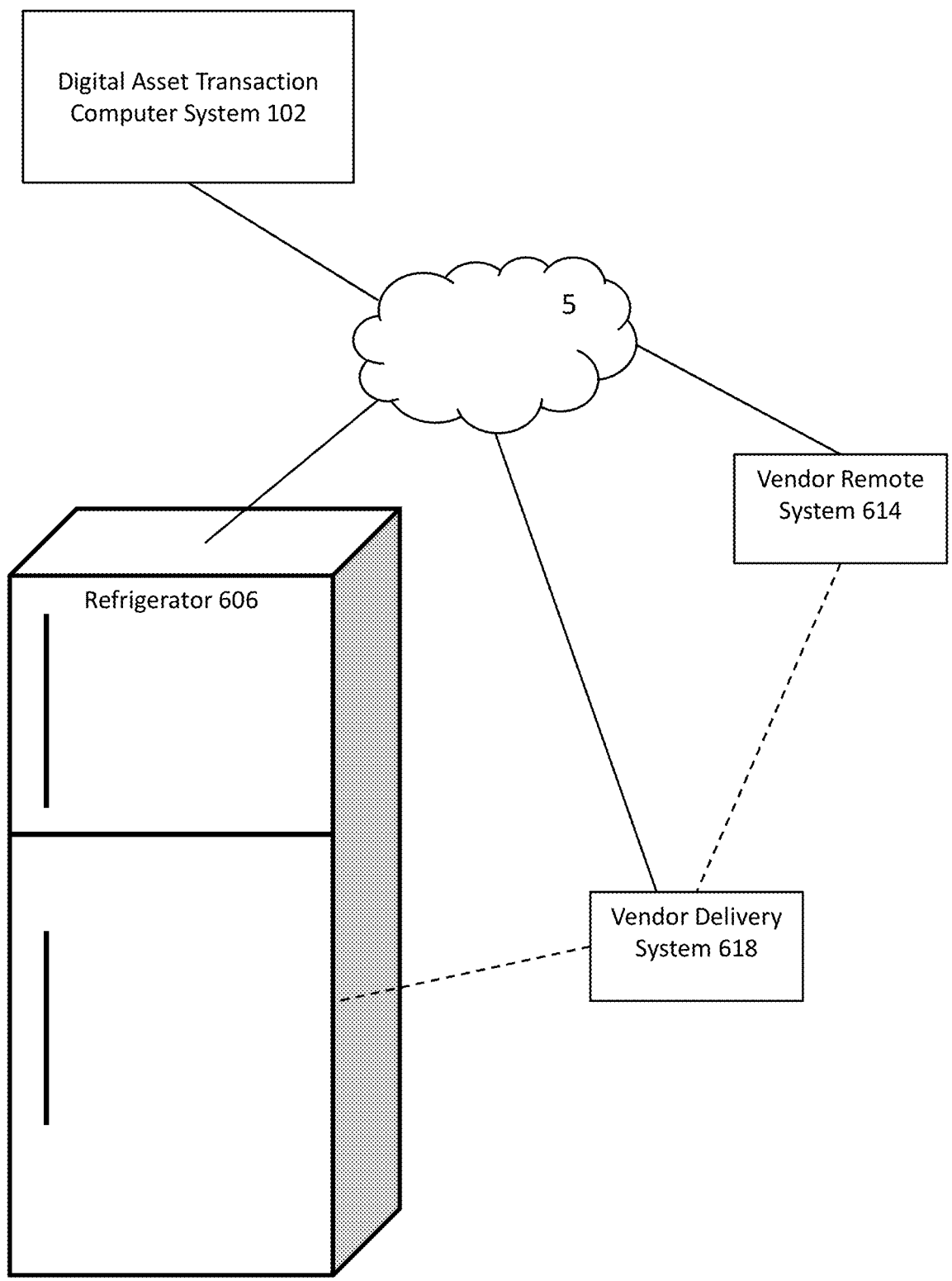
FIG. 15 is a schematic diagram of a digital asset authentication and transaction system for networked appliances engaging in transactions in accordance with exemplary embodiments of the present invention.

FIG. 15 is a schematic diagram of a digital asset authentication and transaction system for networked appliances engaging in transactions in accordance with exemplary embodiments of the present invention. Services may repair appliances, replenish appliances (such as a refrigerator 606), and/or transport appliances or machines (e.g., construction equipment). The device itself may pay for the respective goods or services. Such a system may enable highly itemized transactions and transaction tracking. For example, a package being delivered with an embedded smart payment chip (which can function for transaction purposes like the autonomous devices described herein) may pay for its own delivery. It may pay separately for multiple legs of a delivery, such as air transportation followed by ground transportation to a distribution center followed by ground transportation to the final destination. In other embodiments, autonomous delivery vehicles may scan or otherwise receive a package identifier and request payment based upon the performed transportation of the package. In embodiments, the refrigerator 606 may interact with a vendor remote system 614 to purchase goods or services which may be delivered via the vendor delivery system 618.

Figure 16:
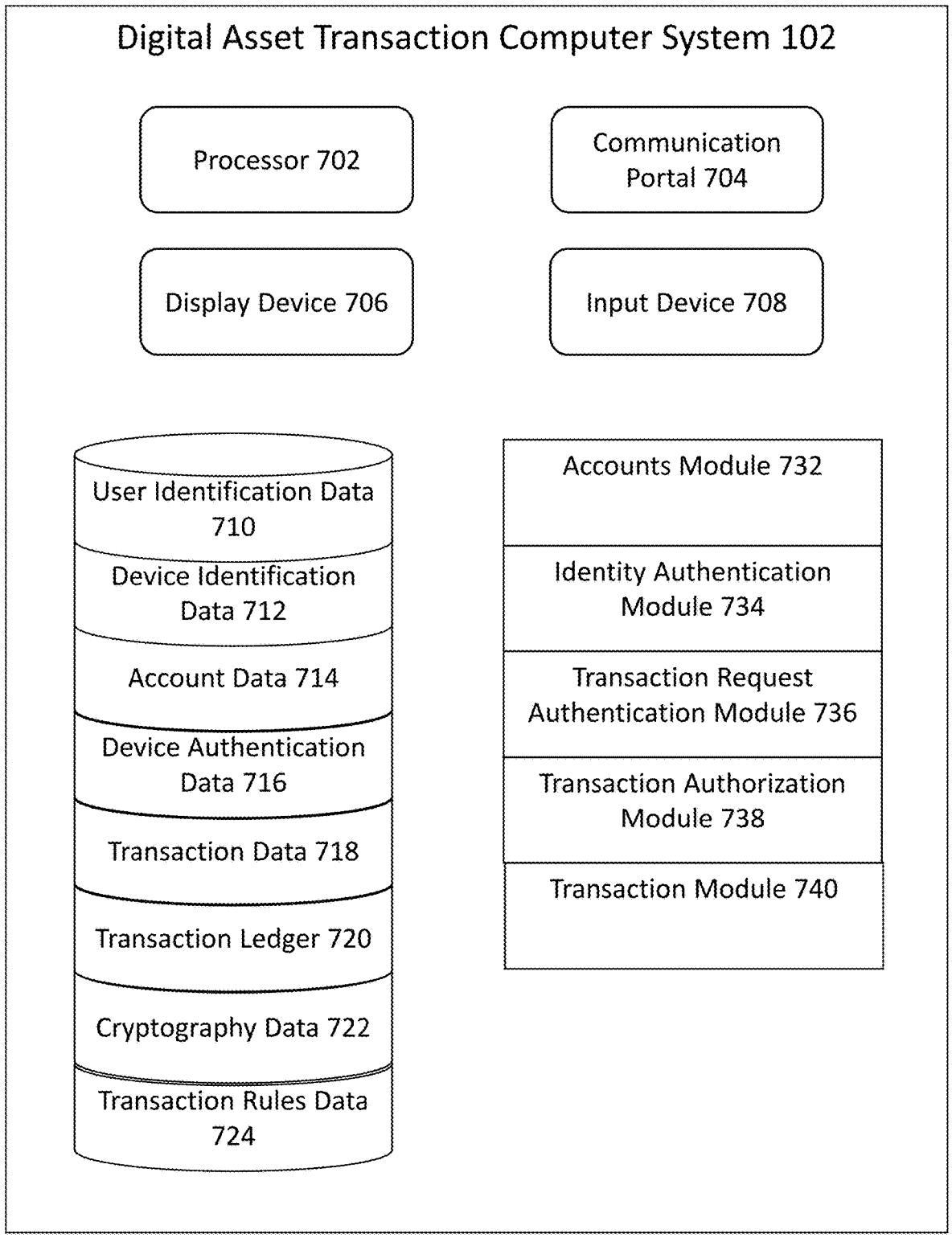
FIG. 16 is a schematic diagram of a digital asset transaction computer system in accordance with exemplary embodiments of the present invention.

FIG. 16 is a schematic diagram of a digital asset transaction computer system in accordance with exemplary embodiments of the present invention. The digital asset transaction computer system 102 can include any of one or more processors 702, communication portals 704, display devices 706, and/or input devices 708 (e.g., keyboards, mice, touchscreens, microphones, cameras, to name a few). The computer system can further include non-transitory computer-readable memory, which may comprise one or more databases, operatively connected to the one or more processors 702, and which may store user identification data 710, device identification data 712, account data 714, device authentication data 716, transaction data 718, an electronic transaction ledger 720, cryptography data 722, and/or transaction rules data 724, as described herein. The computer system can also include one or more software modules running or configured to run on the one or more processors 702. The modules can include an accounts module 732, an identity authentication module 734, a transaction request authentication module 736, a transaction authorization module 738, and/or a transaction module 740. In embodiments, processes and roles described with respect to one module may be performed by one or more other modules. In embodiments, a particular module may perform operations described with respect to one or more other modules.

User identification data 710 can include legal names, nicknames, account usernames, login credentials (e.g., password and/or other authentication data), and/or contact information (e.g., phone number, mailing address, electronic address, such as an email address), to name a few. In embodiments, user identification data 710 may satisfy anti-money laundering regulations and/or know your customer regulations.

Device identification data 712 can comprise device identifiers and/or device make and/or model identifiers, to name a few.

Account data 714 can comprise account addresses, master account information, sub-account information (e.g., for accounts subordinate to or that are divisions of a master account), account owner or administrator information (e.g., identifications of individuals or entities such as businesses that own or are authorized to use an account), and/or account balances, to name a few.

Device authentication data 716 can include a hash chain or last received hash value. Device authentication data 716 can include logs of authentication data received from one or more devices.

Transaction data 718 can include transaction history information (e.g., transaction parameters, transaction execution information, transaction statuses) for one or more accounts, users, and/or devices.

An electronic transaction ledger 720 may provide an electronic record of transactions, from which may be determined account balances. The computer system can also store a local instance of a distributed electronic public ledger for a digital asset network.

Cryptography data 722 can include asymmetric key data (e.g., a private/public key pair for the digital asset transaction computer system 102 and/or public keys associated with one or more users, accounts, or devices), digital signature algorithms, encryption and/or decryption algorithms, and/or hashing algorithms.

Transaction rules data 724 can comprise one or more logical rules or restrictions to govern transaction authorization for one or more accounts, sub-accounts, devices, and/or users. In embodiments, transaction rules specified for a master account may apply to each sub-account of the master account. In embodiments, further rules may be specified for the sub-accounts, which may be in addition to or may supersede the master account rules. The rules data can comprise threshold values, such as a maximum spend limit, a minimum required account balance, an allowable transaction frequency, and/or allowable transaction times, to name a few. The rules data can also require pre-authorization, such as from an administrator or owner of a master account. The rules data can specify acceptable payees and/or types of acceptable purchases (e.g., fuel, groceries, to name a few).

An accounts module 732 may manage one or more accounts, which can be digital asset accounts and/or fiat accounts. An accounts module 732 may maintain one or more omnibus accounts. The accounts module 732 may interact with one or more bank accounts, investment accounts, or other fiat accounts.

An identity authentication module 734 may verify a device identity, e.g., by evaluating received authentication data, which can include comparing a received previous authentication data value to a last received current authentication value. The identity authentication module may compute a verification hash value based upon newly received data and a last received hash value and may compare the verification hash value to a newly received hash value to determine whether the values are equal. The identity authentication module 734 may provide a certificate and/or other electronic message, e.g., to a transaction counter-party, indicating the identity of the device and/or device's owner or operator.

A transaction request authentication module 736 may evaluate a digital signature to determine the authenticity of a received electronic transaction request.

A transaction authorization module 738 may evaluate transaction parameters and/or transaction information with respect to transaction rules to determine whether the transaction is authorized.

A transaction module 740 may execute one or more transactions according to received transaction parameters.

FIGS. 17A-F are flow charts of exemplary processes for performing transactions involving autonomous devices in accordance with exemplary embodiments of the present invention.

Figure 17A:
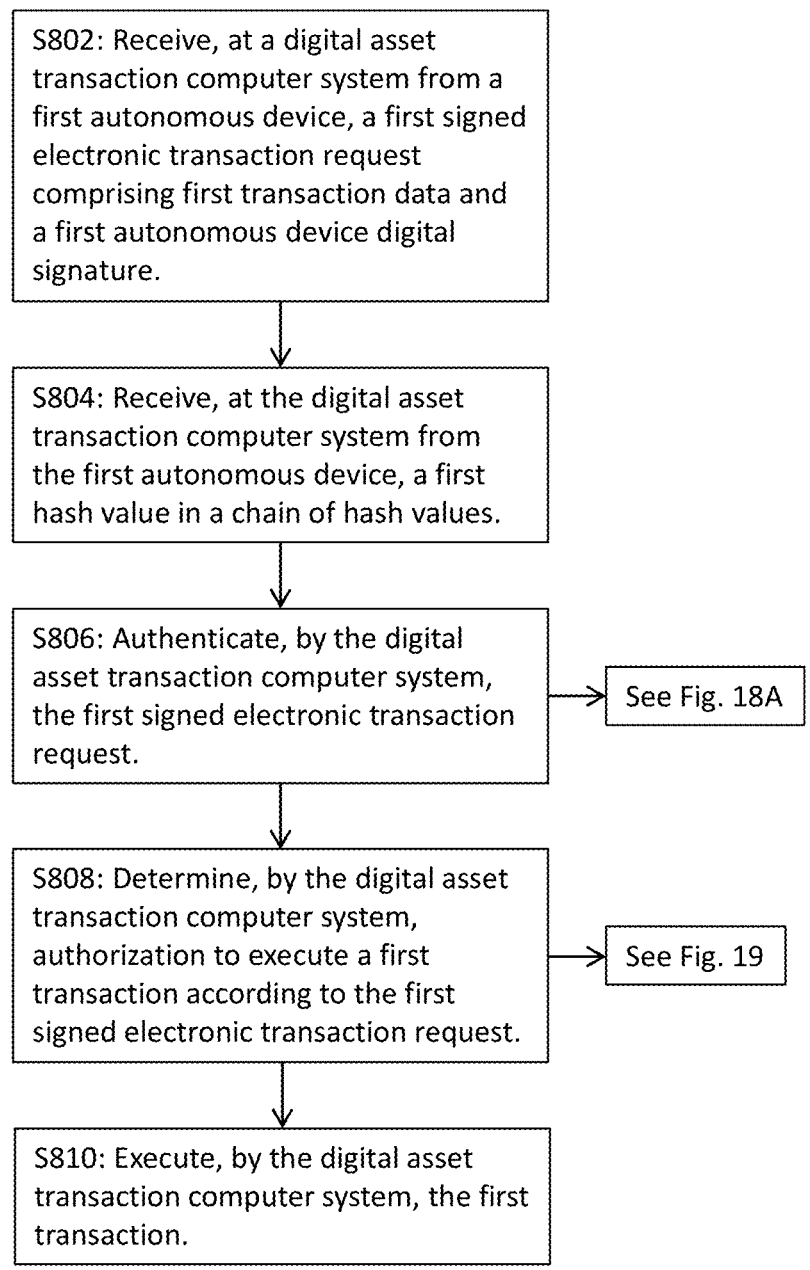
FIGS. 17A-F are flow charts of exemplary processes for performing transactions involving autonomous devices in accordance with exemplary embodiments of the present invention.

FIG. 17A is a flow chart of an exemplary process for performing transactions involving autonomous devices that generate an authentication hash chain and transmit the newest value of the hash chain to a transaction computer system to establish device authenticity.

In a step S802, a digital asset transaction computer system 102 or the digital asset exchange computer system 122 may receive from a first autonomous device, a first signed electronic transaction request comprising first transaction data and a first autonomous device digital signature. In embodiments, the first transaction data can comprise a sending account identifier associated with the first autonomous device, a destination account identifier, a transaction amount, and/or a timestamp (e.g., a timestamp based upon an internal clock of the first autonomous device). In embodiments, the first autonomous device digital signature may have been generated by the first autonomous device using a first private key of a first autonomous device asymmetric key pair, e.g., to encrypt the first transaction data, a portion of the first transaction data, or other data payload contents that are being signed. In embodiments, the first signed electronic transaction request may be encrypted by the first autonomous device using a public key of a digital asset transaction computer system asymmetric key pair such that only the digital asset transaction computer system can decrypt the request using its corresponding private key. In embodiments, the first transaction data may be in a computer-readable format, such as JSON data.

In a step S804, the digital asset transaction computer system may receive from the first autonomous device a first hash value in a chain of hash values. The first hash value may have been computed by the first autonomous device by applying a hash algorithm to first data. In embodiments, the first data can include first new data and a first previous hash value in the chain of hash values, the first previous hash value computed by applying the hash algorithm to first previous data not including the first new data. In embodiments, the first hash value may be received along with the first signed electronic transaction request. The first signed electronic transaction request may include the first hash value. In embodiments, the first hash value may be transmitted periodically (e.g., according to a predefined schedule and/or frequency) and/or aperiodically (e.g., according to a randomized schedule), which transmission may be independent of the first signed electronic transaction request.

In embodiments, the first hash value may be generated and transmitted in response to a triggering event, which may be any of the generation of the first signed electronic transaction request, an electronic hash value request received from the digital asset transaction computer system, an electronic hash value request received from an administrator computer system associated with management of the autonomous device, or a scheduled trigger, to name a few.

Figure 18A:
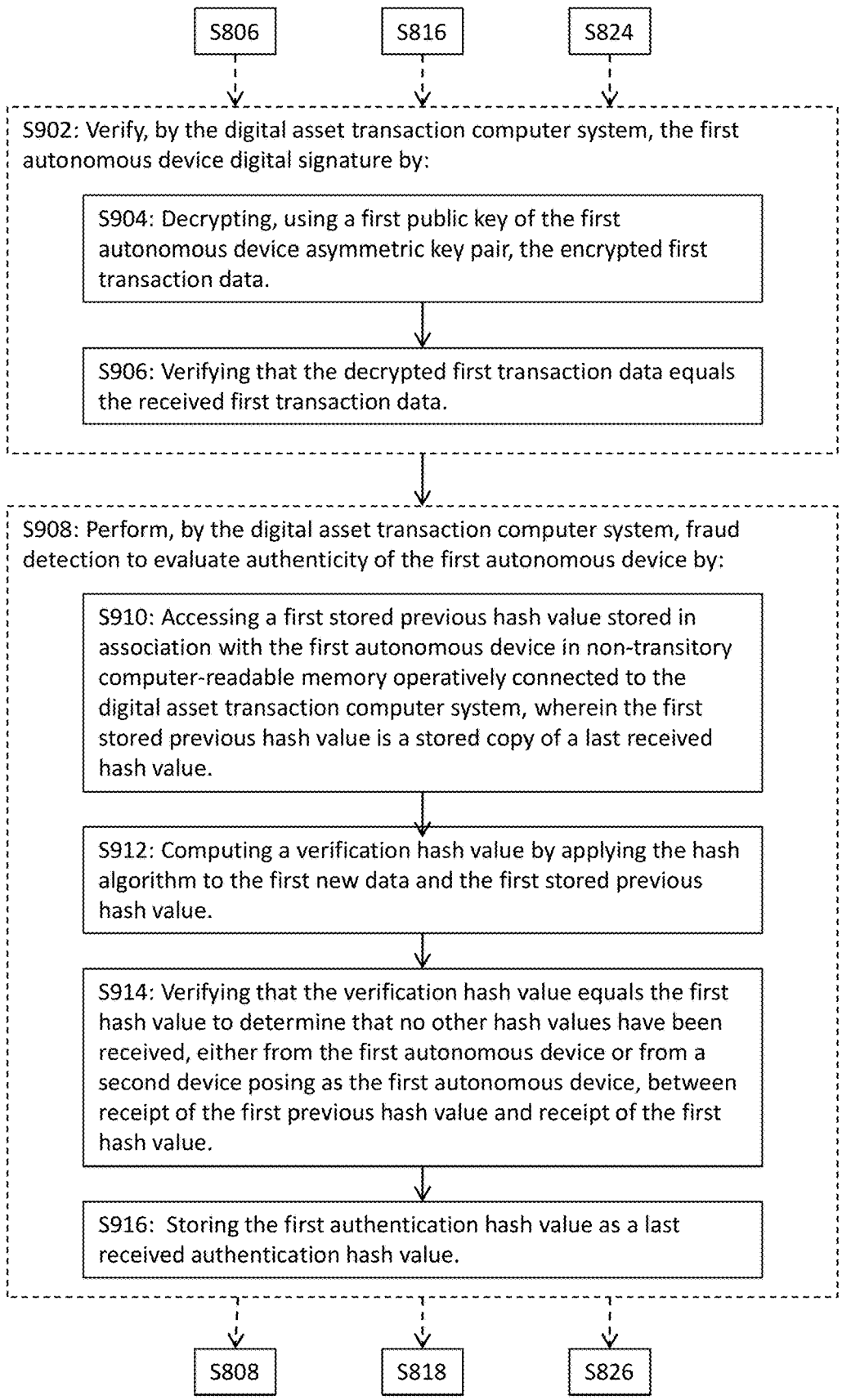
FIGS. 18A-B are flow charts of exemplary processes for authenticating electronic transaction requests in accordance with exemplary embodiments of the present invention.

In a step S806, the digital asset transaction computer system may authenticate the first signed electronic transaction request, as described with respect to FIG. 18A.

Figure 19:
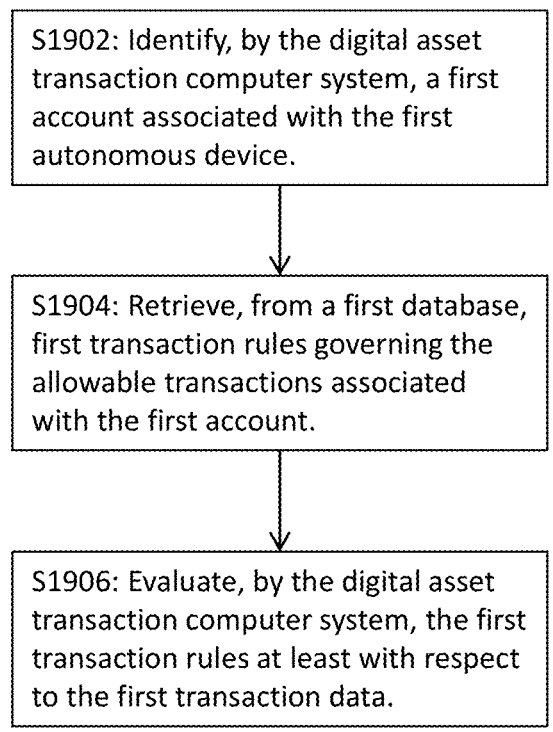
FIG. 19 is a flow chart of an exemplary process for determining transaction authorization in accordance with exemplary embodiments of the present invention.

In a step S808, the digital asset transaction computer system may determine authorization to execute a first transaction according to the first signed electronic transaction request, as described herein with respect to FIG. 19. The computer system may evaluate the transaction parameters and/or additional information (e.g., transaction history, time, device location, account balances, vendor identification, goods or services being purchased, to name a few) with respect to stored transaction rules to determine whether the requested transaction satisfies the rules. In embodiments, a device owner or operator can specify at the transaction computer system the required additional information fields for evaluation and can program the device accordingly to provide such information. In embodiments, such additional information may be provided in a computer-readable format, such as JSON data.

In a step S810, the digital asset transaction computer system may execute the first transaction. In embodiments, the digital asset transaction computer system may initiate and/or execute a transfer of funds (e.g., digital assets) from a sending account associated with the sending account identifier to a receiving account associated with the destination account identifier. In embodiments, the digital asset transaction computer system may execute the transfer by creating an electronic ledger entry in a local digital asset transaction ledger and/or by updating one or more ledger entries (e.g., account balance entries) in the local digital asset transaction ledger. In embodiments, the digital asset transaction computer system may generate and/or transmit electronic transaction instructions to a digital asset network for inclusion in a distributed public electronic transaction ledger (e.g., the Bitcoin Blockchain).

In embodiments, the digital asset transaction computer system may provide confirmation of an autonomous device's identity by transmitting an identity authentication electronic message to a transaction counter-party (e.g., a vendor) and/or by providing a signed certificate to one or more transaction parties (such as directly to the counter-party or to the autonomous device, which can share the certificate with counter-parties). In embodiments, such a certificate may be signed with a private key of the digital asset transaction computer system and/or the digital asset exchange computer system. The certificate may have an expiration date and/or may comprise a timestamp associated with the certificate creation time. In embodiments, such identity confirmation services may be provided for any user or device, not only autonomous devices. In embodiments, either party to the transaction may request an identity confirmation certificate for itself or for the other party. In embodiments, the digital asset transaction computer system may provide an electronic identity confirmation along with payment to the counter-party (e.g., as an electronic message embedded in a payment transaction log, as an independent message or certificate, and/or as an electronic message broadcast or otherwise transmitted to be included in a digital asset network blockchain entry).

In embodiments, a transaction counter-party, such as a seller, can provide a digitally signed offer to the purchasing device, e.g. the autonomous device 106. The offer may be provided along with the electronic transaction request. The transaction computer system may verify the offer such as by authenticating its digital signature and/or may check that the requested transaction parameters meet (e.g., do not exceed) the transaction requirements of the offer (e.g., correct transaction amount, correct destination address). The offer may indicate a category of goods or services being purchased, an itemized list of goods or services being purchased, and/or seller information, which offer information may be stored by the transaction computer system in a transaction history log.

Figure 17B:
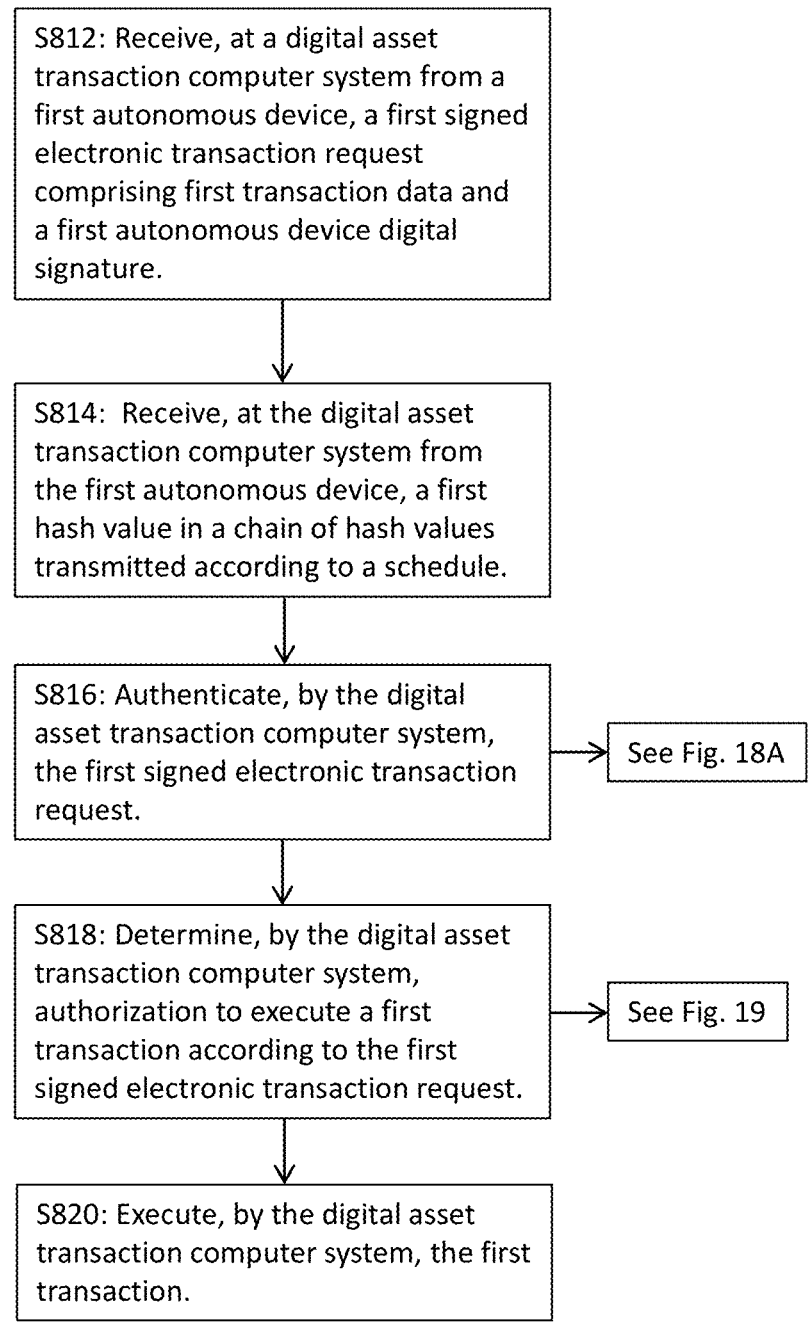

FIG. 17B is a flow chart of an exemplary process for performing transactions involving autonomous devices that generate an authentication hash chain and transmit the newest value of the hash chain to a transaction computer system according to a schedule to establish device authenticity. The authentication hash value may thus be transmitted independently of any transaction request and/or may be transmitted with greater frequency than transaction requests. In embodiments, transmission of the authentication hash value may be triggered by an electronic transaction request (or preparation to send an electronic transaction request), and the authentication hash value may be transmitted separately from the transaction request.

In a step S812, a digital asset transaction computer system and/or the digital asset exchange computer system may receive from a first autonomous device a first signed electronic transaction request comprising first transaction data and a first autonomous device digital signature.

In a step S814, the digital asset transaction computer system and/or the digital asset exchange computer system may receive from the first autonomous device, a first hash value in a chain of hash values transmitted according to a schedule.

In a step S816, the digital asset transaction computer system and/or the digital asset exchange computer system may authenticate the first signed electronic transaction request as described herein with respect to FIG. 18A.

In a step S818, the digital asset transaction computer system and/or the digital asset exchange computer system may determine authorization to execute a first transaction according to the first signed electronic transaction request as described herein with respect to FIG. 19.

In a step S820, the digital asset transaction computer system and/or the digital asset exchange computer system may execute the first transaction.

Figure 17C:
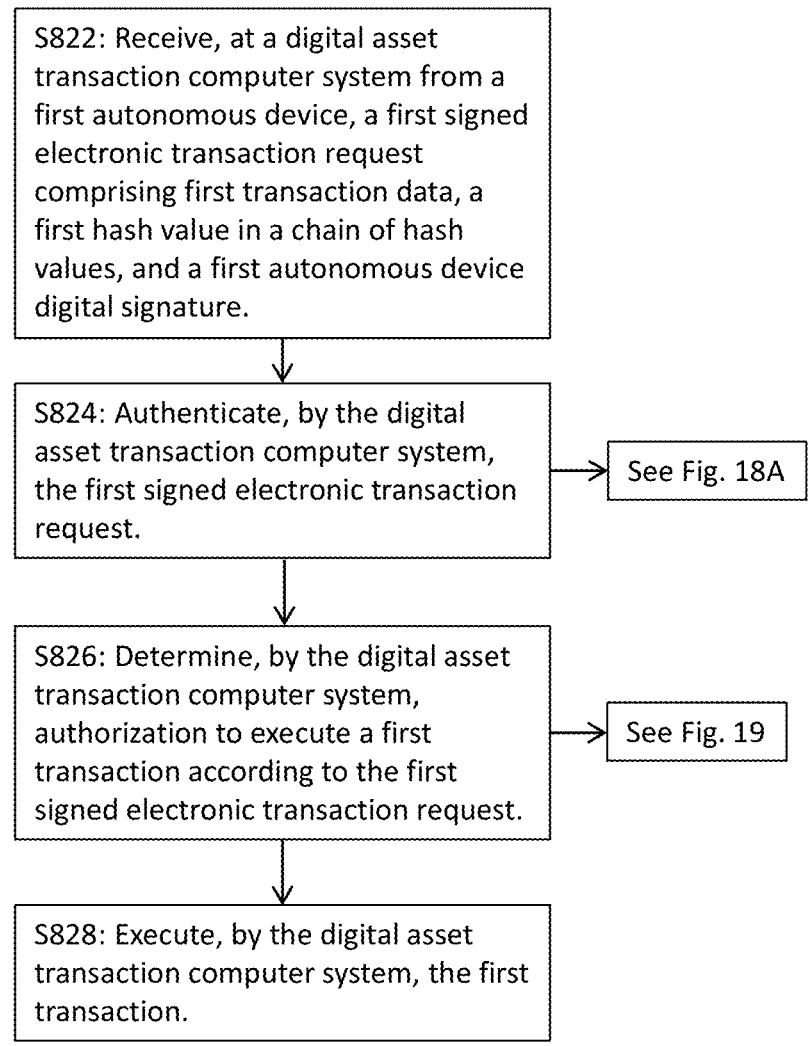

FIG. 17C is a flow chart of an exemplary process for performing transactions involving autonomous devices that generate an authentication hash chain and transmit the newest value of the hash chain to a transaction computer system along with an electronic transaction request to establish device authenticity. The authentication hash value may thus be transmitted along with each transaction request.

In a step S822, a digital asset transaction computer system may receive from a first autonomous device a first signed electronic transaction request comprising first transaction data, a first hash value in a chain of hash values, and a first autonomous device digital signature.

In a step S824, the digital asset transaction computer system may authenticate the first signed electronic transaction request as described herein with respect to FIG. 18A.

In a step S826, the digital asset transaction computer system may determine authorization to execute a first transaction according to the first signed electronic transaction request as described herein with respect to FIG. 19.

In a step S828, the digital asset transaction computer system may execute the first transaction.

Figure 17D:
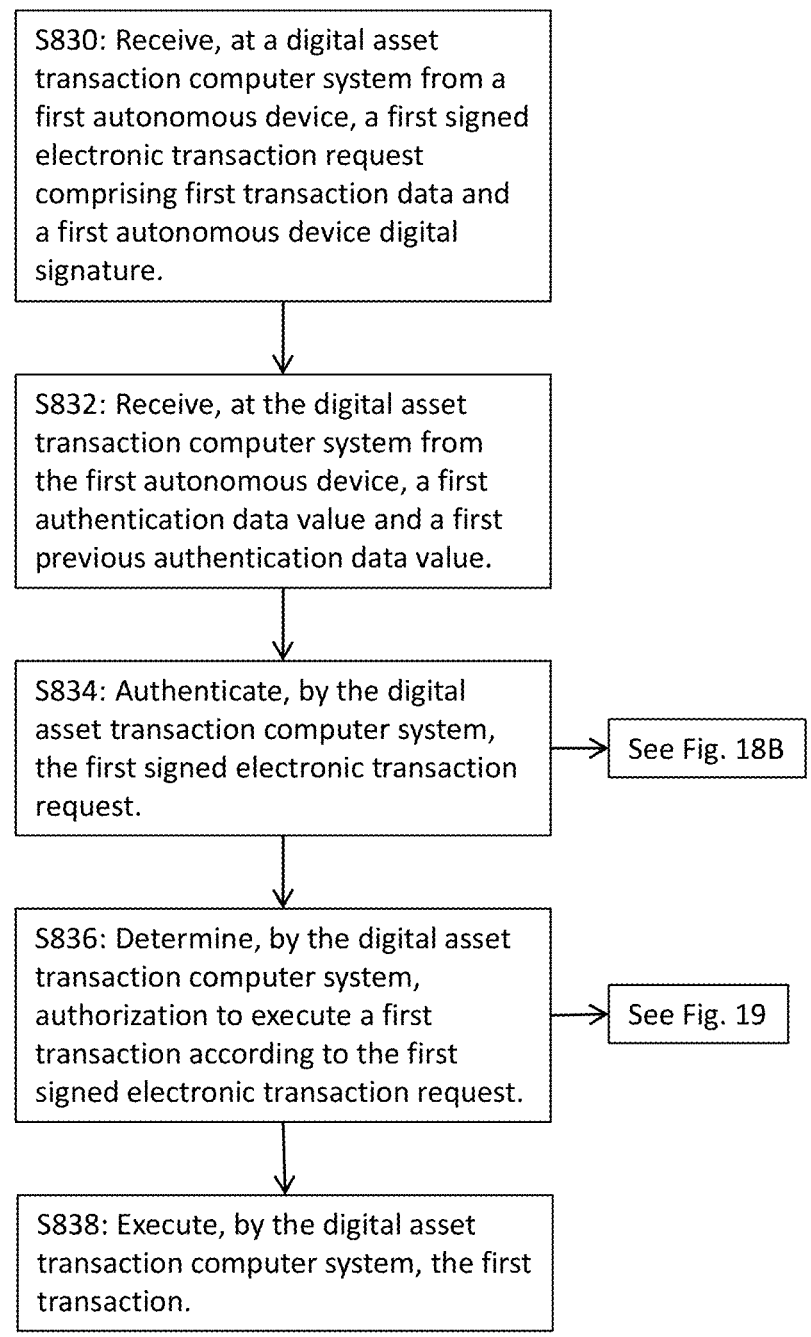

FIG. 17D is a flow chart of an exemplary process for performing transactions involving autonomous devices that transmit a newest authentication data value as well as the previous authentication data value a transaction computer system to establish device authenticity. An authentication data value may be a randomly generated number. In embodiments, an authentication data value may be a hash value, which may be part of a chain of hash values. An authentication data value may be or may be based at least in part upon a timestamp, device location, and/or device identifier, to name a few.

In a step S830, a digital asset transaction computer system and/or the digital asset exchange computer system may receive from a first autonomous device, a first signed electronic transaction request comprising first transaction data and a first autonomous device digital signature.

In a step S832, the digital asset transaction computer system and/or the digital asset exchange computer system may receive from the first autonomous device, a first authentication data value and a first previous authentication data value.

Figure 18B:
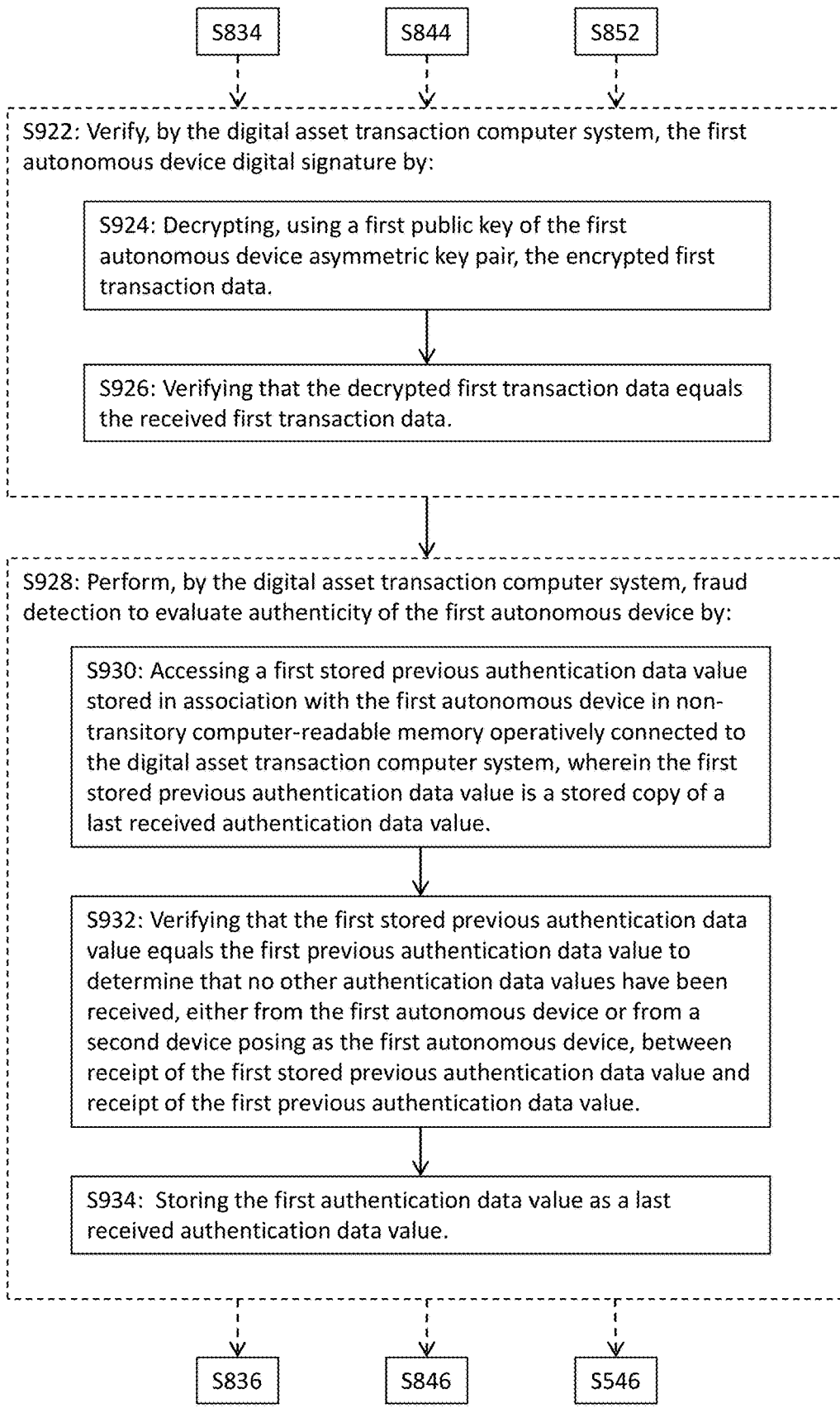

In a step S834, the digital asset transaction computer system and/or the digital asset exchange computer system may authenticate the first signed electronic transaction request as described herein with respect to FIG. 18B.

In a step S836, the digital asset transaction computer system and/or the digital asset exchange computer system may determine authorization to execute a first transaction according to the first signed electronic transaction request as described herein with respect to FIG. 19.

In a step S838, the digital asset transaction computer system and/or the digital asset exchange computer system may execute the first transaction.

Figure 17E:
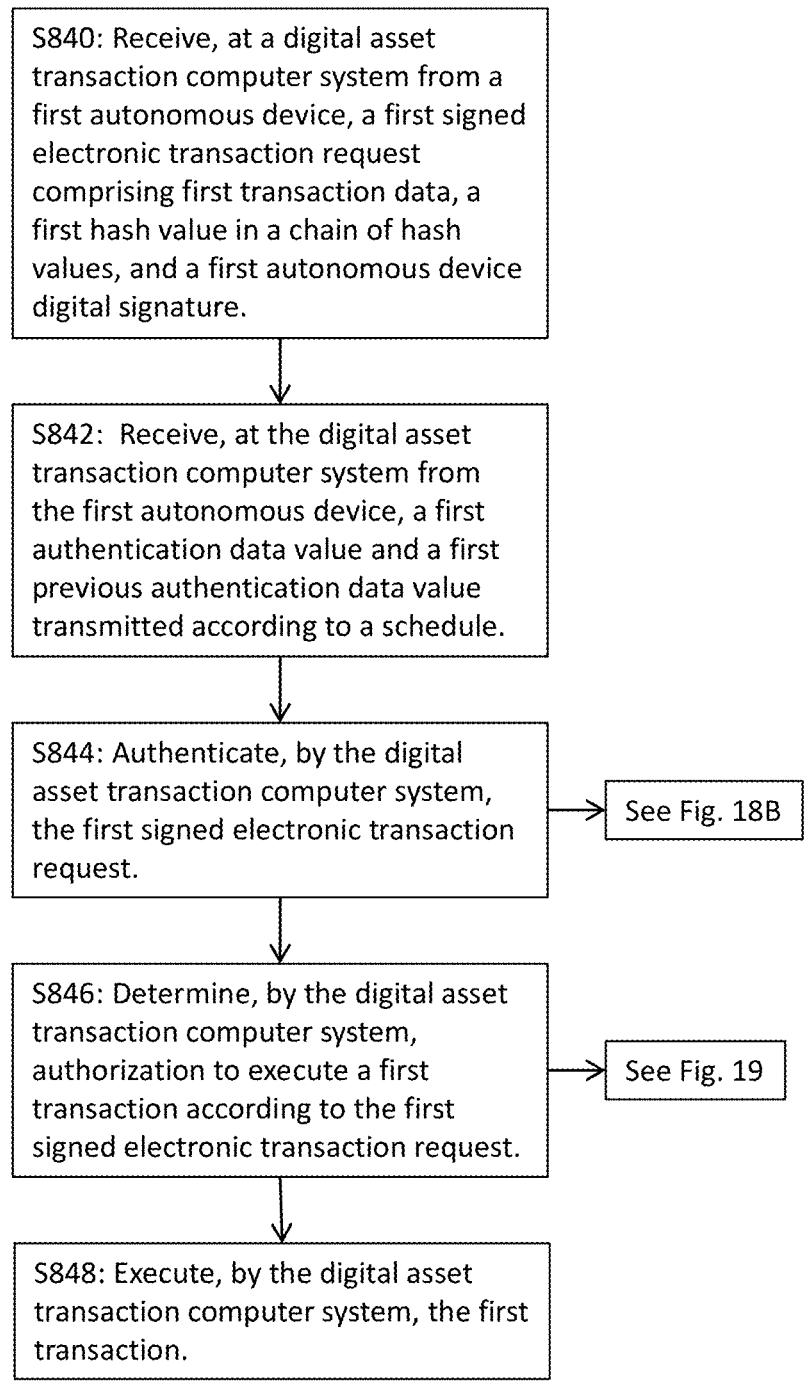

FIG. 17E is a flow chart of an exemplary process for performing transactions involving autonomous devices that transmit a newest authentication data value as well as the previous authentication data value to a transaction computer system according to a schedule to establish device authenticity. In embodiments, the schedule may be predefined and/or periodic or randomized. The authentication data values may be transmitted independently from transaction requests.

In a step S840. a digital asset transaction computer system and/or the digital asset exchange computer system may receive from a first autonomous device, a first signed electronic transaction request comprising first transaction data, a first hash value in a chain of hash values, and a first autonomous device digital signature.

In a step S842, the digital asset transaction computer system and/or the digital asset exchange computer system may receive from the first autonomous device, a first authentication data value and a first previous authentication data value transmitted according to a schedule.

In a step S844, the digital asset transaction computer system and/or the digital asset exchange computer system may authenticate the first signed electronic transaction request as described herein with respect to FIG. 18B.

In a step S846, the digital asset transaction computer system and/or the digital asset exchange computer system may determine authorization to execute a first transaction according to the first signed electronic transaction request as described herein with respect to FIG. 19.

In a step S848, the digital asset transaction computer system and/or the digital asset exchange computer system may execute the first transaction.

Figure 17F:
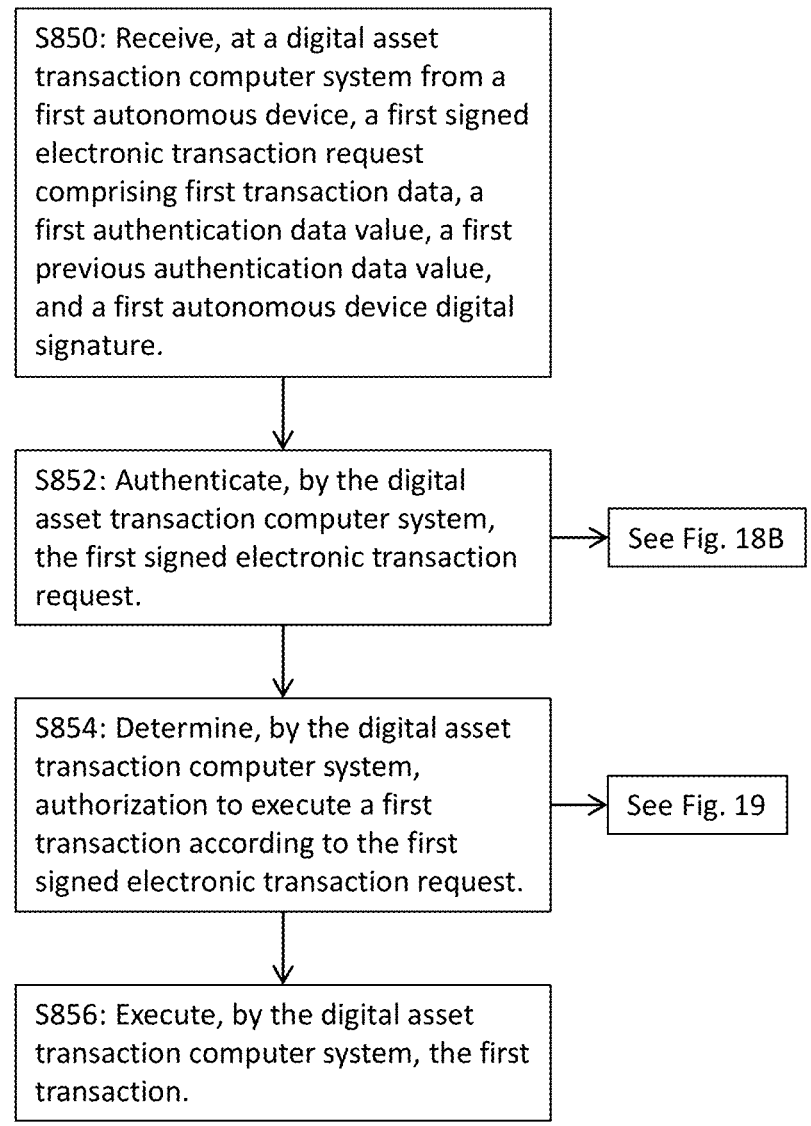

FIG. 17F is a flow chart of an exemplary process for performing transactions involving autonomous devices that transmit a newest authentication data value as well as the previous authentication data value to a transaction computer system along with an electronic transaction request to establish device authenticity.

In a step S850, a digital asset transaction computer system may receive from a first autonomous device, a first signed electronic transaction request comprising first transaction data, a first authentication data value, a first previous authentication data value, and a first autonomous device digital signature.

In a step S852, the digital asset transaction computer system and/or the digital asset exchange computer system may authenticate the first signed electronic transaction request as described herein with respect to FIG. 18B.

In a step S854, the digital asset transaction computer system and/or the digital asset exchange computer system may determine authorization to execute a first transaction according to the first signed electronic transaction request as described herein with respect to FIG. 19.

In a step S856, the digital asset transaction computer system 102 and/or the digital asset exchange computer system 112 may execute the first transaction.

FIGS. 18A-B are flow charts of exemplary processes for authenticating electronic transaction requests in accordance with exemplary embodiments of the present invention.

FIG. 18A shows an authentication process wherein the transaction computer system and/or exchange computed system computes a verification hash value to compare against a received hash value of a chain of hash values. The verification hash value is computed based in part upon the last received hash value, and if the output does not match the newly received hash value, then there was a discrepancy in the last received hash value, meaning the last received hash value stored at the transaction computer system does not match the last hash value used at the autonomous device to generate its latest hash value.

In a step S902, the digital asset transaction computer system and/or the digital asset exchange computer system may verify the first autonomous device digital signature of autonomous device 106, for example. Such verification may be performed by, in a step S904, decrypting, using a first public key of the first autonomous device asymmetric key pair, the encrypted first transaction data, and in a step S906, verifying that the decrypted first transaction data equals the received first transaction data.

In a step S908, the digital asset transaction computer system may perform fraud detection to evaluate authenticity of the first autonomous device. To perform fraud detection, the computer system may, in a step S910, access a first stored previous hash value stored in association with the first autonomous device in non-transitory computer-readable memory operatively connected to the digital asset transaction computer system, wherein the first stored previous hash value is a stored copy of a last received hash value. Then, in a step S912, the computer system may computer a verification hash value by applying the hash algorithm to the first new data and the first stored previous hash value. In a step S914, the computer system may verify that the verification hash value equals the first hash value to determine that no other hash values have been received, either from the first autonomous device or from a second device posing as the first autonomous device, between receipt of the first previous hash value and receipt of the first hash value.

In a step S916, the digital asset transaction computer system and/or the digital asset exchange computer system may store the first authentication hash value as a last received authentication hash value, which may be used in the next authentication cycle. In embodiments, a currently stored copy of the last received authentication hash value may be replaced by the first authentication hash value.

FIG. 18B shows an authentication process wherein the transaction computer system receives a previous authentication data value along with a new authentication data value and compares the previous authentication data value against a stored copy of a last received authentication data value to determine whether they match.

In a step S922, the digital asset transaction computer system and/or the digital asset exchange computer system may verify the first autonomous device digital signature. The digital signature may be verified by, in a step S924, decrypting, using a first public key of the first autonomous device asymmetric key pair, the encrypted first transaction data, and in a step S926, verifying that the decrypted first transaction data equals the received first transaction data.

In a step S928, the digital asset transaction computer system and/or the digital asset exchange computer system may perform fraud detection to evaluate authenticity of the first autonomous device. Fraud detection may be performed by, in a step S930, accessing a first stored previous authentication data value stored in association with the first autonomous device in non-transitory computer-readable memory operatively connected to the digital asset transaction computer system, wherein the first stored previous authentication data value is a stored copy of a last received authentication data value. Then, in a step S932, the computer system may verify that the first stored previous authentication data value equals the first previous authentication data value to determine that no other authentication data values have been received, either from the first autonomous device or from a second device posing as the first autonomous device, between receipt of the first stored previous authentication data value and receipt of the first previous authentication data value.

In a step S934, the digital asset transaction computer system may store the first authentication data value as a last received authentication data value, so that it can be used in the next authentication cycle.

FIG. 19 is a flow chart of an exemplary process for determining transaction authorization according to transaction rules in accordance with exemplary embodiments of the present invention. In embodiments, the digital asset transaction computer system may determine whether a device has been flagged, such as by previously failing the fraud detection process (or a device posing as the device previously failing such fraud detection). In embodiments, the digital asset transaction computer system may determine may determine whether a device owner or operator or an account owner or administrator has placed restrictions on the device or the account and/or revoked authorization for the device or the account.

In a step S1902, the digital asset transaction computer system and/ormay identify a first account associated with the first autonomous device. In embodiments, the first account may be a master account to which a sub-account associated with the first autonomous device is subordinate. In embodiments, the first account may be a sub-account. In embodiments, the first transaction rules may be linked to the first autonomous device and/or may be linked to the first autonomous device via a device identifier or via the sending account identifier.

In a step S1904, the digital asset transaction computer system and/or the digital asset exchange computer system may retrieve from a first database first transaction rules governing the allowable transactions associated with the first account. In embodiments, the first database may be remotely located and/or may be maintained by a device owner or operator or an account owner or administrator.

In a step S1906, the digital asset transaction computer system may evaluate the first transaction rules at least with respect to the first transaction data. If the first transaction data violates any of the first transaction rules, the transaction may not be authorized.

In embodiments, the regulatory compliance and/or transaction authorization processes described herein may be used, instead of by an autonomous device, by a company with a sub-account tied to an individual authorized to act on behalf of the company.

In embodiments, one or more devices or autonomous devices may be configured to interact with the digital transaction computer system according to the processes described herein.

In embodiments, an autonomous device can comprise one or more processors and non-transitory computer-readable memory operatively connected to the one or more processors and having stored thereon computer-readable instructions to perform the steps of generating, by the autonomous device, a first hash value of a chain of hash values by applying a hash algorithm to first data including first new data and a first previous hash value of the chain of hash values, the first previous hash value computed by applying the hash algorithm to first previous data; transmitting, from the autonomous device to a digital asset transaction computer system, the first hash value and the first new data; generating, by the autonomous device, a first signed electronic transaction request comprising (1) first transaction data comprising a sending account identifier associated with the first autonomous device, a destination account identifier, a transaction amount, and a timestamp, and (2) a first autonomous device digital signature generated using a first private key of a first autonomous device asymmetric key pair; and transmitting, from the autonomous device to the digital asset transaction computer system, the first signed electronic transaction request.

In embodiments, the first new data can comprise at least a portion of the first signed electronic transaction request. In embodiments, the first new data can comprise a timestamp. In embodiments, the first new data can comprise position data associated with a location of the autonomous device.

In embodiments, the first hash value may be generated and transmitted according to a periodic schedule for the chain of hash values.

The embodiments, the autonomous device may be further configured to perform the steps of receiving, at the autonomous device from a destination device associated with the destination account identifier, a signed electronic offer comprising the destination account identifier, the transaction amount, and a destination device digital signature generated using a second private key of a destination device asymmetric key pair, and providing, from the autonomous device to the digital asset transaction computer system, the signed electronic offer.

In embodiments, a digital asset transaction computer system may receive from a first autonomous device a first signed electronic transaction request. The first signed electronic transaction request may comprise first transaction data, which may comprise a sending account identifier associated with the first autonomous device, a destination account identifier, a transaction amount, and a timestamp. The first transaction data may further comprise a first autonomous device digital signature generated using a first private key of a first autonomous device asymmetric key pair to encrypt the first transaction data.

The digital asset transaction computer system may receive from the first autonomous device a first hash value in a chain of hash values, wherein the first hash value was computed by applying a hash algorithm to first data including first new data and a first previous hash value in the chain of hash values, the first previous hash value computed by applying the hash algorithm to first previous data not including the first new data.

The digital asset transaction computer system may authenticate the first signed electronic transaction request by (1) verifying the first autonomous device digital signature by decrypting, using a first public key of the first autonomous device asymmetric key pair, the encrypted first transaction data, and verifying that the decrypted first transaction data equals the received first transaction data, and (2) performing fraud detection to evaluate authenticity of the first autonomous device by accessing a first stored previous hash value stored in association with the first autonomous device in non-transitory computer-readable memory operatively connected to the digital asset transaction computer system, wherein the first stored previous hash value is a stored copy of the previous hash value, computing a verification hash value by applying the hash algorithm to the first new data and the first stored previous hash value, and verifying that the verification hash value equals the first hash value to determine that no other hash values have been received, either from the first autonomous device or from a second device posing as the first autonomous device, between receipt of the first previous hash value and receipt of the first hash value.

The digital asset transaction computer system may determine authorization to execute a first transaction according to the first signed electronic transaction request by identifying a first account associated with the first autonomous device, retrieving, from a first database, first transaction rules governing the allowable transactions associated with the first account, and evaluating the first transaction rules at least with respect to the first transaction data. The digital asset transaction computer system may the execute the first transaction.

In embodiments, the first account may be a first sub-account subordinate to a master digital asset account.

In embodiments, the first transaction rules may be unique to the first sub-account. The first transaction rules may be associated with the master account and apply to a plurality of sub-accounts subordinate to the master account including the first sub-account.

In embodiments, the first hash value is received along with the first signed electronic transaction request. In embodiments, the first hash value may be received as part of a periodic transmission of hash values of the chain of hash values from the first autonomous device.

In embodiments, the first data may comprise at least a portion of the first signed electronic transaction request.

In embodiments, the digital asset transaction computer system may transmit to an electronic address associated with the destination account identifier an electronic indication of an identity associated with the first autonomous device. In embodiments, the electronic indication of the identity associated with the first autonomous device may comprise an identification of the owner of the master account.

In embodiments, executing the first transaction may comprise transmitting, by the digital asset transaction computer system to a digital asset network, an electronic indication of the executed transaction for inclusion in a distributed public electronic ledger that records digital asset transactions among nodes in the digital asset network.

In embodiments, the digital asset transaction computer system may transmit to a destination autonomous device associated with the destination account identifier an electronic indication of the executed transaction.

In embodiments, the digital asset transaction computer system may receive from a second device a second signed electronic transaction request comprising (1) second transaction data comprising the sending account identifier associated with the first autonomous device, a second destination account identifier, a second transaction amount, and a second timestamp, and (2) an apparent autonomous device digital signature generated using the first private key of the first autonomous device asymmetric key pair. The digital asset transaction computer system may receive from the second device, a second hash value and second new data and verify the validity of the second signed electronic transaction request by (1) verifying using the first public key of the first autonomous device asymmetric key pair, the apparent autonomous device digital signature, and (2) evaluating the authenticity of the second device by accessing a second stored previous hash value stored in association with the first autonomous device in the non-transitory computer-readable memory, computing a second verification hash value by applying the hash algorithm to the second new data and the second stored previous hash value, and determining that the second verification hash value does not equal the second hash value. The digital asset transaction computer system may reject the second signed electronic transaction request. The digital asset transaction computer system may store a warning indicator to reject future transaction requests apparently received from the first autonomous device.

In embodiments, the digital asset transaction computer system may, prior to executing the first transaction, receive a signed electronic offer comprising the destination account identifier, the transaction amount, and a destination device digital signature generated using a second private key of a destination device asymmetric key pair. The digital asset transaction computer system may verify that the destination account identifier is associated with a digital asset account having an owner with an identity known to the digital asset transaction computer system. In embodiments, the signed electronic offer may be received from a destination autonomous device associated with the destination account identifier. In embodiments, the signed electronic offer may be received from the first autonomous device, which received the signed electronic offer from a destination autonomous device associated with the destination account identifier.

Now that embodiments of the present invention have been shown and described in detail, various modifications and improvements thereon can become readily apparent to those skilled in the art. Accordingly, the exemplary embodiments of the present invention, as set forth above, are intended to be illustrative, not limiting. The spirit and scope of the present invention is to be construed broadly.

What is claimed is:

1. An autonomous device comprising:
   (a) one or more processors;
   (b) non-transitory computer-readable memory operatively connected to the one or more processors and having stored thereon computer-readable instructions to perform the steps of:
      (i) storing, at the autonomous device, credential information including at least autonomous device digital wallet information associated with an autonomous device digital wallet;
      (ii) transmitting, from the autonomous device to a digital asset exchange computer system associated with a digital asset exchange, the credential information;
      (iii) receiving, at the autonomous device, authentication confirmation information from the digital asset exchange computer system confirming that the autonomous device is authorized to access the digital asset exchange computer system;
      (iv) generating, by the autonomous device, a first transaction request, the first transaction request including
         (1) a first transaction amount of digital assets; and
         (2) first transaction instructions to transfer the first transaction amount of digital assets to the autonomous device digital wallet, wherein the digital assets include stable value tokens;
      (v) transmitting, from the autonomous device to the digital asset exchange computer system, the first transaction request;
      (vi) receiving, at the autonomous device, from the digital asset exchange computer system, a confirmation of transfer of the first transaction amount of digital assets to the autonomous device digital wallet, wherein the transaction is published to a decentralized digital asset ledger maintained in a distributed network in the form of a blockchain by the digital asset exchange computer system;
      (vii) confirming, by the autonomous device, the transfer of the first transaction amount of digital assets to the autonomous device digital wallet based on reference to the blockchain;
      (viii) contacting, by the autonomous device, a vendor computer system associated with a vendor of products;
      (ix) negotiating, by the autonomous device, a second transaction amount of stable value tokens with the vendor computer system for at least one product to be provided to the autonomous device from the vendor of products;
      (x) receiving, at the autonomous device, a transaction confirmation from the vendor computer system including vendor digital wallet information associated with a vendor digital wallet and a confirmation from the vendor of products that the second transaction amount of stable value tokens is acceptable;
      (xi) initiating, at the autonomous device, a transfer of the second transaction amount of stable value tokens from the autonomous device digital wallet to the vendor digital wallet by:
         (1) transmitting, to a stable value token issuer computer system associated with an issuer of the stable value tokens, transaction instructions, the transaction instructions including:

(a) the autonomous device digital wallet information;
(b) the vendor digital wallet information;
(c) transaction instructions instructing transfer of the second transaction amount of stable value tokens from the autonomous device digital wallet to the vendor digital wallet;
(2) receiving, at the autonomous device from the stable value token issuer computer system, confirmation of the transfer of the second transaction amount of stable value tokens from the autonomous device digital wallet to the vendor digital wallet;
(3) publishing, by the autonomous device, the transaction of the second transaction amount of stable value tokens from the autonomous device wallet to the vendor digital wallet to a stable value token ledger maintained in a distributed network in the form of a block chain; and
(4) confirming, at the autonomous device, the transfer of the second transaction amount of stable value tokens from the autonomous device wallet to the vendor digital wallet, based on reference to the stable value token ledger.

2. The autonomous device of claim 1, wherein the autonomous device digital wallet information includes a public key associated with the autonomous device that is also linked to an authorized user of the digital asset exchange.

3. The autonomous device of claim 1, wherein the autonomous device digital wallet is associated with an authorized user of the digital asset exchange.

4. The autonomous device of claim 1, wherein the product is at least one of a good and a service provided by the third party provider to the autonomous device.

5. The autonomous device of claim 1, wherein the transfer of the first transaction amount of digital assets is published directly to the decentralized digital asset ledger and the transfer of the second transaction amount of stable value token is published directly to the stable value token ledger.

6. The autonomous device of claim 1, wherein the transfer of the first transaction amount of digital assets is published indirectly to the decentralized digital asset ledger and the transfer of the second transaction amount of stable value tokens is published indirectly to the stavle value token ledger.

7. The autonomous device of claim 6, wherein the transfer of the first transaction amount of and the transfer of the second transaction amount of stable value tokens are published to an exchange digital asset ledger, which is separate from the decentralized digital asset ledger and the stable value token ledger, and published, respectively, to the decentralized digital asset ledger and to the stable value token ledger after publication to the exchange digital asset ledger.

8. The autonomous device of claim 7, wherein transfers published on the exchange digital asset ledger are published to the decentralized digital asset ledger and to the stable value token ledger periodically.

9. The autonomous device of claim 7, wherein transfers published on the exchange digital asset ledger are published to the decentralized digital asset ledger and to the stable value token ledger aperiodically.

10. The autonomous device of claim 1, wherein the non-transitory computer-readable memory further stores computer-readable instructions to perform an additional step of determining, at the autonomous device, whether the product provided by the vendor is received by the autonomous device prior to the step (xii) of publishing the transaction of the second transaction amount of stable value tokens to the stable value token ledger.

11. The autonomous device of claim 1, wherein the non-transitory computer-readable memory further stores computer-readable instructions to perform an additional step of determining, at the autonomous device, whether the product provided by the vendor is received by the autonomous device after the step (xii) of publishing the transaction of the second transaction amount of stable value tokens to the stable value token ledger.

12. The autonomous device of claim 1, wherein the step of (ix) negotiating, by the autonomous device, a second transaction amount of digital assets with the vendor computer system for at least one product to be provided to the autonomous device from the vendor of products comprises:
(1) generating, by the autonomous device, a transaction amount bid request;
(2) sending, by the autonomous device, the transaction amount bid request to one or more bidding vendor computer systems;
(3) receiving, at the autonomous device, from the one or more bidding vendor computer systems, corresponding transaction amount bid responses;
(4) determining, by the autonomous device, that at least one of the transaction amount bid responses satisfies predetermined criteria;
(5) selecting, by the autonomous device, the bidding vendor computer system associated with the at least one of the transaction amount bid responses that satisfies predetermined criteria as the vendor computer system; and
(6) sending, by the autonomous device, a transaction amount bid acceptance to the vendor computer system.

13. The autonomous device of claim 1, wherein the step of (ix) negotiating, by the autonomous device, a second transaction amount of digital assets with the vendor computer system for at least one product to be provided to the autonomous device from the vendor of products comprises:
(1) accessing, by the autonomous device, sets of vendor data associated with potential vendors of products;
(2) determining, by the autonomous device, that at least one set of vendor data satisfies predetermined criteria; and
(3) selecting, by the autonomous device, the potential vendor of products associated with the at least one set of vendor data that satisfies predetermined criteria as the vendor of products.

14. An autonomous device comprising:
one or more processors;
(a) non-transitory computer-readable memory operatively connected to the one or more processors and having stored thereon computer-readable instructions to perform the steps of:
(i) receiving, at the autonomous device, a negotiation request from a third party requester computer system associated with a third party requester, the negotiation request including an identification of a product that the third party requester desires from the autonomous device;
(ii) determining, at the autonomous device, a first transaction amount of stable value tokens for the product that the third party requester desires from the autonomous device;
(iii) generating, at the autonomous device, a transaction response including the first transaction amount;
(iv) transmitting, from the autonomous device to the third party requester, the transaction response;

(v) receiving, at the autonomous device, a transaction confirmation from the third party requester computer system, the transaction confirmation including at least:
  (1) third party requester digital wallet information associated with a third party requester digital wallet; and
  (2) transaction instructions directing a transfer of the first transaction amount of stable value tokens to be transferred from the third party requester digital wallet to an autonomous device digital wallet;
(vi) initiating, at the autonomous device, the transfer of the first transaction amount of stable value tokens from the third party requester digital wallet to the autonomous device digital wallet by:
  (1) transmitting, to a stable value token issuer computer system associated with an issuer of the stable value tokens, transaction instructions, the transaction instructions including:
    (a) the autonomous device digital wallet information;
    (b) the third party requester digital wallet information; and
    (c) transaction instructions for transfer of the first transaction amount of stable value tokens from the third party requester digital wallet to the autonomous device digital wallet;
  (2) receiving, at the autonomous device, from the stable value token issuer computer system, confirmation of the transfer of the first transaction amount of stable value tokens from the third party requester digital wallet to the autonomous device digital wallet;
  (3) publishing, by the autonomous device, the transfer of the first transaction amount of stable value tokens from the third party requester digital wallet to the autonomous device digital wallet on a stable value token ledger maintained in a distributed network in the form of a blockchain; and
  (4) confirming, at the autonomous device, the transfer of the first transaction amount of stable value tokens from the third party requester digital wallet to the autonomous device digital wallet based on reference to the stable value token ledger;
(vii) contacting, by the autonomous device, a digital asset exchange computer system associated with a digital asset exchange, including transmitting to the digital asset exchange computer system credential information associated with the autonomous device, the credential information including autonomous device digital wallet information;
(viii) receiving, at the autonomous device, authentication confirmation from the digital asset exchange computer system confirming that the autonomous device is authorized to access the digital asset exchange computer system and authorized user digital wallet information associated with an authorized user of the digital asset exchange computer system and to the autonomous device digital wallet;
(ix) generating, at the autonomous device, a second transaction request including:
  (1) a second transaction amount of digital assets,
  (2) a digital signature of the autonomous device; and
  (3) transaction instructions instructing transfer of the second transaction amount of digital assets from the autonomous device digital wallet to an exchange digital wallet associated with an authorized user of the digital asset exchange;
(x) transmitting, by the autonomous device, the second transaction request to the digital asset exchange computer system; and
(xi) receiving, at the autonomous device, from the digital asset exchange computer system, a confirmation of the transfer of the second transaction amount of digital assets to the exchange digital wallet associated with the authorized user of the digital asset exchange, wherein the transfer of the second transaction amount of digital assets to the exchange digital wallet is published to a decentralized digital asset ledger by the digital asset exchange computer system.

15. The autonomous device of claim 14, wherein the autonomous device digital wallet information includes a public key associated with the autonomous device that is also linked to the exchange digital wallet of the authorized user of the digital asset exchange.

16. The autonomous device of claim 15, wherein the autonomous device digital wallet information is associated with the authorized user of the digital asset exchange computer system.

17. The autonomous device of claim 15, wherein the product is at least one of a good or service provided by the autonomous device to the third party requester.

18. The autonomous device of claim 15, wherein the transfer of the first amount of stable value tokens is published directly to the stable value token ledger and the transfer of the second amount of digital assets is published directly to the decentralized digital asset ledger.

19. The autonomous device of claim 15, the transfer of the first amount of stable value tokens is published indirectly to the stable value token ledger and the transfer of the second amount of digital assets is published indirectly to the decentralized digital asset ledger.

20. The autonomous device of claim 19, wherein the transfer of the first amount of stable value tokens and the transfer of the second amount of digital assets are published to an exchange digital asset ledger, which is separated from the stable value token ledger and the decentralized digital asset ledger, and published, respectively, to the stable value token ledger and the decentralized digital asset ledger after the publication of the transfers to the exchange digital asset ledger.

21. The autonomous device of claim 20, wherein transfers published on the exchange digital asset ledger are published to the stable value token ledger and the decentralized digital asset ledger periodically.

22. The autonomous device of claim 20, wherein transfers published on the exchange digital asset ledger are published to the stable value token ledger and the decentralized digital asset ledger aperiodically.

23. The autonomous device of claim 14, wherein the step of (ii) determining, at the autonomous device, a first transaction amount of stable value tokens for the product that the third party requester desires from the autonomous device comprises:
  (1) at least one of determining or referencing, by the autonomous device, transaction amounts for the product as offered by one or more other vendors of the product; and
  (2) selecting, by the autonomous device, a first transaction amount of stable value tokens based on the at least one of determined or referenced transaction amounts.

24. The autonomous device of claim 14, wherein the step of (ii) determining, at the autonomous device, a first transaction amount of stable value tokens for the product that the third party requester desires from the autonomous device comprises:
 (1) referencing, by the autonomous device, a transaction amount for the product in accordance with a fixed-price schedule; and
 (2) selecting, by the autonomous device, a first transaction amount of stable value tokens that is equal to or within a predetermined range of the referenced transaction amount.

* * * * *